United States Patent
Chen et al.

(10) Patent No.: US 11,233,608 B2
(45) Date of Patent: *Jan. 25, 2022

(54) HARQ SEQUENCES IN WIRELESS NETWORKS

(71) Applicant: QUALCOMM Incorporated, San Diego, CA (US)

(72) Inventors: Jialing Li Chen, San Diego, CA (US); Stephen Jay Shellhammer, Ramona, CA (US); Alfred Asterjadhi, San Diego, CA (US); Dung Ngoc Doan, San Diego, CA (US); Bin Tian, San Diego, CA (US); Youhan Kim, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,885

(22) Filed: Apr. 22, 2020

(65) Prior Publication Data

US 2020/0344007 A1    Oct. 29, 2020

Related U.S. Application Data

(60) Provisional application No. 62/837,714, filed on Apr. 23, 2019, provisional application No. 62/837,725, filed on Apr. 23, 2019.

(51) Int. Cl.
*H04L 1/18* (2006.01)
*H04W 28/04* (2009.01)
*H04L 5/00* (2006.01)
*H04L 1/00* (2006.01)

(52) U.S. Cl.
CPC .......... *H04L 1/1819* (2013.01); *H04L 1/0057* (2013.01); *H04L 1/1864* (2013.01); *H04L 5/0007* (2013.01); *H04W 28/04* (2013.01)

(58) Field of Classification Search
None
See application file for complete search history.

(56) References Cited

U.S. PATENT DOCUMENTS

| 2017/0126363 | A1 | 5/2017 | Wang et al. |
| 2018/0220437 | A1* | 8/2018 | Li .................... H04W 74/0808 |
| 2018/0288743 | A1* | 10/2018 | Choi .................. H04L 1/16 |
| 2021/0036809 | A1 | 2/2021 | Shellhammer et al. |

* cited by examiner

*Primary Examiner* — Christine T Duong
(74) *Attorney, Agent, or Firm* — Paradice and Li LLP /Qualcomm

(57) ABSTRACT

This disclosure provides systems, methods and apparatuses for data retransmissions in a wireless network. In some implementations, a wireless communication device may transmit a first data unit to a receiving device, may receive a first hybrid automatic repeat request (HARQ) feedback frame indicating that a portion of the first data unit was not successfully decoded by the receiving device, may retransmit the indicated portion of the first data unit to the receiving device in response to the first HARQ feedback frame, and may transmit a second data unit, different than the first data unit, to the receiving device concurrently with the retransmission of the indicated portion of the first data unit.

30 Claims, 31 Drawing Sheets

1340

1342
Transmitting a first block acknowledgement (BA) frame indicating that one or more of the first MPDUs of the first PPDU were not correctly decoded by the wireless communication device based on selecting the ARQ sequence.

1344
Receiving, from the transmitting device, a retransmission of the indicated one or more of the first MPDUs of the first PPDU based on the first BA frame.

1346
Receiving, from the transmitting device, a transmission of a second PPDU concurrently with the retransmission of the one or more of the first MPDUs of the first PPDU.

1348
Transmitting a second BA frame indicating that one or more second MPDUs of the second PPDU were not correctly decoded by the wireless communication device.

1350
Receiving, from the transmitting device, a retransmission of the indicated one or more second MPDUs of the second PPDU concurrently with a transmission of a third PPDU different than the second PPDU.

*Figure 13D*

HARQ SEQUENCES IN WIRELESS NETWORKS

CROSS-REFERENCE TO RELATED APPLICATIONS

This patent application claims priority to U.S. Provisional Patent Application No. 62/837,714, entitled "HARQ SEQUENCES IN WIRELESS NETWORKS" and to U.S. Provisional Patent Application No. 62/837,725, entitled "FITTING A HARQ SEQUENCE INTO AN ARQ SEQUENCE," both filed on Apr. 23, 2019, and both assigned to the assignee hereof. The disclosures of all prior applications are considered part of and are incorporated by reference in this patent application.

TECHNICAL FIELD

This disclosure relates generally to wireless communication, and more specifically, to data retransmissions in wireless networks.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

Imperfect channel conditions on the wireless communication medium may cause data loss during wireless data transmissions from a transmitting device to a receiving device. If the receiving device does not receive (or cannot successfully decode) one or more portions of the transmitted data, the transmitting device may retransmit the one or more portions of data until received and properly decoded by the receiving device. Data retransmissions may consume time and limited resources of the wireless communication medium, and therefore it is desirable to minimize such data retransmissions.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by a wireless communication device, and may include transmitting a first data unit to a receiving device; receiving a first hybrid automatic repeat request (HARQ) feedback frame indicating that a portion of the first data unit was not successfully decoded by the receiving device; retransmitting, in response to the first HARQ feedback frame, the indicated portion of the first data unit to the receiving device; and transmitting a second data unit, different than the first data unit, to the receiving device concurrently with the retransmission of the indicated portion of the first data unit. In some implementations, the method may also include receiving a block acknowledgement (BA) frame confirming reception of the indicated portion of the first data unit and the second data unit by the receiving device. In some instances, transmission of the first HARQ feedback frame, retransmission of the indicated portion of the first data unit, and transmission of the second data unit may correspond to a same HARQ sequence, and transmission of the BA frame may correspond to an automatic repeat request (ARQ) sequence.

In some implementations, the indicated portion of the first data unit and the second data unit may be aggregated in a single packet. In some instances, the first data unit may include a physical-layer service data unit (PSDU) including a plurality of low-density parity check (LDPC) codewords, and the indicated portion may include a subset of the plurality of LDPC codewords. In some other instances, the first data unit may include a first physical-layer service data unit (PSDU), the indicated portion may include one or more medium access control protocol data units (MPDUs) associated with the first PSDU, the second data unit may include a second PSDU, and the single packet may include a physical-layer protocol data unit (PPDU) containing at least the one or more MPDUs associated with the first PSDU and the second PSDU. In some implementations, the PPDU may include an aggregated medium access control protocol data unit (A-MPDU) containing the one or more MPDUs associated with the first PSDU and one or more MPDUs associated with the second PSDU.

In some implementations, the indicated portion of the first data unit may be transmitted using one or more first resource units (RUs), and the second data unit may be transmitted using one or more second RUs different than the one or more first RUs. In some other implementations, the indicated portion of the first data unit may be transmitted using a first set spatial streams, and the second data unit may be transmitted using a second set of spatial streams different than the first set of first spatial streams. In some other implementations, the indicated portion of the first data unit may be transmitted using one or more first orthogonal frequency division multiplexing (OFDM) symbols, and the second data unit may be transmitted using one or more second OFDM symbols different than the one or more first OFDM symbols.

Another innovative aspect of the subject matter described in this disclosure can be implemented in a wireless communication device. The wireless communication device may include at least one modem, at least one processor communicatively coupled with the at least one modem, and at least one memory communicatively coupled with the at least one processor. The at least one memory may store processor-readable code that, when executed by the at least one processor, causes the wireless communication device to transmit a first data unit to a receiving device; receive a first hybrid automatic repeat request (HARQ) feedback frame indicating that a portion of the first data unit was not successfully decoded by the receiving device; retransmit, in response to the first HARQ feedback frame, the indicated portion of the first data unit to the receiving device; and transmit a second data unit, different than the first data unit, to the receiving device concurrently with the retransmission of the indicated portion of the first data unit. In some implementations, execution of the processor-readable code may further cause the wireless communication device to receive a block acknowledgement (BA) frame confirming reception of the indicated portion of the first data unit and the second data unit by the receiving device. In some instances, transmission of the first HARQ feedback frame, retransmission of the indicated portion of the first data unit, and transmission of the second data unit correspond to a same HARQ sequence, and transmission of the BA frame corresponds to an automatic repeat request (ARQ) sequence.

In some implementations, the indicated portion of the first data unit and the second data unit are aggregated in a single packet. In some instances, the first data unit may include a physical-layer service data unit (PSDU) including a plurality of low-density parity check (LDPC) codewords, and the indicated portion may include a subset of the plurality of LDPC codewords. In some other instances, the first data unit may include a first physical-layer service data unit (PSDU), the indicated portion may include one or more medium access control protocol data units (MPDUs) associated with the first PSDU, the second data unit may include a second PSDU, and the single packet may include a physical-layer protocol data unit (PPDU) containing at least the one or more MPDUs associated with the first PSDU and the second PSDU. In some implementations, the PPDU may include an aggregated medium access control protocol data unit (A-MPDU) containing the one or more MPDUs associated with the first PSDU and one or more MPDUs associated with the second PSDU.

In some implementations, the indicated portion of the first data unit may be transmitted using one or more first resource units (RUs), and the second data unit may be transmitted using one or more second RUs different than the one or more first RUs. In some other implementations, the indicated portion of the first data unit may be transmitted using a first set spatial streams, and the second data unit may be transmitted using a second set of spatial streams different than the first set of first spatial streams. In some other implementations, the indicated portion of the first data unit may be transmitted using one or more first orthogonal frequency division multiplexing (OFDM) symbols, and the second data unit may be transmitted using one or more second OFDM symbols different than the one or more first OFDM symbols.

Another innovative aspect of the subject matter described in this disclosure can be implemented as a method for wireless communication. The method may be performed by a wireless access point (AP), and may include transmitting a first trigger frame that solicits uplink (UL) data from a plurality of wireless stations (STAs); receiving first data units from one or more STAs of the plurality of STAs; transmitting a first hybrid automatic repeat request (HARQ) feedback frame to at least one STA of the one or more STAs, the first HARQ feedback frame indicating that a portion of the first data unit transmitted from the at least one STA was not successfully decoded; receiving, from the at least one STA, a retransmission of the indicated portion of the first data unit based at least in part on the first HARQ feedback frame; and receiving one or more second data units from the at least one STA concurrently with receiving the retransmission of the indicated portion of the first data unit, the one or more second data units different than the first data unit. In some implementations, the method may also include transmitting a block acknowledgement (BA) frame to the at least one STA, the BA frame confirming reception of the indicated portion of the first data unit and the one or more second data units. In some instances, transmission of the first HARQ feedback frame, retransmission of the indicated portion of the first data unit, and transmission of the one or more second data units correspond to a same HARQ sequence, and transmission of the BA frame corresponds to an automatic repeat request (ARQ) sequence.

In some implementations, the indicated portion of the first data unit and the one or more second data units may be aggregated in a single packet. In some instances, the first data unit may include a physical-layer service data unit (PSDU) including a plurality of low-density parity check (LDPC) codewords, and the indicated portion may include a subset of the plurality of LDPC codewords. In some other instances, the first data unit may include a first physical-layer service data unit (PSDU), the indicated portion may include one or more medium access control protocol data units (MPDUs) associated with the first PSDU, each of the one or more second data units may include a second PSDU, and the single packet may include a physical-layer protocol data unit (PPDU) containing at least the one or more MPDUs associated with the first PSDU and the second PSDU. In some implementations, the PPDU may include an aggregated medium access control protocol data unit (A-MPDU) containing the one or more MPDUs associated with the first PSDU and one or more MPDUs associated with the second PSDU.

In some implementations, the indicated portion of the first data unit may be transmitted using one or more first resource units (RUs), and the one or more second data units are transmitted using one or more second RUs different than the one or more first RUs. In some other implementations, the indicated portion of the first data unit may be transmitted using a first set spatial streams, and the one or more second data units are transmitted using a second set of spatial streams different than the first set of first spatial streams. In some other implementations, the indicated portion of the first data unit may be transmitted using one or more first orthogonal frequency division multiplexing (OFDM) symbols, and the one or more second data units are transmitted using one or more second OFDM symbols different than the one or more first OFDM symbols.

In some implementations, the method may also include transmitting a first downlink (DL) multi-user (MU) packet to at least a first STA and a second STA, the DL MU packet including a first DL data unit for the first STA and including a second DL data unit for the second STA; receiving a first uplink (UL) MU packet including at least a first UL HARQ feedback frame indicating portions of the first DL data unit that were not successfully decoded by the first STA and a second UL HARQ feedback frame indicating portions of the second DL data unit that were not successfully decoded by the second STA; and retransmitting the indicated portions of the first and second data units in a second DL MU packet based on receiving the first and second HARQ feedback frames. In some instances, the first DL MU packet may include a first trigger frame that solicits transmission of the first and second UL HARQ feedback frames, and the second DL MU packet may include a second trigger frame that solicits transmission of acknowledgment (ACK) frames confirming reception of the retransmitted portions of the first and second data units.

Another innovative aspect of the subject matter described in this disclosure can be implemented in a wireless access point (AP). The AP may include at least one modem, at least one processor communicatively coupled with the at least one modem, and at least one memory communicatively coupled with the at least one processor. The at least one memory may store processor-readable code that, when executed by the at least one processor, causes the AP to transmit a first trigger frame that solicits uplink (UL) data from a plurality of wireless stations (STAs); receive first data units from one or more STAs of the plurality of STAs; transmit a first hybrid automatic repeat request (HARQ) feedback frame to at least one STA of the one or more STAs, the first HARQ feedback frame indicating that a portion of the first data unit transmitted from the at least one STA was not successfully decoded; receive, from the at least one STA, a retransmission of the indicated portion of the first data unit based at least in part on the first HARQ feedback frame; and receive one or more second data units from the at least one STA concurrently with receiving the retransmission of the indicated portion of the first data unit, the one or more second data units different than the first data unit. In some implementations, execution of the processor-readable code may further cause the AP to transmit a block acknowledgement (BA) frame to the at least one STA, the BA frame confirming reception of the indicated portion of the first data unit and the one or more second data units. In some instances, transmission of the first HARQ feedback frame, retransmission of the indicated portion of the first data unit, and transmission of the one or more second data units correspond to a same HARQ sequence, and transmission of the BA frame corresponds to an automatic repeat request (ARQ) sequence.

In some implementations, the indicated portion of the first data unit and the one or more second data units may be aggregated in a single packet. In some instances, the first data unit may include a physical-layer service data unit (PSDU) including a plurality of low-density parity check (LDPC) codewords, and the indicated portion may include a subset of the plurality of LDPC codewords. In some other instances, the first data unit may include a first physical-layer service data unit (PSDU), the indicated portion may include one or more medium access control protocol data units (MPDUs) associated with the first PSDU, each of the one or more second data units may include a second PSDU, and the single packet may include a physical-layer protocol data unit (PPDU) containing at least the one or more MPDUs associated with the first PSDU and the second PSDU. In some implementations, the PPDU may include an aggregated medium access control protocol data unit (A-MPDU) containing the one or more MPDUs associated with the first PSDU and one or more MPDUs associated with the second PSDU.

In some implementations, the indicated portion of the first data unit may be transmitted using one or more first resource units (RUs), and the one or more second data units are transmitted using one or more second RUs different than the one or more first RUs. In some other implementations, the indicated portion of the first data unit may be transmitted using a first set spatial streams, and the one or more second data units are transmitted using a second set of spatial streams different than the first set of first spatial streams. In some other implementations, the indicated portion of the first data unit may be transmitted using one or more first orthogonal frequency division multiplexing (OFDM) symbols, and the one or more second data units are transmitted using one or more second OFDM symbols different than the one or more first OFDM symbols.

In some implementations, execution of the processor-readable code may further cause the AP to transmit a first downlink (DL) multi-user (MU) packet to at least a first STA and a second STA, the DL MU packet including a first DL data unit for the first STA and including a second DL data unit for the second STA; receive a first uplink (UL) MU packet including at least a first UL HARQ feedback frame indicating portions of the first DL data unit that were not successfully decoded by the first STA and a second UL HARQ feedback frame indicating portions of the second DL data unit that were not successfully decoded by the second STA; and retransmit the indicated portions of the first and second data units in a second DL MU packet based on receiving the first and second HARQ feedback frames. In some instances, the first DL MU packet may include a first trigger frame that solicits transmission of the first and second UL HARQ feedback frames, and the second DL MU packet may include a second trigger frame that solicits transmission of acknowledgment (ACK) frames confirming reception of the retransmitted portions of the first and second data units.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

FIG. 13D shows a flowchart illustrating an example process for wireless communication that supports HARQ and ARQ techniques according to some other implementations.

Like reference numbers and designations in the various drawings indicate like elements.

DETAILED DESCRIPTION

Figure 1:
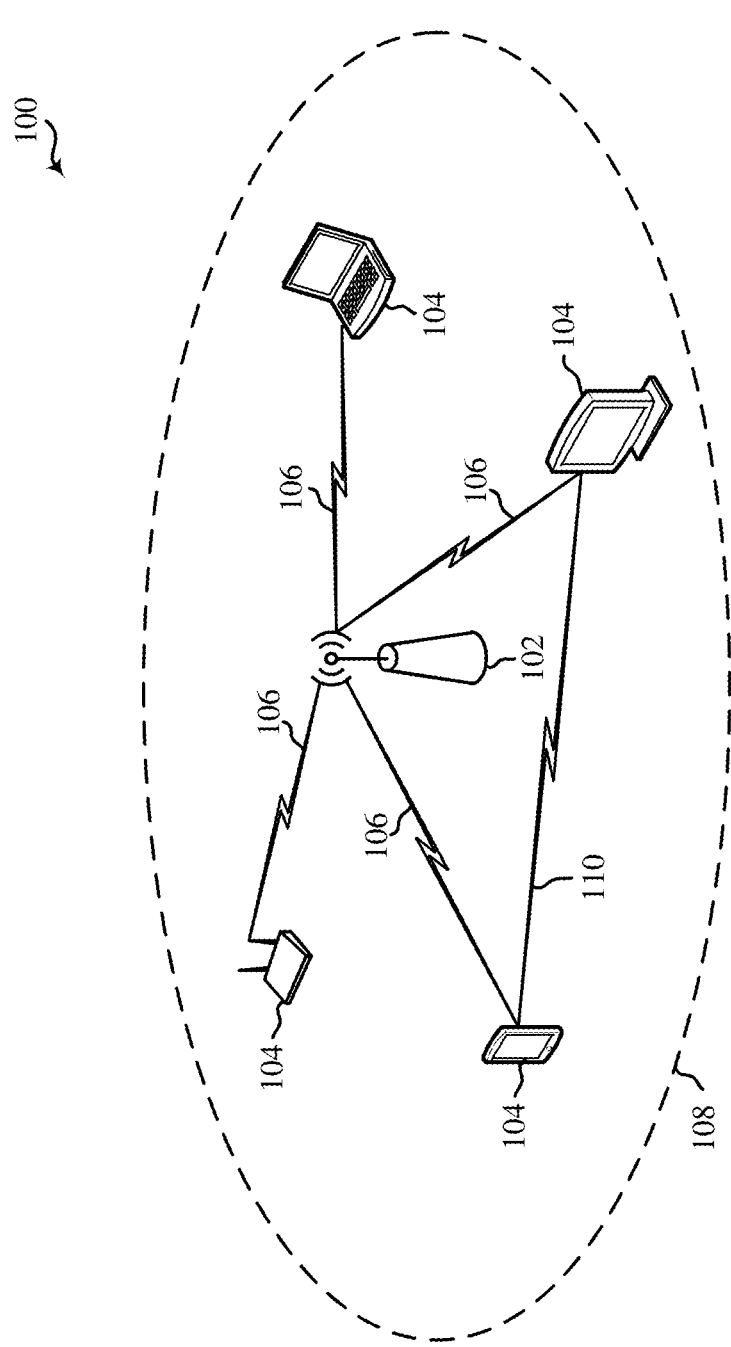
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Various implementations relate generally to retransmitting data that was received in error (such as unsuccessfully decoded or not received at all) by a receiving device. Some implementations more specifically relate to using hybrid automatic repeat request (HARQ) techniques for retransmitting portions of data that were not successfully decoded (or not received) by one or more wireless devices compatible with the IEEE 802.11 family of standards. In some implementations, a receiving device that does not successfully decode a portion of a first data unit received from a transmitting device may transmit a HARQ feedback frame indicating the portion of the first data unit that was not successfully decoded. Upon receiving the HARQ feedback frame, the transmitting device may retransmit the indicated portion of the first data unit. The receiving device may store portions of the first data unit that were successfully decoded, and combine the stored portions of the first data unit with the retransmitted portion to recover the first data unit as initially transmitted. In this manner, the transmitting device may retransmit only those portions indicated as not successfully decoded by the receiving device, rather than the entire first data unit, thereby reducing the size of the retransmission (or the number of retransmissions) needed by the receiving device to properly reconstruct the transmitted data.

In some implementations, the first data unit may be transmitted as a plurality of low-density parity check (LDPC) codewords each containing one or more information bits and one or more parity bits. The information bits may represent data associated with the first data unit, and the parity bits may, in some instances, be used to correct errors in the corresponding codeword. In some aspects, the transmitting device may retransmit a subset of the codewords corresponding to the indicated portion of the first data unit.

In some implementations, the HARQ feedback frame may include one or more acknowledgements (ACKs) to indicate that corresponding units of data were successfully decoded, may include one or more negative acknowledgements (NACKs) to indicate that corresponding units of data were not successfully decoded (or not received at all), or both. In some other implementations, the HARQ feedback frame may include a bitmap identifying one or more medium access control (MAC) protocol data units (MPDUs) of a data transmission that were not successfully decoded by the receiving device, may include a bitmap identifying one or more codewords of the data transmission that were not successfully decoded, or both. In some instances, the receiving device may separately acknowledge receipt of each MPDU by transmitting an ACK frame to the transmitting device. In some other instances, the transmitting device and the receiving device may establish a block acknowledgement (BA) session that allows the receiving device to acknowledge receipt of multiple data frames or aggregated MPDUs using a single BA frame.

In some implementations, the transmitting device may transmit a second data unit to the receiving device concurrently with the retransmission of the indicated portion of the first data unit. The indicated portion of the first data unit and the second data unit may be transmitted to the receiving device concurrently (such as in the same packet) using single-user (SU) multiple-input, multiple-output (MIMO) communications, using multi-user (MU) MIMO communications, or using orthogonal frequency division multiple access (OFDMA) communications. For implementations in which the transmitting device uses SU-MIMO or MU-MIMO for data retransmissions, the indicated portion of the first data unit may be transmitted using a first set of spatial streams, and the second data unit may be transmitted using a second set of spatial streams different than the first set of spatial streams. For implementations in which the transmitting device uses OFDMA for data retransmissions, the indicated portion of the first data unit may be transmitted using one or more first resource units (RUs), and the second data unit may be transmitted using one or more second RUs different than the one or more first RUs. In addition, or in the alternative, the indicated portion of the first data unit may be transmitted using one or more first OFDM symbols, and the second data unit may be transmitted using one or more second OFDM symbols different than the one or more first OFDM symbols.

Particular implementations of the subject matter described in this disclosure can be implemented to realize one or more of the following potential advantages. When an initial data transmission includes one or more portions that were not successfully decoded by the receiving device, the transmitting device may retransmit only those portions indicated by the receiving device as not being successfully decoded, thereby reducing the size of the retransmission (or the number of retransmissions) needed by the receiving device to properly reconstruct the transmitted data. Also, by allowing the transmitting device to transmit new data concurrently with the retransmission of the indicated portions of previously transmitted data, implementations of the subject matter described in this disclosure may increase data throughput and reduce latencies. In particular, although the retransmitted data is a subset of the initial data transmission (and is thus smaller than the initial data transmission), the overhead associated with data retransmissions may be similar to the overhead associated with the initial data transmission. For example, because the size of a packet's preamble may remain relatively constant irrespective of the size of the packet's payload, the ability to insert new data into a packet containing portions of previously transmitted data (such as for HARQ-related data retransmissions) may avoid the need to transmit a separate packet containing the new data, thereby reducing overhead associated with transmitting the new data to one or more receiving devices.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
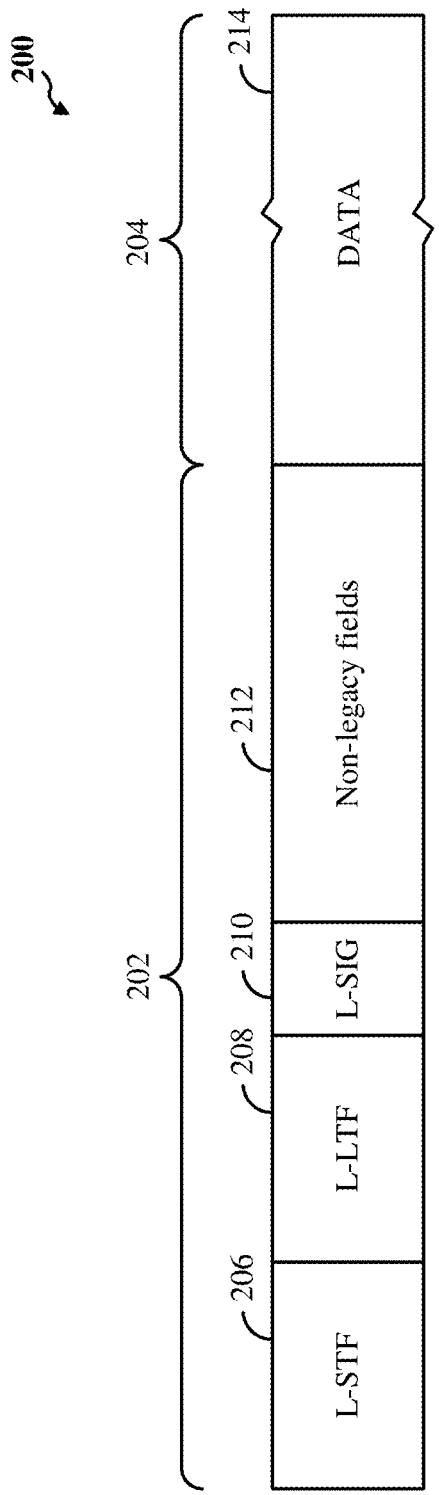
FIG. 2A shows an example protocol data unit (PDU) usable for communications between an access point (AP) and one or more stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
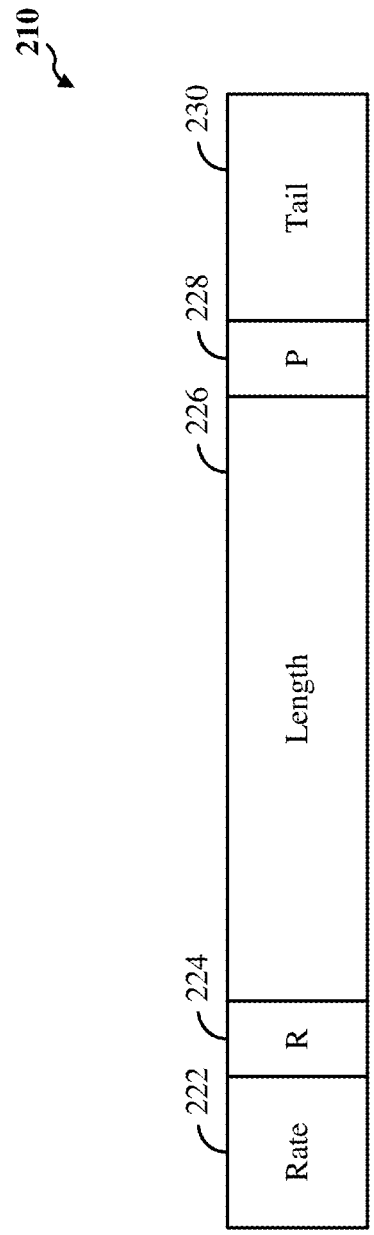
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3A:
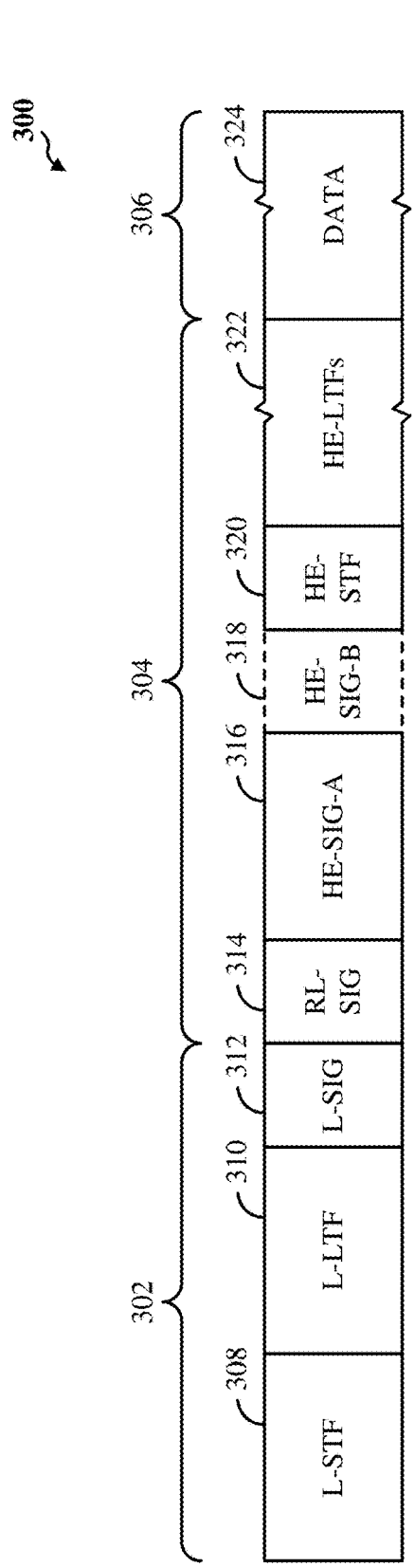
FIG. 3A shows an example PDU usable for communications between an AP and one or more STAs.

FIG. 3A shows another example PDU 300 usable for wireless communication between an AP and one or more STAs. The PDU 300 may be used for SU, OFDMA or MU-MIMO transmissions. The PDU 300 may be formatted as a High Efficiency (HE) WLAN PPDU in accordance with the IEEE 802.11ax amendment to the IEEE 802.11 wireless communication protocol standard. The PDU 300 includes a PHY preamble including a legacy portion 302 and a non-legacy portion 304. The PDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

Figure 3B:
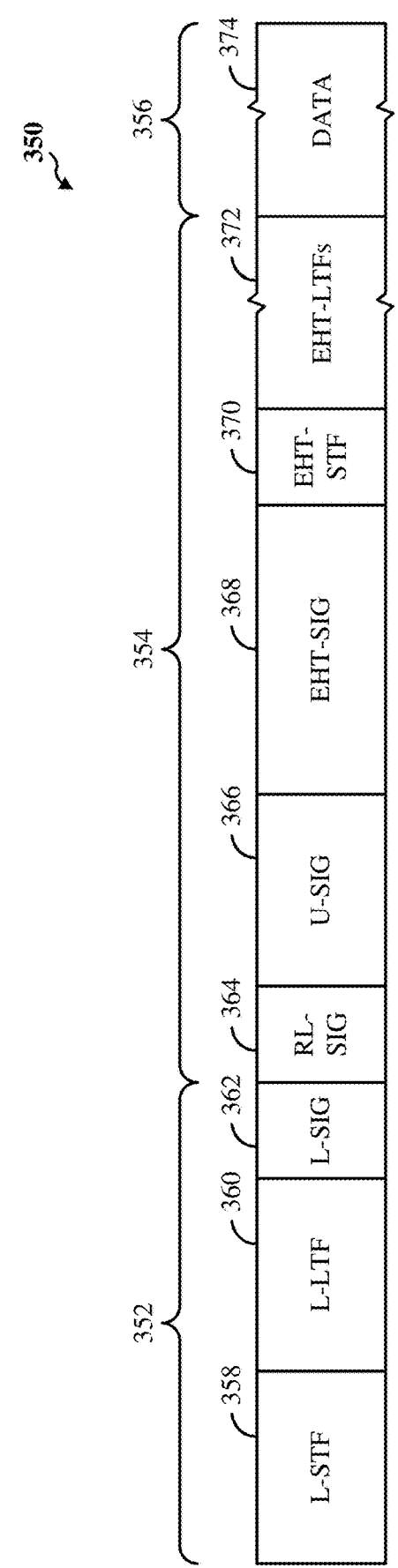
FIG. 3B shows another example PDU usable for communications between an AP and one or more STAs.
Figure 4:
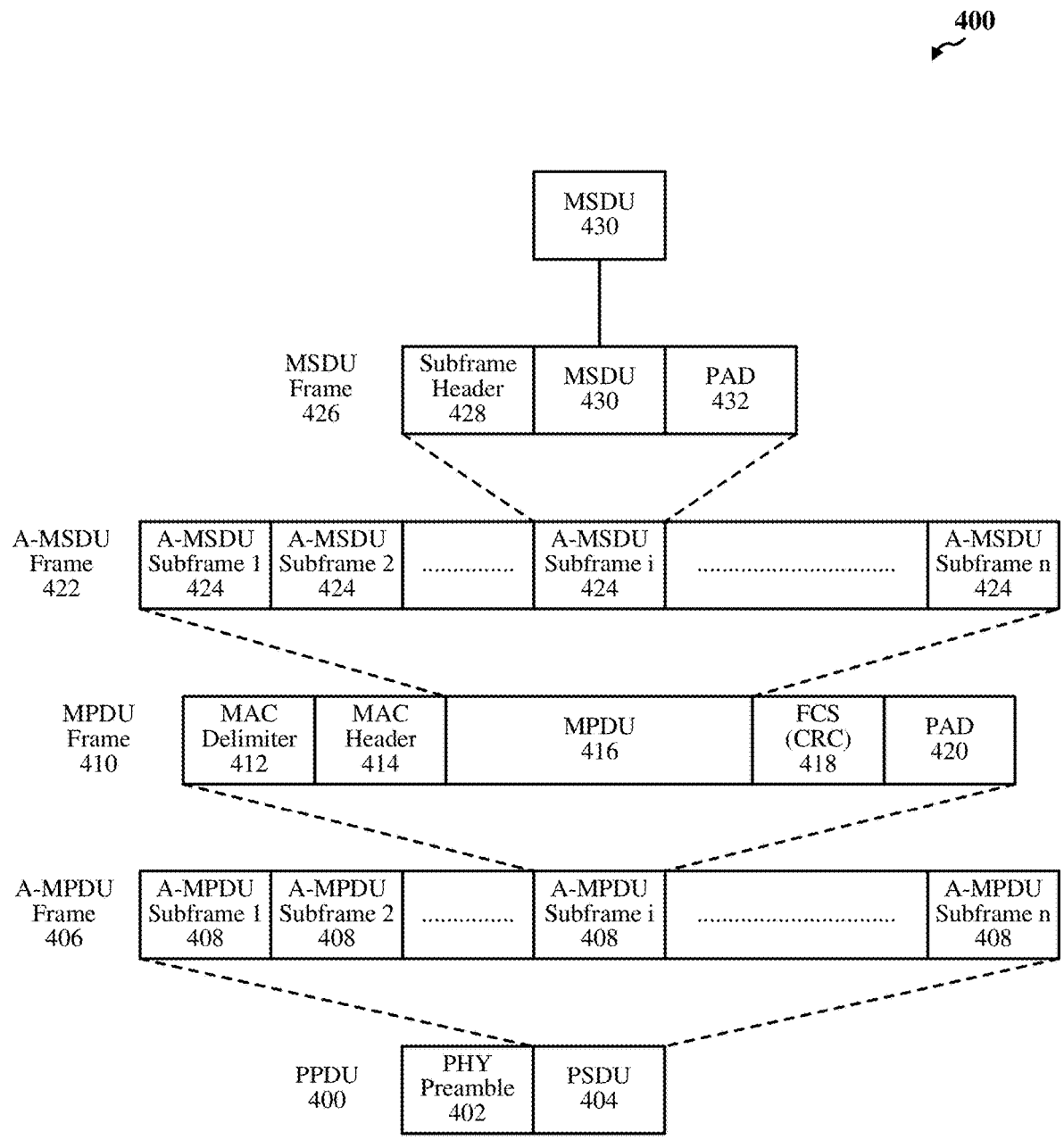
FIG. 4 shows an example PHY protocol data unit (PPDU) usable for communications between an AP and one or more STAs.

FIG. 3B shows another example PPDU 350 usable for wireless communication between an AP and one or more STAs. The PDU 350 may be used for SU, OFDMA or MU-MIMO transmissions. The PDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PDU 350 includes a PHY preamble including a legacy portion 352 and a non-legacy portion 354. The PDU 350 may further include a PHY payload 356 after the preamble, for example, in the form of a PSDU including a data field 376.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 372 (referred to herein as "EHT-STF 372," although it may be structured as, and carry version-dependent information for, other wireless communication protocol versions beyond EHT) and one or more additional long training fields 374 (referred to herein as "EHT-LTFs 374," although they may be structured as, and carry version-dependent information for, other wireless communication protocol versions beyond EHT). Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 376. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 376. In the context of DL MU-OFDMA, such information enables the respective STAs 104 to identify and decode corresponding RUs in the associated data field 376. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 376.

Figure DDD shows an example PPDU DDD00 usable for communications between an AP 102 and one or more STAs 104. As described above, each PPDU DDD00 includes a PHY preamble DDD02 and a PSDU DDD04. Each PSDU DDD04 may represent (or "carry") one or more MAC protocol data units (MPDUs) DDD16. For example, each PSDU DDD04 may carry an aggregated MPDU (A-MPDU) DDD06 that includes an aggregation of multiple A-MPDU subframes DDD08. Each A-MPDU subframe DDD06 may include an MPDU frame DDD10 that includes a MAC delimiter DDD12 and a MAC header DDD14 prior to the accompanying MPDU DDD16, which includes the data portion ("payload" or "frame body") of the MPDU frame DDD10. Each MPDU frame DDD10 may also include a frame check sequence (FCS) field DDD18 for error detection (for example, the FCS field may include a cyclic redundancy check (CRC)) and padding bits DDD20. The MPDU DDD16 may carry one or more MAC service data units (MSDUs) DDD16. For example, the MPDU DDD16 may carry an aggregated MSDU (A-MSDU) DDD22 including multiple A-MSDU subframes DDD24. Each A-MSDU subframe DDD24 contains a corresponding MSDU DDD30 preceded by a subframe header DDD28 and in some cases followed by padding bits DDD32.

Referring back to the MPDU frame DDD10, the MAC delimiter DDD12 may serve as a marker of the start of the associated MPDU DDD16 and indicate the length of the associated MPDU DDD16. The MAC header DDD14 may include multiple fields containing information that defines or indicates characteristics or attributes of data encapsulated within the frame body DDD16. The MAC header DDD14 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header DDD14 also includes one or more fields indicating addresses for the data encapsulated within the frame body DDD16. For example, the MAC header DDD14 may include a combination of a source address, a transmitter address, a receiver address or a destination address. The MAC header DDD14 may further include a frame control field containing control information. The frame control field may specify a frame type, for example, a data frame, a control frame, or a management frame.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 74 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

APs and STAs that include multiple antennas may support various diversity schemes. For example, spatial diversity may be used by one or both of a transmitting device or a receiving device to increase the robustness of a transmission. For example, to implement a transmit diversity scheme, a transmitting device may transmit the same data redundantly over two or more antennas. APs and STAs that include multiple antennas may also support space-time block coding (STBC). With STBC, a transmitting device also transmits multiple copies of a data stream across a number of antennas to exploit the various received versions of the data to increase the likelihood of decoding the correct data. More specifically, the data stream to be transmitted is encoded in blocks, which are distributed among the spaced antennas and across time. Generally, STBC can be used when the number $N_{Tx}$ of transmit antennas exceeds the number $N_{SS}$ of spatial streams (described below). The $N_{SS}$ spatial streams may be mapped to a number $N_{STS}$ of space-time streams, which are then mapped to $N_{Tx}$ transmit chains.

APs and STAs that include multiple antennas may also support spatial multiplexing, which may be used to increase the spectral efficiency and the resultant throughput of a transmission. To implement spatial multiplexing, the transmitting device divides the data stream into a number $N_{SS}$ of separate, independent spatial streams. The spatial streams are then separately encoded and transmitted in parallel via the multiple $N_{Tx}$ transmit antennas. If the transmitting device includes $N_{Tx}$ transmit antennas and the receiving device includes $N_{Rx}$ receive antennas, the maximum number $N_{SS}$ of spatial streams that the transmitting device can simultaneously transmit to the receiving device is limited by the lesser of $N_{Tx}$ and $N_{Rx}$. In some implementations, the AP 102 and STAs 104 may be able to implement both transmit diversity as well as spatial multiplexing. For example, in instances in which the number $N_{SS}$ of spatial streams is less than the number $N_{Tx}$ of transmit antennas, the spatial streams may be multiplied by a spatial expansion matrix to achieve transmit diversity.

APs and STAs that include multiple antennas may also support beamforming. Beamforming refers to the focusing of the energy of a transmission in the direction of a target receiver. Beamforming may be used both in a single-user context, for example, to improve a signal-to-noise ratio (SNR), as well as in a multi-user (MU) context, for example, to enable MU multiple-input multiple-output (MIMO) (MU-MIMO) transmissions (also referred to as spatial division multiple access (SDMA)). To perform beamforming, a transmitting device, referred to as the beamformer, transmits a signal from each of multiple antennas. The beamformer configures the amplitudes and phase shifts between the signals transmitted from the different antennas such that the signals add constructively along particular directions towards the intended receiver, which is referred to as a beamformee. The manner in which the beamformer configures the amplitudes and phase shifts depends on channel state information (CSI) associated with the wireless channels over which the beamformer intends to communicate with the beamformee.

To obtain the CSI necessary for beamforming, the beamformer may perform a channel sounding procedure with the beamformee. For example, the beamformer may transmit one or more sounding signals (for example, in the form of a null data packet (NDP)) to the beamformee. The beamformee may then perform measurements for each of the $N_{Tx} \times N_{Rx}$ sub-channels corresponding to all of the transmit antenna and receive antenna pairs based on the sounding signal. The beamformee generates a feedback matrix based on the channel measurements and, typically, compresses the feedback matrix before transmitting the feedback to the beamformer. The beamformer may then generate a precoding (or "steering") matrix for the beamformee based on the feedback and use the steering matrix to precode the data streams to configure the amplitudes and phase shifts for subsequent transmissions to the beamformee.

Figure 5:
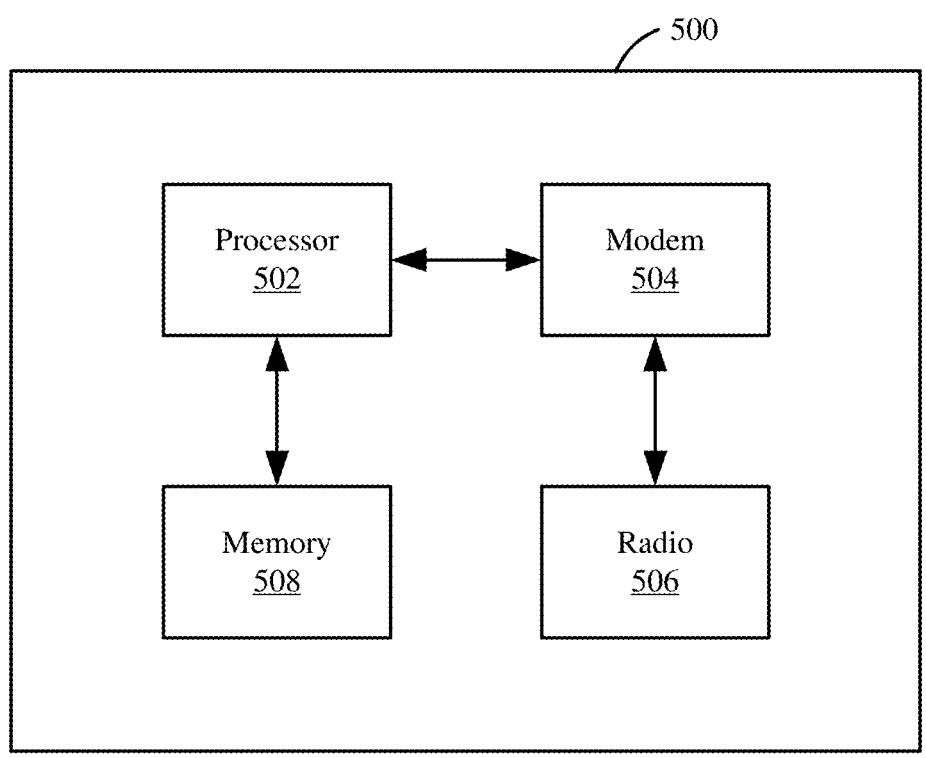
FIG. 5 shows a block diagram of an example wireless communication device.

FIG. 5 shows a block diagram of an example wireless communication device 500. In some implementations, the wireless communication device 500 can be an example of a device for use in a STA such as one of the STAs 104 described above with reference to FIG. 1. In some implementations, the wireless communication device 500 can be an example of a device for use in an AP such as the AP 102 described above with reference to FIG. 1. The wireless communication device 500 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 500 can be, or can include, a chip, system on chip (SoC), chipset, package or device that includes one or more modems 502, for example, a Wi-Fi (IEEE 802.11 compliant) modem. In some implementations, the one or more modems 502 (collectively "the modem 502") additionally include a WWAN modem (for example, a 3GPP 4G LTE or 5G compliant modem). In some implementations, the wireless communication device 500 also includes one or more processors, processing blocks or processing elements 504 (collectively "the processor 504") coupled with the modem 502. In some implementations, the wireless communication device 500 additionally includes one or more radios 506 (collectively "the radio 506") coupled with the modem 502. In some implementations, the wireless communication device 500 further includes one or more memory blocks or elements 508 (collectively "the memory 508") coupled with the processor 504 or the modem 502.

The modem 502 can include an intelligent hardware block or device such as, for example, an application-specific integrated circuit (ASIC), among other examples. The modem 502 is generally configured to implement a PHY layer, and in some implementations, also a portion of a MAC layer (for example, a hardware portion of the MAC layer). For example, the modem 502 is configured to modulate packets and to output the modulated packets to the radio 504 for transmission over the wireless medium. The modem 502 is similarly configured to obtain modulated packets received by the radio 504 and to demodulate the packets to provide demodulated packets. In addition to a modulator and a demodulator, the modem 502 may further include digital signal processing (DSP) circuitry, automatic gain control (AGC) circuitry, a coder, a decoder, a multiplexer and a demultiplexer. For example, while in a transmission mode, data obtained from the processor 506 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 504. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 504, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 506) for processing, evaluation or interpretation.

The radio 504 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 500 can include, or be coupled with, multiple transmit antennas (each with a corresponding transmit chain) and multiple receive antennas (each with a corresponding receive chain). The symbols output from the modem 502 are provided to the radio 504, which then transmits the symbols via the coupled antennas. Similarly, symbols received via the antennas are obtained by the radio 504, which then provides the symbols to the modem 502.

The processor 506 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 506 processes information received through the radio 504 and the modem 502, and processes information to be output through the modem 502 and the radio 504 for transmission through the wireless medium. For example, the processor 506 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 506 may generally control the modem 502 to cause the modem to perform various operations described above.

The memory 504 can include tangible storage media such as random-access memory (RAM) or read-only memory (ROM), or combinations thereof. The memory 504 also can store non-transitory processor- or computer-executable software (SW) code containing instructions that, when executed by the processor 506, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 6B:
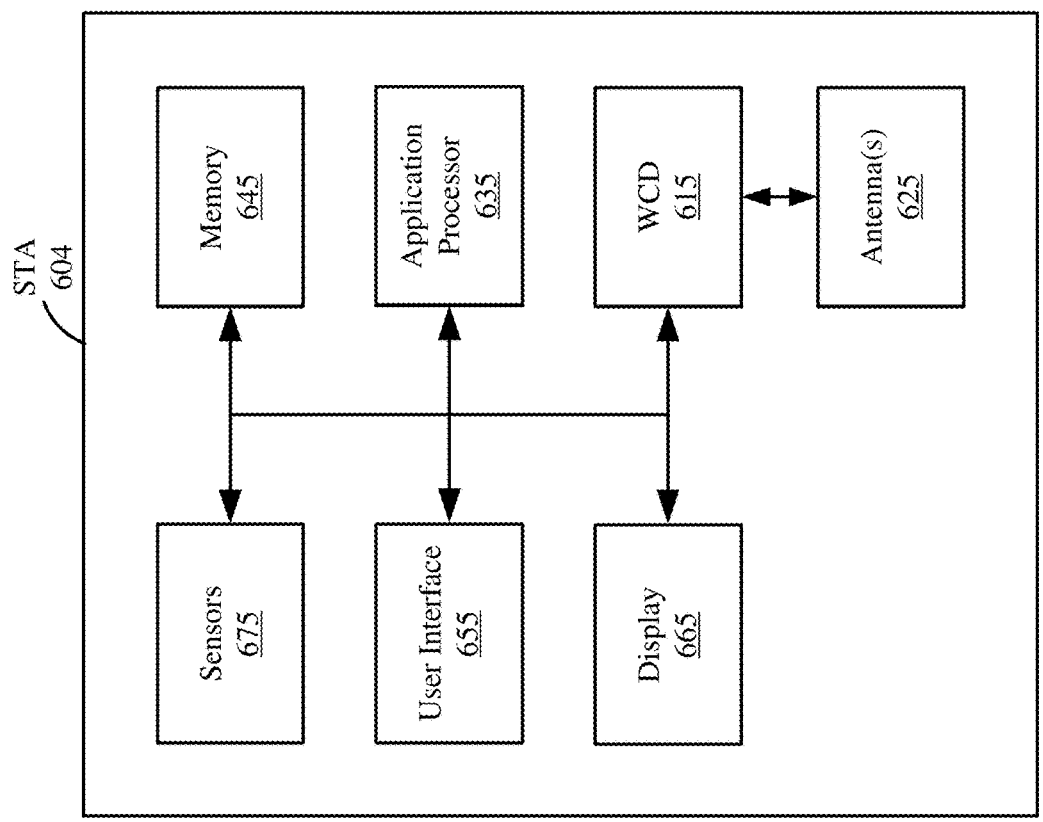
FIG. 6B shows a block diagram of an example STA.
Figure 6A:
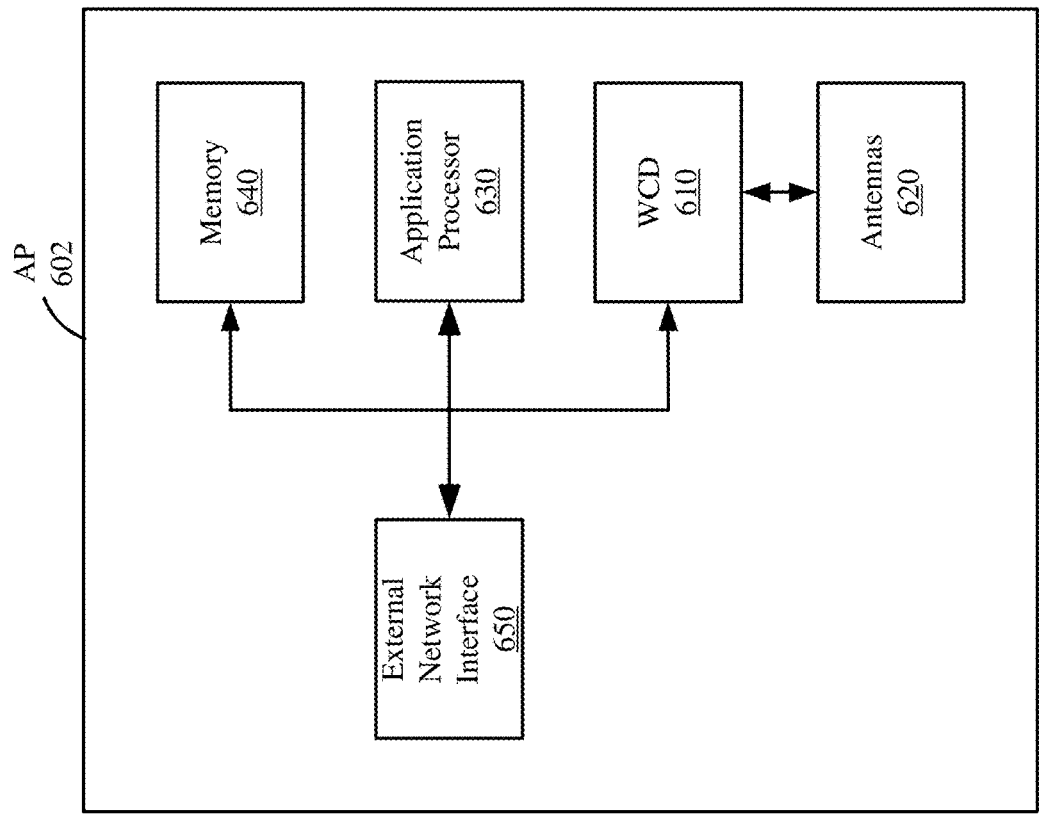
FIG. 6A shows a block diagram of an example AP.

FIG. 6A shows a block diagram of an example AP 602. For example, the AP 602 can be an example implementation of the AP 102 described with reference to FIG. 1. The AP 602 includes a wireless communication device (WCD) 610 (although the AP 602 may itself also be referred to generally as a wireless communication device as used herein). For example, the wireless communication device 610 may be an example implementation of the wireless communication device 5000 described with reference to FIG. 5. The AP 602 also includes multiple antennas 620 coupled with the wireless communication device 610 to transmit and receive wireless communications. In some implementations, the AP 602 additionally includes an application processor 630 coupled with the wireless communication device 610, and a memory 640 coupled with the application processor 630. The AP 602 further includes at least one external network interface 650 that enables the AP 602 to communicate with a core network or backhaul network to gain access to external networks including the Internet. For example, the external network interface 650 may include one or both of a wired (for example, Ethernet) network interface and a wireless network interface (such as a WWAN interface). Ones of the aforementioned components can communicate with other ones of the components directly or indirectly, over at least one bus. The AP 602 further includes a housing that encompasses the wireless communication device 610, the application processor 630, the memory 640, and at least portions of the antennas 620 and external network interface 650.

FIG. 6B shows a block diagram of an example STA 604. For example, the STA 604 can be an example implementation of the STA 104 described with reference to FIG. 1. The STA 604 includes a wireless communication device 615 (although the STA 604 may itself also be referred to generally as a wireless communication device as used herein). For example, the wireless communication device 615 may be an example implementation of the wireless communication device 500 described with reference to FIG. 5. The STA 604 also includes one or more antennas 625 coupled with the wireless communication device 615 to transmit and receive wireless communications. The STA 604 additionally includes an application processor 635 coupled with the wireless communication device 615, and a memory 645 coupled with the application processor 635. In some implementations, the STA 604 further includes a user interface (UI) 655 (such as a touchscreen or keypad) and a display 665, which may be integrated with the UI 655 to form a touchscreen display. In some implementations, the STA 604 may further include one or more sensors 675 such as, for example, one or more inertial sensors, accelerometers, temperature sensors, pressure sensors, or altitude sensors. Ones of the aforementioned components can communicate with other ones of the components directly or indirectly, over at least one bus. The STA 604 further includes a housing that encompasses the wireless communication device 615, the application processor 635, the memory 645, and at least portions of the antennas 625, UI 655, and display 665.

As described above, retransmitting data that was not successfully decoded (or received) by a receiving device consumes resources of a shared wireless medium, which may reduce the throughput of a wireless network. Moreover, because channel conditions associated with data retransmissions may be similar to channel conditions associated with the initial data transmission (such as a noisy channel, a busy channel, or a faded channel), multiple retransmissions of unsuccessfully decoded data may be necessary for the receiving device to successfully receive and decode all of the data associated with the initial transmission, which may consume limited resources of the shared wireless medium.

Various implementations relate generally to retransmitting data that was received in error (such as unsuccessfully decoded or not received at all) by a receiving device. Some implementations more specifically relate to using hybrid automatic repeat request (HARQ) techniques for retransmitting portions of data that were not successfully decoded (or not received) by one or more wireless devices compatible with the IEEE 802.11 family of standards. In some implementations, a receiving device that does not successfully decode a portion of a first data unit received from a transmitting device may transmit a HARQ feedback frame indicating the portion of the first data unit that was not successfully decoded. Upon receiving the HARQ feedback frame, the transmitting device may retransmit the indicated portion of the first data unit. The receiving device may store portions of the first data unit that were successfully decoded, and combine the stored portions of the first data unit with the retransmitted portion to recover the first data unit as initially transmitted.

In some implementations, the first data unit may be transmitted as a plurality of low-density parity check (LDPC) codewords each containing a number of information bits and a number of parity bits. The information bits may represent data associated with the first data unit, and the parity bits may, in some instances, be used to correct the corresponding codeword. In some aspects, the transmitting device may retransmit a subset of the codewords corresponding to the indicated portion of the first data unit.

The HARQ feedback frame may include one or more acknowledgements (ACKs) to indicate that corresponding units of data were successfully decoded, may include one or more negative acknowledgements (NACKs) to indicate that corresponding units of data were not successfully decoded (or not received at all), may include a bitmap indicating which portions of a data transmission were not successfully decoded (or not received at all), or any combination thereof. In some implementations, the HARQ feedback frame may include a bitmap identifying one or more medium access control (MAC) protocol data units (MPDUs) of a data transmission that were not successfully decoded by the receiving device, may include a bitmap identifying one or more codewords of the data transmission that were not successfully decoded, or both. In some other instances, the receiving device may separately acknowledge receipt of each data frame or MPDU by transmitting an ACK frame to the transmitting device. In some other instances, the transmitting device and the receiving device may establish a block acknowledgement (BA) session that allows the receiving device to acknowledge receipt of multiple data frames or aggregated MPDUs using a single BA frame.

In some implementations, the transmitting device may transmit a second data unit to the receiving device concurrently with the retransmission of the indicated portion of the first data unit. The indicated portion of the first data unit and the second data unit may be transmitted to the receiving device concurrently (such as in the same packet) using single-user (SU) multiple-input, multiple-output (MIMO) communications, using multi-user (MU) MIMO communications, or using orthogonal frequency division multiple access (OFDMA) communications. For implementations in which the transmitting device uses SU-MIMO or MU-MIMO for data retransmissions, the indicated portion of the first data unit may be transmitted using a first set of spatial streams, and the second data unit may be transmitted using a second set of spatial streams different than the first set of spatial streams. For implementations in which the transmitting device uses OFDMA for data retransmissions, the indicated portion of the first data unit may be transmitted using a first resource unit (RU) (or a first group of RUs), and the second data unit may be transmitted using a second RU (or a second group of RUs) different than the first RU (or different than the first group of RUs). In addition, or in the alternative, the indicated portion of the first data unit may be transmitted using a first set of OFDM symbols, and the second data unit may be transmitted using a second set of OFDM symbols different than the first set of OFDM symbols.

Particular implementations of the subject matter described in this disclosure can be implemented to realize one or more of the following potential advantages. When an initial data transmission includes one or more portions that were not successfully decoded by the receiving device, the transmitting device may retransmit only those portions indicated by the receiving device as not being successfully decoded, thereby reducing the number of data retransmissions. Also, by allowing the transmitting device to transmit new data concurrently with the retransmission of the indicated portions of previously transmitted data, implementations of the subject matter described in this disclosure may increase data throughput and reduce latencies. In particular, although the retransmitted data is a subset of the initial data transmission (and is thus smaller than the initial data transmission), the overhead associated with data retransmissions may be similar to the overhead associated with the initial data transmission. For example, because the size of a packet's preamble may remain relatively constant irrespective of the size of the packet's payload, the ability to insert new data into a packet containing portions of previously transmitted data (such as for HARQ-related data retransmissions) may avoid the need to transmit a separate packet containing the new data, thereby reducing overhead associated with transmitting the new data to one or more receiving devices.

Figure 7A:
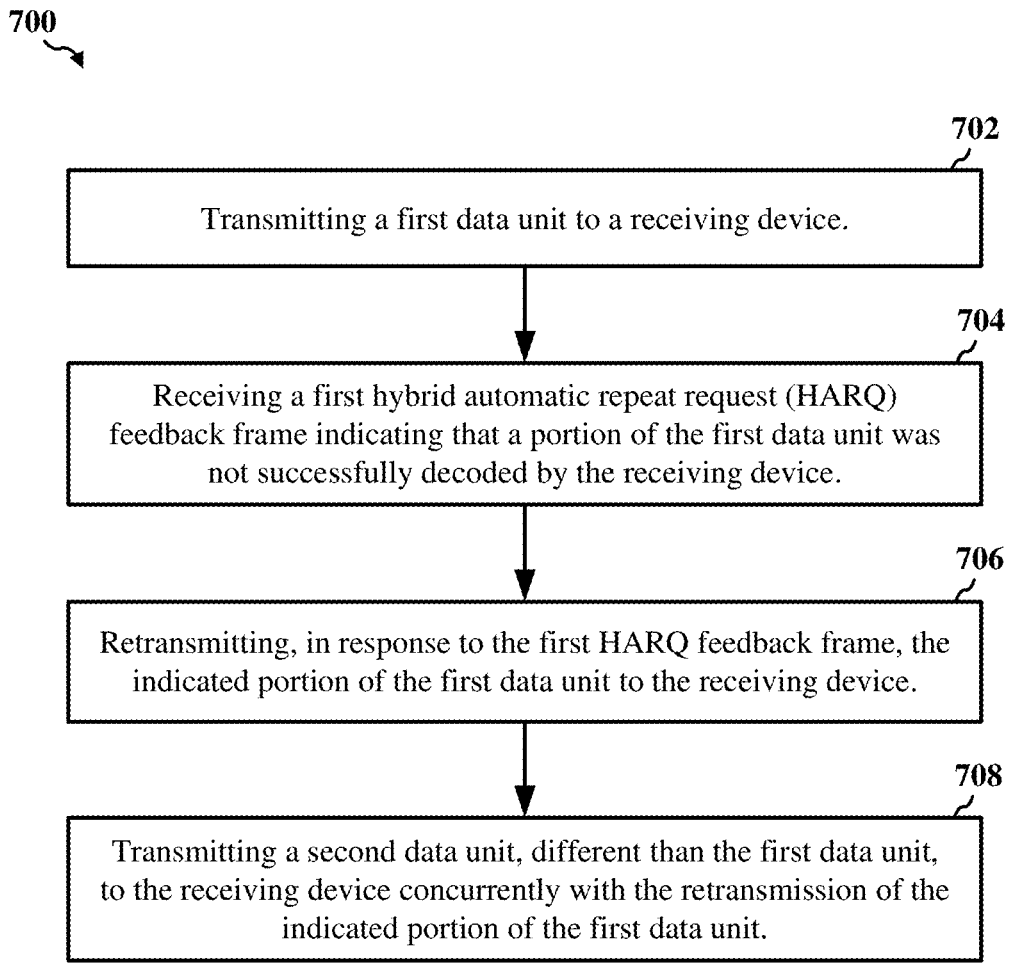
FIG. 7A shows a flowchart illustrating an example process for wireless communication that supports hybrid automatic repeat request (HARQ) techniques according to some implementations.

FIG. 7A shows a flowchart illustrating an example process 700 for wireless communication that supports HARQ techniques according to some implementations. The process 700 may be performed by a wireless communication device such as the wireless communication device 500 described above with reference to FIG. 5. In some implementations, the process 700 may be performed by a wireless communication device operating as or within a STA, such as one of the STAs 104 and 604 described above with reference to FIGS. 1 and 6B, respectively.

In some implementations, the process 700 begins in block 702 with transmitting a first data unit to a receiving device. In block 704, the process 700 proceeds with receiving a first hybrid automatic repeat request (HARQ) feedback frame indicating that a portion of the first data unit was not successfully decoded by the receiving device. In block 706, the process 700 proceeds with retransmitting, in response to the first HARQ feedback frame, the indicated portion of the first data unit to the receiving device. In block 708, the process 700 proceeds with transmitting a second data unit, different than the first data unit, to the receiving device concurrently with the retransmission of the indicated portion of the first data unit.

In some implementations, the first data unit transmitted in block 702 may be contained in a first PSDU including one or more first MPDUs that can be encoded as a plurality of first LDPC codewords. The first LDPC codewords may include information bits that represent the first data unit, and may include parity bits that can be used to correct corresponding codewords of the first data unit. Similarly, in some implementations, the second data unit transmitted in block 708 may be contained in a second PSDU including one or more second MPDUs that can be encoded as a plurality of second LDPC codewords. The second LDPC codewords may include information bits that represent the second data unit, and may include parity bits that can be used to correct corresponding codewords of the second data unit.

In some implementations, the first HARQ feedback frame received in block 704 may include one or more acknowledgements (ACKs) indicating portions of the first data unit that were successfully decoded, may include one or more negative acknowledgements (NACKs) indicating portions of the first data unit that were not successfully decoded (or not received at all), or may include both ACKs and NACKs. In some other implementations, the first HARQ feedback frame may include a bitmap indicating which portions of the first data unit were not successfully decoded (or not received at all). In some instances, the first HARQ feedback frame may include a first bitmap indicating one or more MPDUs of the first data unit that were not successfully decoded by the receiving device, may include a second bitmap indicating one or more codewords of the of the first data unit that were not successfully decoded, or may include both the first bitmap and the second bitmap.

In some implementations, the second data unit and the indicated portion of the first data unit may be aggregated and transmitted to the receiving device in a single packet. For example, in implementations for which the first data unit is carried in a first PSDU containing a plurality of first MPDUs and the second data unit is carried in a second PSDU containing a plurality of second MPDUs, the indicated portion of the first data unit may include one or more of the plurality of first MPDUs and may be transmitted with the plurality of second MPDUs in the same PPDU. In some instances, the PPDU may include an A-MPDU that carries the plurality of second MPDUs corresponding to the second data unit and carries the one or more first MPDUs corresponding to the portions of the first data unit that were not successfully decoded. In some other instances, the indicated portion of the first data unit may be retransmitted as a subset of the plurality of first LDPC codewords.

In some implementations, the indicated portion of the first data unit may be transmitted using one or more first resource units (RUs), and the second data unit may be transmitted using one or more second RUs different than the one or more first RUs. In some other implementations, the indicated portion of the first data unit may be transmitted using a first set spatial streams, and the second data unit may be transmitted using a second set of spatial streams different than the first set of first spatial streams. In some other implementations, the indicated portion of the first data unit may be transmitted using one or more first orthogonal frequency division multiplexing (OFDM) symbols, and the second data unit may be transmitted using one or more second OFDM symbols different than the one or more first OFDM symbols.

Figure 7B:
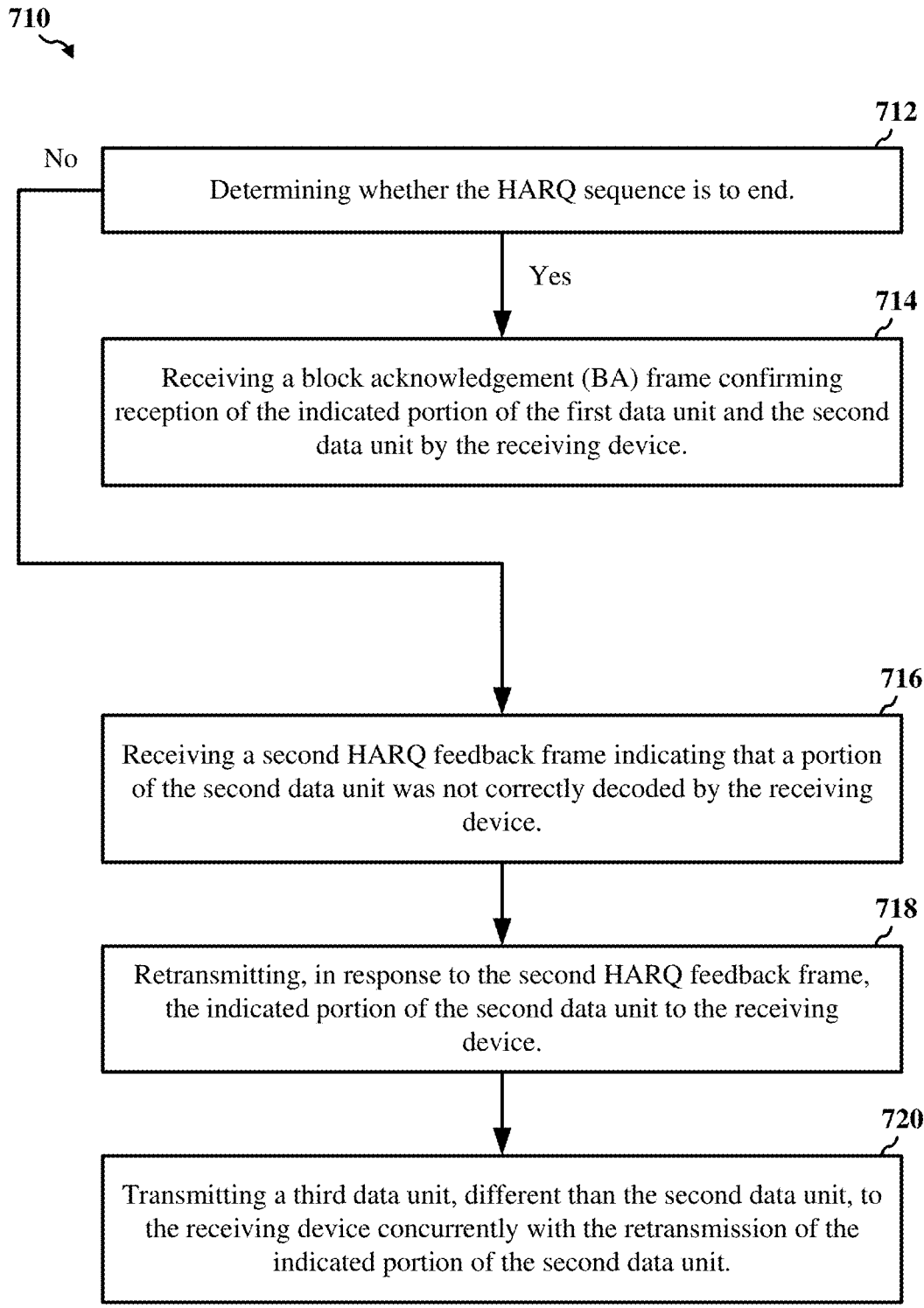
FIG. 7B shows a flowchart illustrating an example process for wireless communication that supports HARQ techniques according to some implementations.

FIG. 7B shows a flowchart illustrating an example process 710 for wireless communication that supports HARQ techniques according to some implementations. The process 710 may be performed by a wireless communication device such as the wireless communication device 500 described above with reference to FIG. 5. In some implementations, the process 710 may be performed by a wireless communication device operating as or within a STA, such as one of the STAs 104 and 604 described above with reference to FIGS. 1 and 6B, respectively.

In some implementations, the process 710 begins after the process 700 described with reference to FIG. 7A. For example, the process 710 may begin in block 712, after the retransmission of the first data unit in block 706 and the transmission of the second data unit in block 708, with determining whether the HARQ sequence is to end (such as because an additional HARQ sequence may not fit within the current TXOP). If the HARQ sequence is to end, the process 700 proceeds to bock 714 with receiving a block acknowledgement (BA) frame confirming reception of the indicated portion of the first data unit and the second data unit by the receiving device.

Conversely, if the HARQ sequence is not ending, the process 710 proceeds in block 716 with receiving a second HARQ feedback frame indicating that a portion of the second data unit was not successfully decoded by the receiving device. In block 718, the process 710 proceeds with retransmitting, in response to the second HARQ feedback frame, the indicated portion of the second data unit to the receiving device. In block 720, the process 710 proceeds with transmitting a third data unit, different than the second data unit, to the receiving device concurrently with the retransmission of the indicated portion of the second data unit.

In some implementations, the BA frame received in block 714 includes a bitmap indicating which portions of the first data unit were not successfully decoded (or not received at all). For example, the transmitting device may use the bitmap in the BA frame to determine which portions of the first data unit to retransmit to the receiving device.

In some implementations, the second HARQ feedback frame received in block 716 may include one or more ACKs indicating portions of the second data unit that were successfully decoded, may include one or more NACKs indicating portions of the second data unit that were not successfully decoded (or not received at all), or may include both ACKs and NACKs. In some other implementations, the second HARQ feedback frame may include a bitmap indicating which portions of the second data unit were not successfully decoded (or not received at all). In some instances, the second HARQ feedback frame may include a first bitmap indicating one or more MPDUs of the second data unit that were not successfully decoded by the receiving device, may include a second bitmap indicating one or more codewords of the of the second data unit that were not successfully decoded, or may include both the first bitmap and the second bitmap.

In some implementations, the indicated portion of the second data unit retransmitted in block 718 may include one or more MPDUs associated with the second PSDU. For example, the indicated portion of the second data unit may be a subset of the plurality of LDPC codewords that encode the second data unit.

Figure 8A:
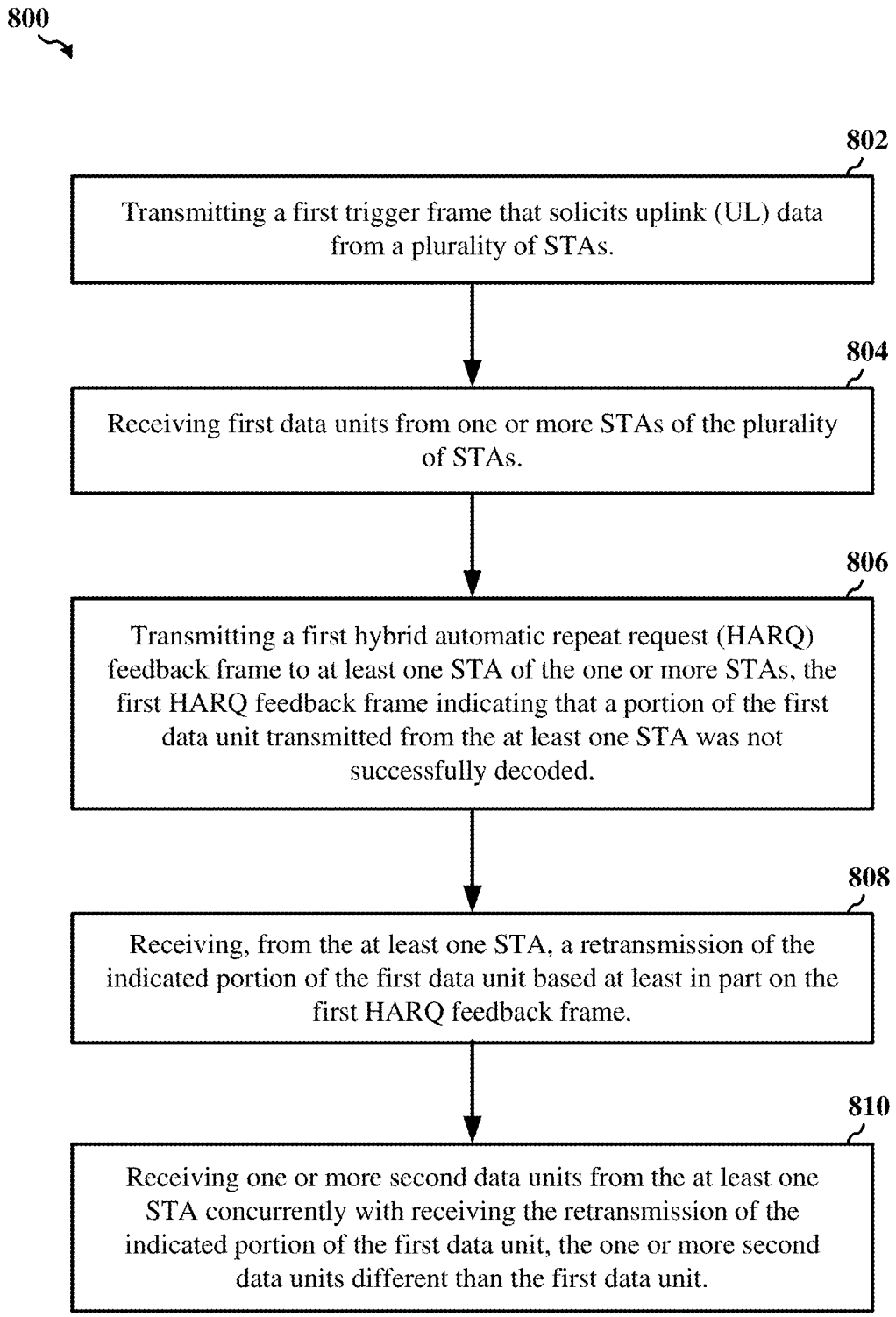
FIG. 8A shows a flowchart illustrating an example process for wireless communication that supports HARQ techniques according to some other implementations.

FIG. 8A shows a flowchart illustrating an example process 800 for wireless communication that supports HARQ techniques according to some other implementations. The process 800 may be performed by a wireless communication device such as the wireless communication device 500 described above with reference to FIG. 5. In some implementations, the process 800 may be performed by a wireless communication device operating as or within an AP, such as one of the APs 102 and 602 described above with reference to FIGS. 1 and 6A, respectively.

In some implementations, the process 800 begins in block 802 with transmitting a first trigger frame that solicits uplink (UL) data from a plurality of STAs. In block 804, the process 800 proceeds with receiving first data units from one or more STAs of the plurality of STAs. In block 806, the process 800 proceeds with transmitting a first HARQ feedback frame to at least one STA of the one or more STAs, the first HARQ feedback frame indicating that a portion of the first data unit transmitted from the at least one STA was not successfully decoded. In block 808, the process 800 proceeds with receiving, from the at least one STA, a retransmission of the indicated portion of the first data unit based at least in part on the first HARQ feedback frame. In block 810, the process 800 proceeds with receiving one or more second data units from the at least one STA concurrently with receiving the retransmission of the indicated portion of the first data unit, where the one or more second data units different than the first data unit.

In some implementations, the first trigger frame transmitted in block 802 includes AID values of the plurality of STAs that are to transmit UL data, and allocates a unique RU (or a group of RUs) to each of the plurality of STAs upon which to transmit the UL data.

In some implementations, the first data units received in block 804 may be contained in a first PSDU including a plurality of first MPDUs that can be encoded as first LDPC codewords. The first LDPC codewords may include information bits that represent the first data units, and may include parity bits that can be used to correct corresponding codewords of the first data units. Similarly, in some implementations, the one or more second data units received in block 810 may be contained in a second PSDU including a plurality of second MPDUs that can be encoded as second LDPC codewords. The second LDPC codewords may include information bits that represent the one or more second data units, and may include parity bits that can be used to correct corresponding codewords of the one or more second data units.

In some implementations, the first HARQ feedback frame transmitted in block 806 may include one or more acknowledgements (ACKs) indicating portions of the first data units that were successfully decoded, may include one or more negative acknowledgements (NACKs) indicating portions of the first data units that were not successfully decoded (or not received at all), or may include both ACKs and NACKs. In some other implementations, the first HARQ feedback frame may include a bitmap indicating which portions of the first data units were not successfully decoded (or not received at all). In some instances, the first HARQ feedback frame may include a first bitmap indicating one or more MPDUs of the first data units that were not successfully decoded by the receiving device, may include a second bitmap indicating one or more codewords of the of the first data units that were not successfully decoded, or may include both the first bitmap and the second bitmap.

In some implementations, the one or more second data units and the indicated portion of the first data unit may be aggregated and transmitted from the at least one STA in a single packet. For example, in implementations for which the first data unit is carried in a first PSDU containing a plurality of first MPDUs and the one or more second data units are carried in one or more second PSDUs containing a plurality of second MPDUs, the indicated portion of the first data unit may include one or more of the plurality of first MPDUs and may be transmitted with the plurality of second MPDUs in the same PPDU. In some instances, the PPDU may include an A-MPDU that carries the plurality of second MPDUs corresponding to the one or more second data units and carries the one or more first MPDUs corresponding to the portions of the first data unit that were not successfully decoded. In some other instances, the indicated portion of the first data unit may be retransmitted as a subset of the plurality of first LDPC codewords.

In some implementations, the indicated portion of the first data unit may be transmitted using one or more first RUs, and the one or more second data units may be transmitted using one or more second RUs different than the one or more first RUs. In some other implementations, the indicated portion of the first data unit may be transmitted using a first set spatial streams, and the one or more second data units may be transmitted using a second set of spatial streams different than the first set of first spatial streams. In some other implementations, the indicated portion of the first data unit may be transmitted using one or more first OFDM symbols, and the one or more second data units may be transmitted using one or more second OFDM symbols different than the one or more first OFDM symbols.

In some implementations, transmission of the first HARQ feedback frame, retransmission of the indicated portion of the first data unit, and transmission of the one or more second data units may correspond to a single HARQ sequence.

Figure 8B:
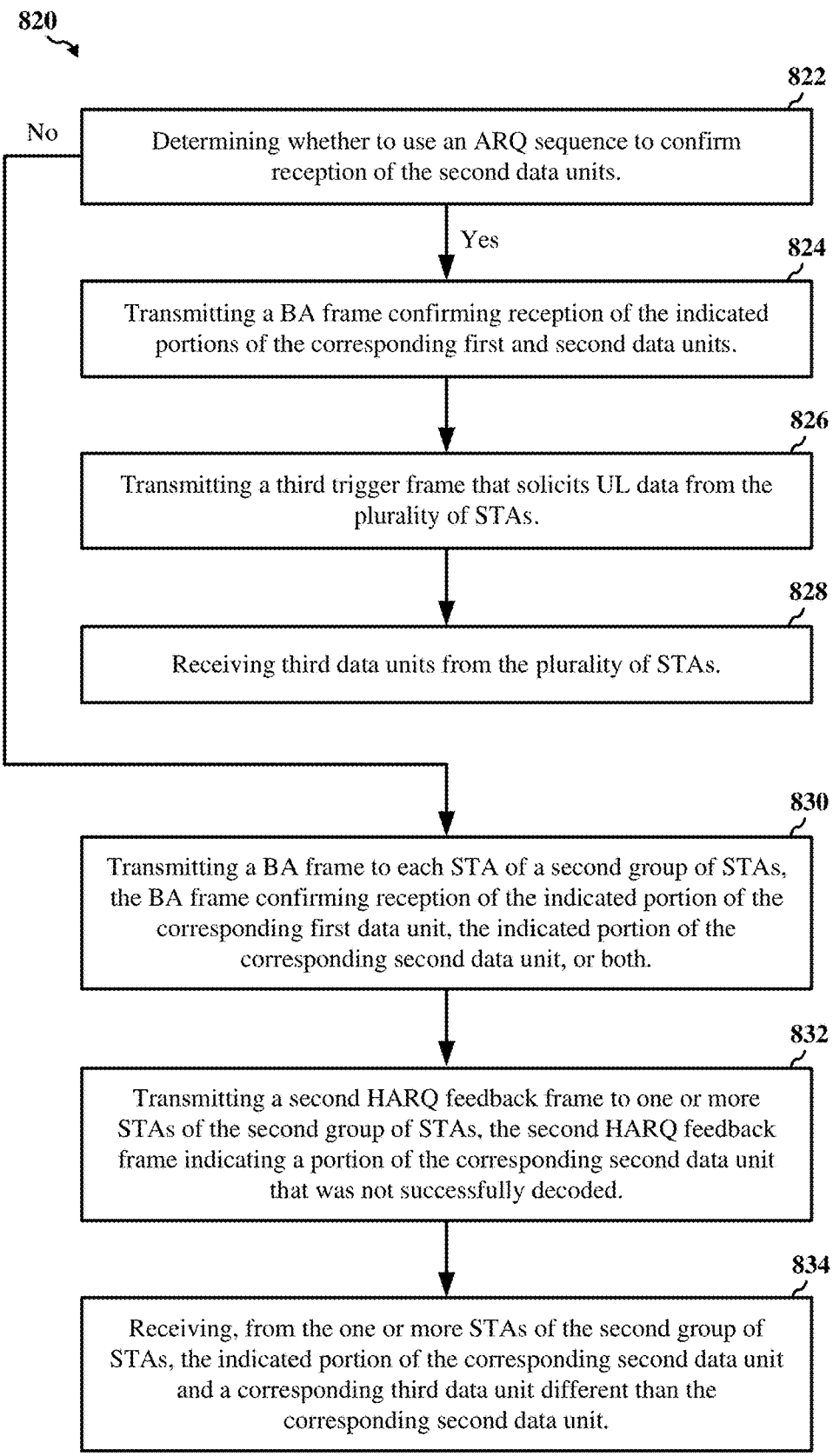
FIG. 8B shows a flowchart illustrating an example process for wireless communication that supports HARQ techniques according to some other implementations.

FIG. 8B shows a flowchart illustrating an example process 820 for wireless communication that supports HARQ techniques according to some other implementations. The process 820 may be performed by a wireless communication device such as the wireless communication device 500 described above with reference to FIG. 5. In some implementations, the process 820 may be performed by a wireless communication device operating as or within an AP, such as one of the APs 102 and 602 described above with reference to FIGS. 1 and 6A, respectively. In some implementations, the process 820 begins after the process 800 described with reference to FIG. 8A. For example, the process 820 may begin in block 822, after reception of the indicated portion of the first data unit and the one or more second data units, with determining whether to use an ARQ sequence to confirm reception of the second data units.

In some implementations, each STA of the plurality of STAs includes an independent state machine that may be used to select either a HARQ sequence or an ARQ sequence to provide feedback indicating whether one or more portions of a data unit were not successfully decoded. For example, a first STA may successfully decode the first data unit and may transmit an ACK frame to confirm successful reception of first data unit, and a second STA may not successfully decode the first data unit and may transmit either a BA frame or a HARQ feedback frame indicating portions of the first data unit that were not successfully decoded. For another example, the first STA may not successfully decode the first data unit and may transmit a BA frame indicating portions of the first data unit that were not successfully decoded, and the second STA may not successfully decode the first data unit and may transmit a HARQ feedback frame indicating portions of the first data unit that were not successfully decoded.

If the AP selects the ARQ sequence to confirm reception of the second data units, the process 820 proceeds to block 824 with transmitting a BA frame confirming reception of the indicated portions of the corresponding first and second data units. In block 826, the process 820 proceeds with transmitting a third trigger frame that solicits UL data from the plurality of STAs. In block 828, the process 820 proceeds with receiving third data units from the plurality of STAs.

Returning to block 822, if the AP selects an ARQ sequence for a first group of STAs and selects a HARQ sequence for a second group of STAs, the process 820 proceeds in block 830 with transmitting a BA frame to each STA of the second group of STAs. In block 832, the process 800 proceeds with transmitting a second HARQ feedback frame to one or more STAs of the second group of STAs, the second HARQ feedback frame indicating a portion of the corresponding second data unit that was not successfully decoded. In block 834, the process 800 proceeds with receiving, from the one or more STAs of the second group of STAs, the indicated portion of the corresponding second data unit and a corresponding third data unit different than the corresponding second data unit.

In some implementations, the BA frame may confirm reception of the indicated portion of the corresponding first data unit, the indicated portion of the corresponding second data unit, or both. In some instances, transmission of the BA frame may correspond to an automatic repeat request (ARQ) sequence.

In some implementations, the third trigger frame transmitted in block 826 may include AID values of the plurality of STAs that are to transmit UL data, and may allocate a unique RU (or a group of RUs) to each STA of the plurality of STAs upon which to transmit the UL data.

In some implementations, each of the third data units received in block 828 may be contained in a third PSDU including a plurality of third MPDUs that are encoded as a plurality of third LDPC codewords. For example, each codeword may contain information bits that represent the third data unit, and may contain parity bits that can be used to determine which portions of the third data unit were not successfully decoded.

Figure 9A:
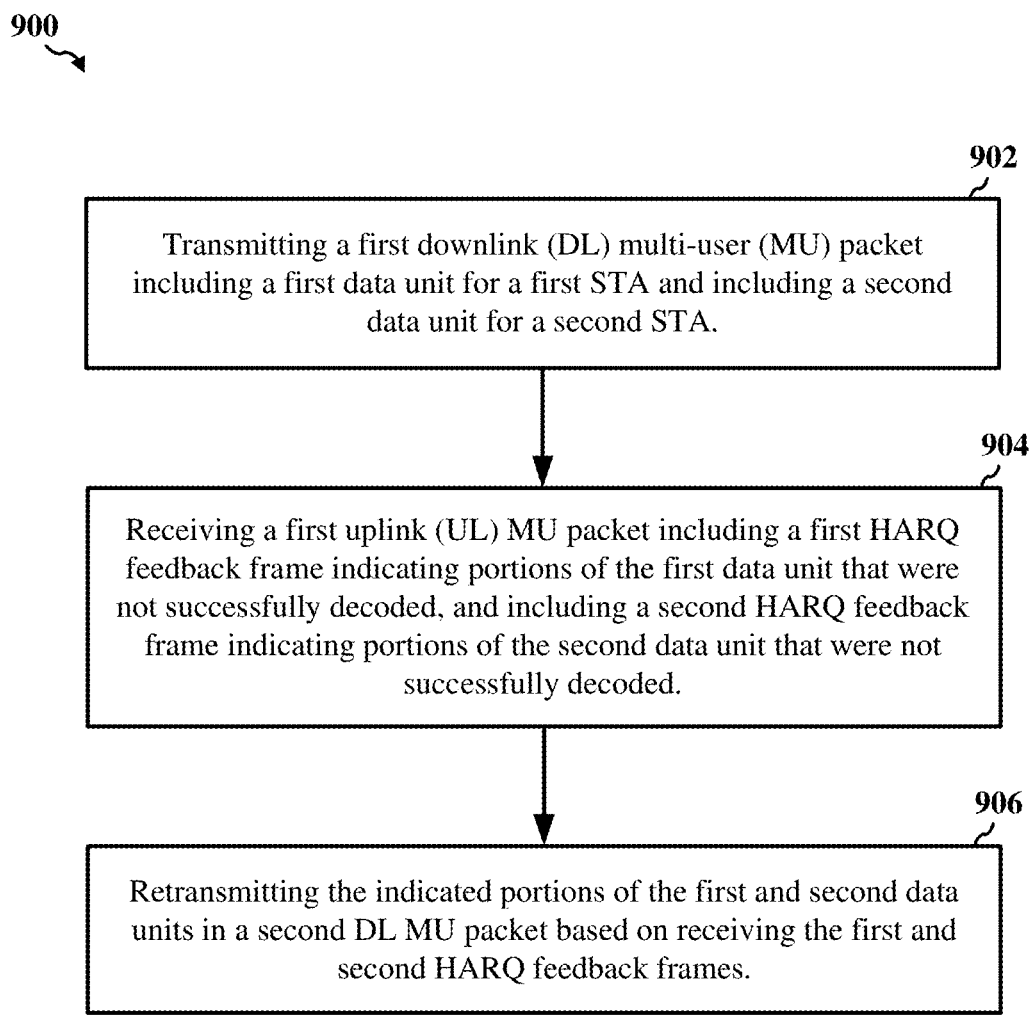
FIG. 9A shows a flowchart illustrating an example process for wireless communication that supports HARQ techniques according to some other implementations.

FIG. 9A shows a flowchart illustrating an example process 900 for wireless communication that supports HARQ techniques according to some other implementations. The process 900 may be performed by a wireless communication device such as the wireless communication device 500 described above with reference to FIG. 5. In some implementations, the process 900 may be performed by a wireless communication device operating as or within an AP, such as one of the APs 102 and 602 described above with reference to FIGS. 1 and 6A, respectively.

In some implementations, the process 900 begins in block 902 with transmitting a first downlink (DL) multi-user (MU) packet including a first data unit for a first STA and including a second data unit for a second STA. In block 904, the process 900 proceeds with receiving a first uplink (UL) MU packet including a first HARQ feedback frame indicating portions of the first data unit that were not successfully decoded, and including a second HARQ feedback frame indicating portions of the second data unit that were not successfully decoded. In block 906, the process 900 proceeds with retransmitting the indicated portions of the first and second data units in a second DL MU packet based on receiving the first and second HARQ feedback frames.

In some implementations, each of the first and second data units in block 902 may be contained in a corresponding PSDU including one or more corresponding MPDUs that can be are encoded as a plurality of corresponding LDPC codewords. Each codeword may contain information bits that represent the corresponding data unit, and may contain parity bits that can be used to determine which portions of the corresponding data unit were not successfully decoded.

In some implementations, each of the first and second HARQ feedback frames in block 904 may include one or more ACKs indicating portions of the corresponding data unit that were successfully decoded, includes one or more NACKs indicating portions of the corresponding data unit that were not successfully decoded (or not received at all), or includes both ACKs and NACKs. In some other implementations, each of the first and second HARQ feedback frames in block 904 may include a bitmap indicating which portions of the corresponding data unit were not successfully decoded (or not received at all). In some instances, the bitmap may indicate or identify one or more MPDUs of the corresponding data unit that were not successfully decoded. In some other instances, the bitmap may indicate or identify one or more codewords of the corresponding data unit that were not successfully decoded.

In some implementations, each of the indicated portions in block 906 may include one or more MPDUs associated with a corresponding one of the first and second data units. For example, the indicated portion of a respective data unit may be a subset of the plurality of LDPC codewords that encode the respective data unit. In some instances, the indicated portions of the first data unit and the indicated portions of the second data units in block 906 may be aggregated in a single packet or PPDU.

In some implementations, the first DL MU packet may include a first trigger frame that solicits transmission of the first and second UL HARQ feedback frames, and the second DL MU packet may include a second trigger frame that solicits transmission ACK frames confirming reception of the retransmitted portions of the first and second data units.

Figure 9B:
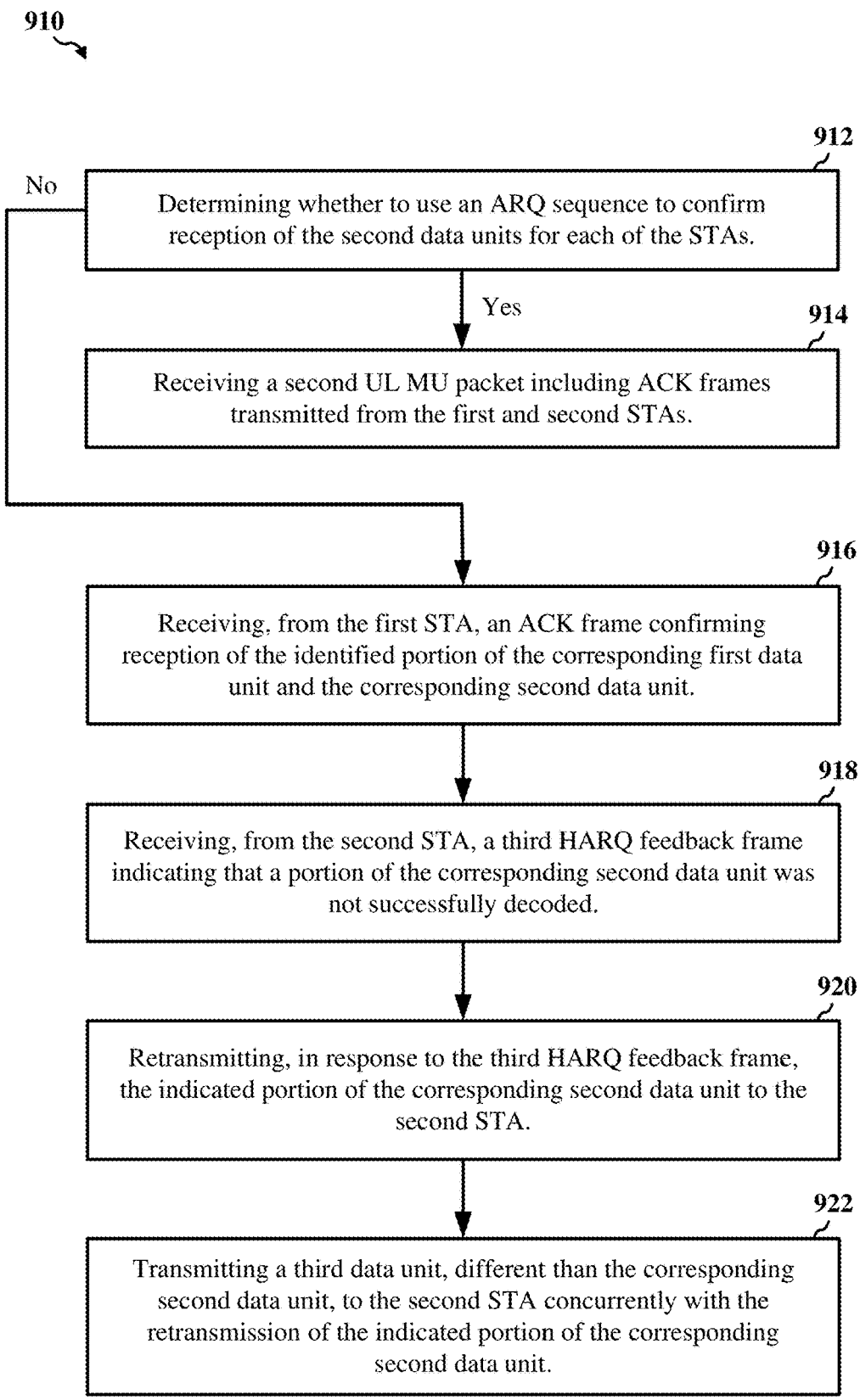
FIG. 9B shows a flowchart illustrating an example process for wireless communication that supports HARQ techniques according to some other implementations.

FIG. 9B shows a flowchart illustrating an example process 910 for wireless communication that supports HARQ techniques according to some other implementations. The process 910 may be performed by a wireless communication device such as the wireless communication device 500 described above with reference to FIG. 5. In some implementations, the process 910 may be performed by a wireless communication device operating as or within an AP, such as one of the APs 102 and 602 described above with reference to FIGS. 1 and 6A, respectively. In some implementations, the process 910 begins after the process 900 described with reference to FIG. 9A. For example, the process 910 may begin in block 912, after retransmission of the identified portions of the first and second data units in block 906 of FIG. 9A, with determining whether to use an ARQ sequence to confirm reception of the second data units for each of the STAs.

If the ARQ sequence is selected for the first STA and the second STA, the process 910 proceeds in block 914 with receiving a second UL MU packet including ACK frames transmitted from the first and second STAs.

Returning to block 912, if the AP selects an ARQ sequence for the first STA and selects a HARQ sequence for the second STA, the process 910 proceeds in block 916 with receiving, from the first STA, an ACK frame confirming reception of the identified portion of the corresponding first data unit and the corresponding second data unit. In block 918, the process 910 proceeds with receiving, from the second STA, a third HARQ feedback frame indicating that a portion of the corresponding second data unit was not successfully decoded. In block 920, the process 910 proceeds with retransmitting, in response to the third HARQ feedback frame, the indicated portion of the corresponding second data unit to the second STA. In block 922, the process 910 proceeds with transmitting a third data unit, different than the corresponding second data unit, to the second STA concurrently with the retransmission of the indicated portion of the corresponding second data unit.

Figure 10:
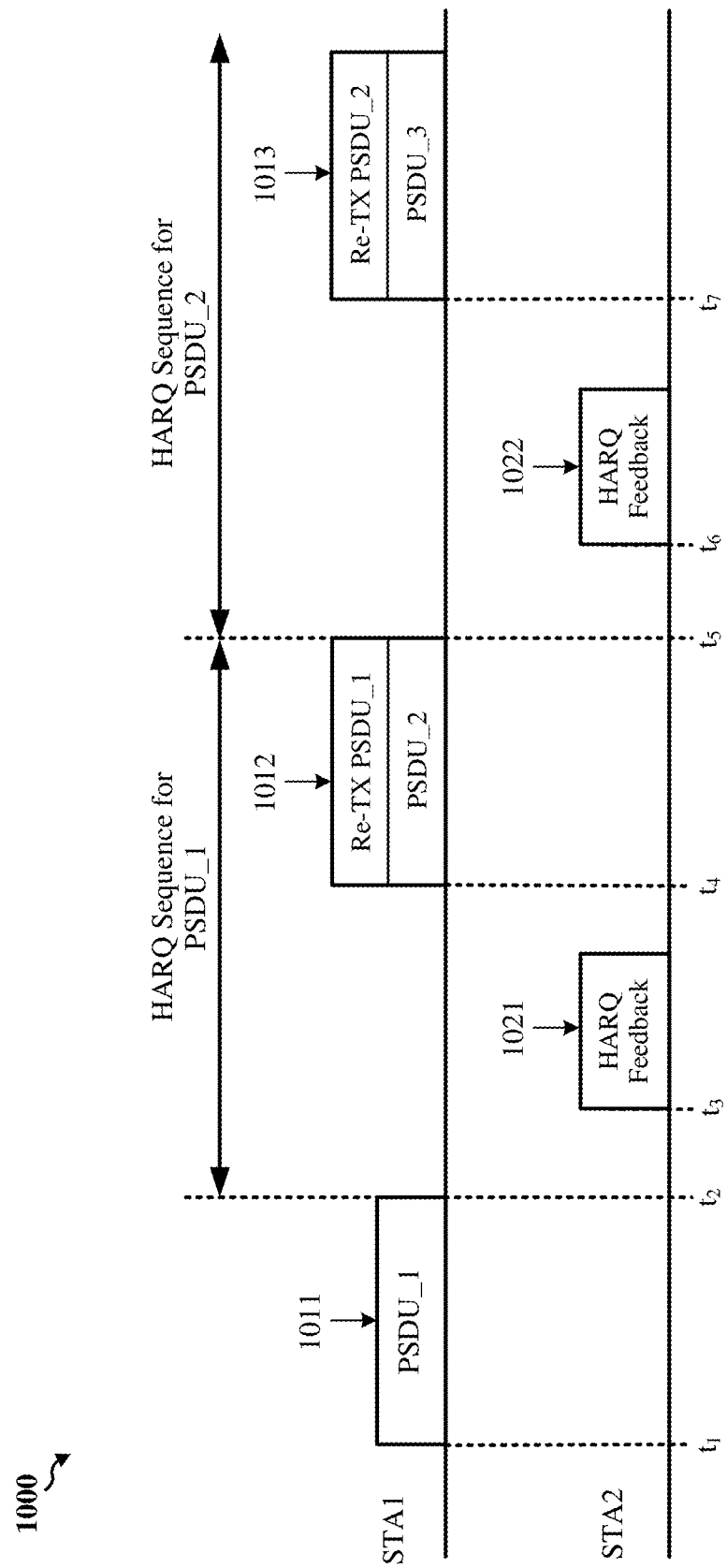
FIG. 10 shows a timing diagram illustrating the transmissions of communications in the example processes of FIGS. 7A and 7B according to some implementations.

FIG. 10 shows a timing diagram illustrating the transmissions of communications in the example processes 700 and 710 of FIGS. 7A and 7B, respectively. In some implementations, the communications may be exchanged between a first wireless station (STA1) and a second wireless station (STA2). Each of the stations STA1-STA2 may be any suitable wireless communication device such as one of the STAs 104 and 504 described above with reference to FIGS. 1 and 5B, respectively. In the timing diagram 1000, STA1 may be the transmitting device, and STA2 may be the receiving device.

At time $t_1$, STA1 transmits a first PSDU to STA2. The first PSDU may include a number of first MPDUs each containing one or more data frames (such as MSDUs or MAC frames). The first MPDUs may be encoded using an LDPC encoding technique, and transmitted to STA2 as a plurality of first LDPC codewords. In some implementations, the first PSDU may be embedded within a first packet 1011 that can be transmitted to STA2 using SU-MIMO or OFDMA communications. In some aspects, the first packet 1011 may be an A-MPDU.

At time $t_2$, STA2 receives the first PSDU (or at least a portion of the first PSDU), and determines whether any portions of the first PSDU were not successfully decoded. In some implementations, a physical-layer (PHY) of STA2 may decode the plurality of first LDPC codewords contained in the first PSDU, and a MAC layer of STA2 may decode the MPDUs associated with the plurality of first LDPC codewords. In the example of FIG. 10A, STA2 may not successfully decode all of the first PSDU.

At time $t_3$, STA2 transmits a first hybrid automatic repeat request (HARQ) feedback frame 1021 to STA1. The first HARQ feedback frame 1021 may indicate a portion of the first PSDU 1011 that was not successfully decoded by STA2. In some implementations, the first HARQ feedback frame 1021 may include an MPDU-based bitmap identifying a number of first MPDUs embedded within the first PSDU that were not successfully decoded by STA2. In addition, or in the alternative, the first HARQ feedback frame 1021 may include a codeword-based bitmap identifying one or more LDPC codewords of the first PSDU that were not successfully decoded.

STA1 receives the first HARQ feedback frame 1021, and determines the indicated portion of the first PSDU to be retransmitted. At time $t_4$, STA1 retransmits the indicated portion of the first PSDU to STA2. In some implementations, STA1 may transmit a second PSDU, different than the first PSDU, concurrently with the retransmitted portion of the first PSDU to STA2 as a second packet 1012. The second packet 1012, which may be transmitted as either SU-MIMO data or OFDMA data, may include the number of first MPDUs and a plurality of second MPDUs associated with the second PSDU.

In some implementations, STA1 may retransmit the indicated portion of the first PSDU using a first resource unit (RU), and may transmit the second PSDU using a second RU different than the first RU. In other implementations, STA1 may retransmit the indicated portion of the first PSDU using a first group of aggregated RUs, and may transmit the second PSDU using a second group of aggregated RUs. In some other implementations, STA1 may retransmit the indicated portion of the first PSDU using a first set of spatial streams, and may transmit the second PSDU using second set of spatial streams different than the first set of spatial streams. In addition, or in the alternative, STA1 may retransmit the indicated portion of the first PSDU using a first set of OFDM symbols, and may transmit the second PSDU using a second set of OFDM symbols different than the first set of OFDM symbols.

At time $t_5$, STA2 receives a second packet 1012 containing the retransmitted portion of the first PSDU and the second PSDU, and determines whether any portions of the second packet 1012 were not successfully decoded. In some implementations, the PHY of STA2 may decode a number of first LDPC codewords associated with the retransmitted portion of the first PSDU and a plurality of second LDPC codewords associated with the second PSDU, and the MAC layer of STA2 may decode the MPDUs associated with the number of first LDPC codewords and the MPDUs associated with the plurality of second LDPC codewords. In the example of FIG. 10, STA2 may not successfully decode all of the second PSDU.

At time $t_6$, STA2 transmits a second HARQ feedback frame 1022 to STA1. The second HARQ feedback frame 1022 may indicate a portion of the second PSDU that was not successfully decoded by STA2. In some implementations, the second HARQ feedback frame 1022 may include an MPDU-based bitmap identifying a number of MPDUs embedded within the second packet 1012 that were not successfully decoded by STA2. In addition, or in the alternative, the second HARQ feedback frame 1022 may include a codeword-based bitmap identifying one or more LDPC codewords of the second PSDU that were not successfully decoded.

STA1 receives the second HARQ feedback frame 1022, and determines the indicated portion of the second PSDU to be retransmitted. At time $t_7$, STA1 retransmits the indicated portion of the second PSDU to STA2. In some implementations, STA1 may transmit a third PSDU, different than the second PSDU, concurrently with the retransmitted portion of the second PSDU as a third packet 1013 to STA2. The third packet 1013, which may be transmitted as either SU-MIMO data or OFDMA data, may include a number of second MPDUs associated with the indicated portion of the second PSDU and may include a plurality of third MPDUs associated with the third PSDU.

In some implementations, STA1 may retransmit the indicated portion of the second PSDU using a first RU (or a group of first RUs) and may concurrently transmit the third PSDU using a second RU (or a group of second RUs) different than the first RU (or different than the group of first RUs). In other implementations, STA1 may retransmit the indicated portion of the second PSDU using a first set of spatial streams and may concurrently transmit the third PSDU using a second set of spatial streams different than the first set of spatial streams. In addition, or in the alternative, STA1 may retransmit the indicated portion of the second PSDU using a first set of OFDM symbols, and may transmit the third PSDU using a second set of OFDM symbols different than the first set of OFDM symbols.

Figure 11A:
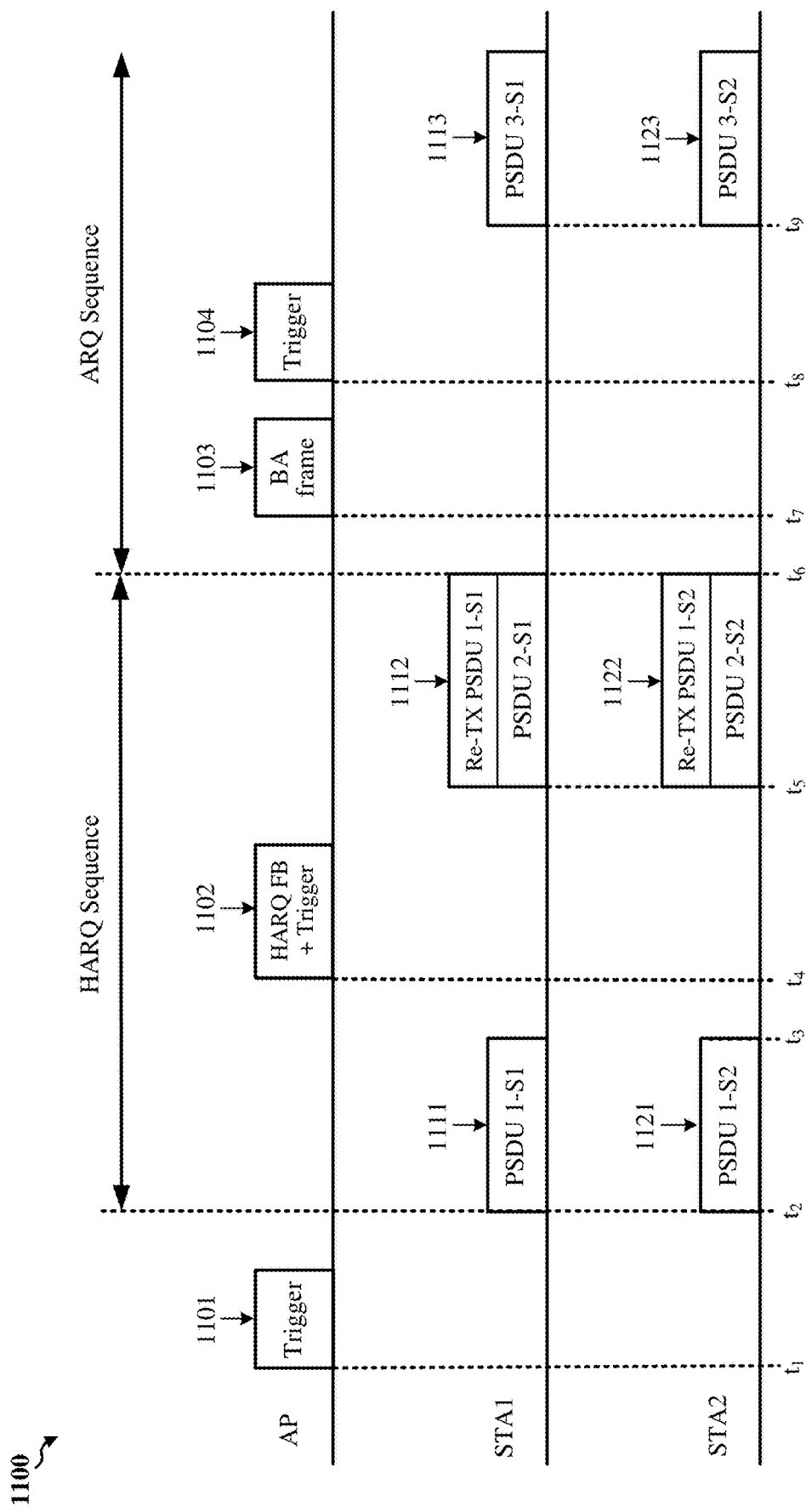
FIG. 11A shows a timing diagram illustrating the transmissions of communications in the example processes of FIGS. 8A and 8B according to some implementations.

FIG. 11A shows a timing diagram 1100 illustrating the transmissions of communications of the example processes 800 and 820 of FIGS. 8A and 8B, respectively, according to some implementations. The AP of FIG. 11A may be any suitable wireless communication device such as the AP 102 and 502 described above with reference to FIGS. 1 and 5A, respectively, and each of the stations STA1-STA2 may be any suitable wireless communication device such as one of the STAs 104 and 504 described above with reference to FIGS. 1 and 5B, respectively. Although the timing diagram 1100 shows two wireless stations STA1-STA2 as transmitting devices, the example processes 800 and 820 may include other numbers of transmitting devices.

At time $t_1$, which may correspond to a target wait time (TWT), reception of a buffer status report (BSR) from the stations STA1-STA2, or some other suitable time or event, the AP transmits a trigger frame 1101 to the stations STA1-STA2 on a downlink (DL) channel. The trigger frame 1101 may solicit first uplink (UL) data from a plurality of STAs, including stations STA1-STA2, and may synchronize UL MU-OFDMA transmissions or UL MU-MIMO transmissions from stations STA1-STA2 (and also from one or more other wireless stations not shown for simplicity) to the AP. In some implementations, the trigger frame 1101 may allocate one or more resource units (RUs) to each of the stations STA1-STA2 for UL data transmissions.

At time $t_2$, STA1 transmits a first PSDU 1-S1 to the AP in a packet 1111, and STA2 transmits a first PSDU 1-S2 to the AP in a packet 1112, concurrently. Each of the first PSDUs 1-S1 and 1-S2 may include a number of MPDUs each containing one or more data frames (such as MSDUs or MAC frames). The MPDUs included in each of the first PSDUs 1-S1 and 1-S2 may be encoded using an LDPC encoding technique, and may be transmitted to the AP as LDPC codewords. In some implementations, the first PSDUs 1-S1 and 1-S2 may be transmitted to the AP as either UL MU data or UL OFDMA data. In addition, or in the alternative, the first PSDUs 1-S1 and 1-S2 may be transmitted to the AP as an A-MPDU.

Between times $t_2$ and $t_3$, the AP receives the first PSDUs 1-S1 and 1-S2, and determines whether any portions of the first PSDUs 1-S1 and 1-S2 were not successfully decoded. In the example of FIG. 11A, the AP may not successfully decode all of the MPDUs or the AP may not successfully decode all of the LDPC codewords associated with either of the first PSDUs 1-S1 or 1-S2.

At time $t_4$, the AP transmits a HARQ feedback frame 1102 to the stations STA1 and STA2. The HARQ feedback frame 1102 may identify portions of the first PSDUs 1-S1 and 1-S2 that were not successfully decoded. The HARQ feedback frame 1102 may include codeword-based BA bitmaps that indicate which codewords associated with each of the first PSDUs 1-S1 and 1-S2 were not successfully decoded, may include MPDU-based BA bitmaps that indicate which MPDUs associated with each of the first PSDUs 1-S1 and 1-S2 were not successfully decoded, or both. In some implementations, the HARQ feedback frame 1102 may include a first trigger frame that solicits UL data from each of the stations STA1 and STA2. The first trigger frame may allocate a unique RU (or a unique group of RUs) to each of the stations STA1 and STA2 for UL data transmissions.

Each of the stations STA1 and STA2 receives the HARQ feedback frame 1102. In some implementations, STA1 may use the HARQ feedback frame 1102 to indicate or identify the portions of PSDU 1-S1 that were not successfully decoded by the AP, and STA2 may use the HARQ feedback frame 1102 to indicate or identify the portions of PSDU 1-S2 that were not successfully decoded by the AP.

At time $t_5$, STA1 retransmits the identified portions of PSDU 1-S1 to the AP, and STA2 retransmits the identified portions of PSDU 1-S2 to the AP. In some implementations, STA1 may transmit a second PSDU 2-S1 to the AP concurrently with the retransmission of the indicated portions of PSDU 1-S2, and STA2 may transmit a second PSDU 2-S2 to the AP concurrently with the retransmission of the identified portions of PSDU 1-S2. The indicated portions of PSDU 1-S1 and the second PSDU 2-S1 may be transmitted by STA1 in a packet 1112, and the indicated portions of PSDU 1-S2 and the second PSDU 2-S2 may be transmitted by STA2 in a packet 1112. In some implementations, the packets 1112 and 1122 may be concurrently transmitted to the AP either as UL MU data or as UL OFDMA data. In addition, or in the alternative, the indicated portions of PSDU 1-S1, the indicated portions of PSDU 1-S2, and the second PSDUs 2-S1 and 2-S2 may be transmitted to the AP as an A-MPDU.

At time $t_6$, the AP receives the packets 1112 and 1122, and determines whether any portions of the second PSDUs 2-S1 and 2-S2 cannot be successfully decoded.

At time $t_7$, the AP transmits a BA frame 1103 to the stations STA1 and STA2. The BA frame 1103 may include bitmaps that indicate portions of the second PSDUs 2-S1 and 2-S2 that were not successfully decoded.

At time $t_8$, the AP transmits a second trigger frame 1104 to the stations STA1 and STA2. The second trigger frame 1104 may solicit UL data transmissions from the stations STA1 and STA2. The second trigger frame 1104 may allocate a unique RU (or a unique group of RUs) to each of the stations STA1 and STA2 for UL data transmissions. In some implementations, the BA frame 1103 and the second trigger frame 1104 may be transmitted concurrently to the stations STA1 and STA2, for example, by encapsulating the BA frame 1103 and the second trigger frame 1104 into a DL MU packet.

Each of the stations STA1 and STA2 receives the BA frame 1103 and the trigger frame 1104. In some implementations, STA1 may use the BA frame 1103 to indicate or identify the portions of PSDU 2-S1 that were not successfully decoded by the AP, and STA2 may use the BA frame 1103 to indicate or identify the portions of PSDU 2-S2 that were not successfully decoded by the AP. Each of the stations STA1 and STA2 may transmit UL data to the AP in response to the trigger frame 1104.

At time $t_9$, STA1 transmits a third PSDU 3-S1 to the AP in a packet 1113, and STA2 transmits a third PSDU 3-S2 to the AP in a packet 1123, concurrently. Each of the third PSDUs 3-S1 and 3-S2 may include a number of MPDUs each containing one or more data frames (such as MSDUs or MAC frames). The MPDUs included in each of the third PSDUs 3-S1 and 3-S2 may be encoded using an LDPC encoding technique, and may be transmitted to the AP as LDPC codewords. In some implementations, the third PSDUs 3-S1 and 3-S2 may be transmitted to the AP as either UL MU data or UL OFDMA data. In addition, or in the alternative, the third PSDUs 3-S1 and 3-S2 may be transmitted to the AP as an A-MPDU.

In some implementations, the transmission of the first PSDUs 1-S1 and 1-S2 and the third PSDUs 3-S1 and 3-S2 may correspond to a HARQ sequence, and reception of the third PSDUs 3-S1 and 3-S2 by the AP may signal an end of the HARQ sequence and may signal a beginning of an ARQ sequence.

Figure 11B:
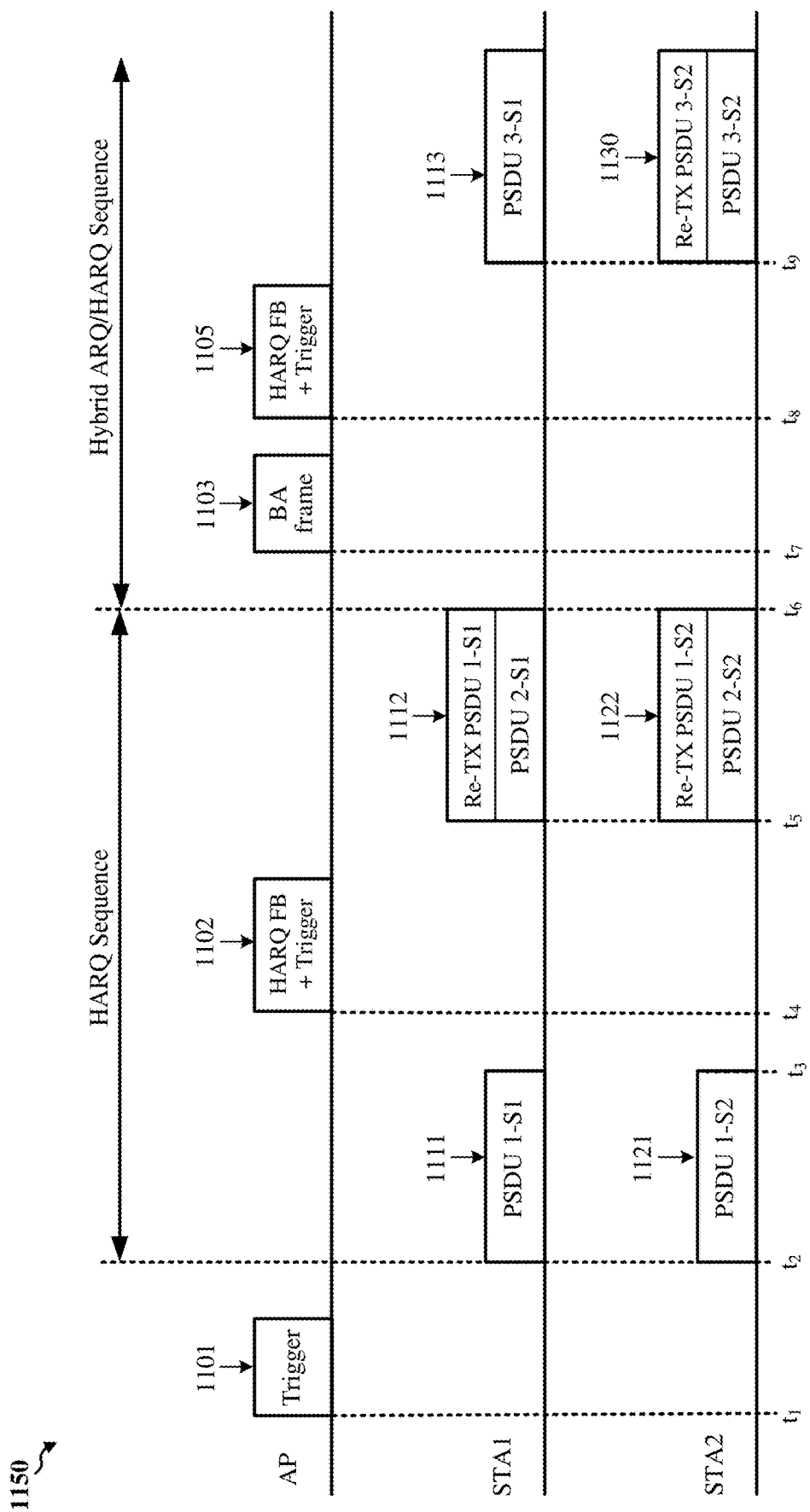
FIG. 11B shows a timing diagram illustrating the transmissions of communications in the example processes of FIGS. 8A and 8B according to some other implementations.

FIG. 11B shows a timing diagram 1150 illustrating the transmissions of communications of the example processes 800 and 820 of FIGS. 8A and 8B, respectively, according to some other implementations. The AP of FIG. 11B may be any suitable wireless communication device such as the AP 102 and 502 described above with reference to FIGS. 1 and 5A, respectively, and each of the stations STA1-STA2 may be any suitable wireless communication device such as one of the STAs 104 and 504 described above with reference to FIGS. 1 and 5B, respectively. Although the timing diagram 1150 shows two wireless communication devices STA1-STA2 as transmitting devices, the example processes 800 and 820 may include other numbers of transmitting devices.

In some implementations, the timing diagram 1150 is similar to the timing diagram 1100 of FIG. 11A until time $t_7$. For the timing diagram 1150 of FIG. 11B, an ARQ sequence is selected for STA1 to acknowledge reception of the DL MU packet 1112, and a HARQ sequence is selected for STA2 to acknowledge reception of the DL MU packet 1122. Thus, in some implementations, the transmission of the first PSDUs 1-S1 and 1-S2 and the third PSDUs 3-S1 and 3-S2 may correspond to a HARQ sequence, and reception of the third PSDUs 3-S1 and 3-S2 by the AP may signal a beginning of a hybrid ARQ/HARQ sequence in which STA1 transmits the packet 1113 using a HARQ sequence and STA2 transmits a packet 1130 using a ARQ sequence.

Figure 12A:
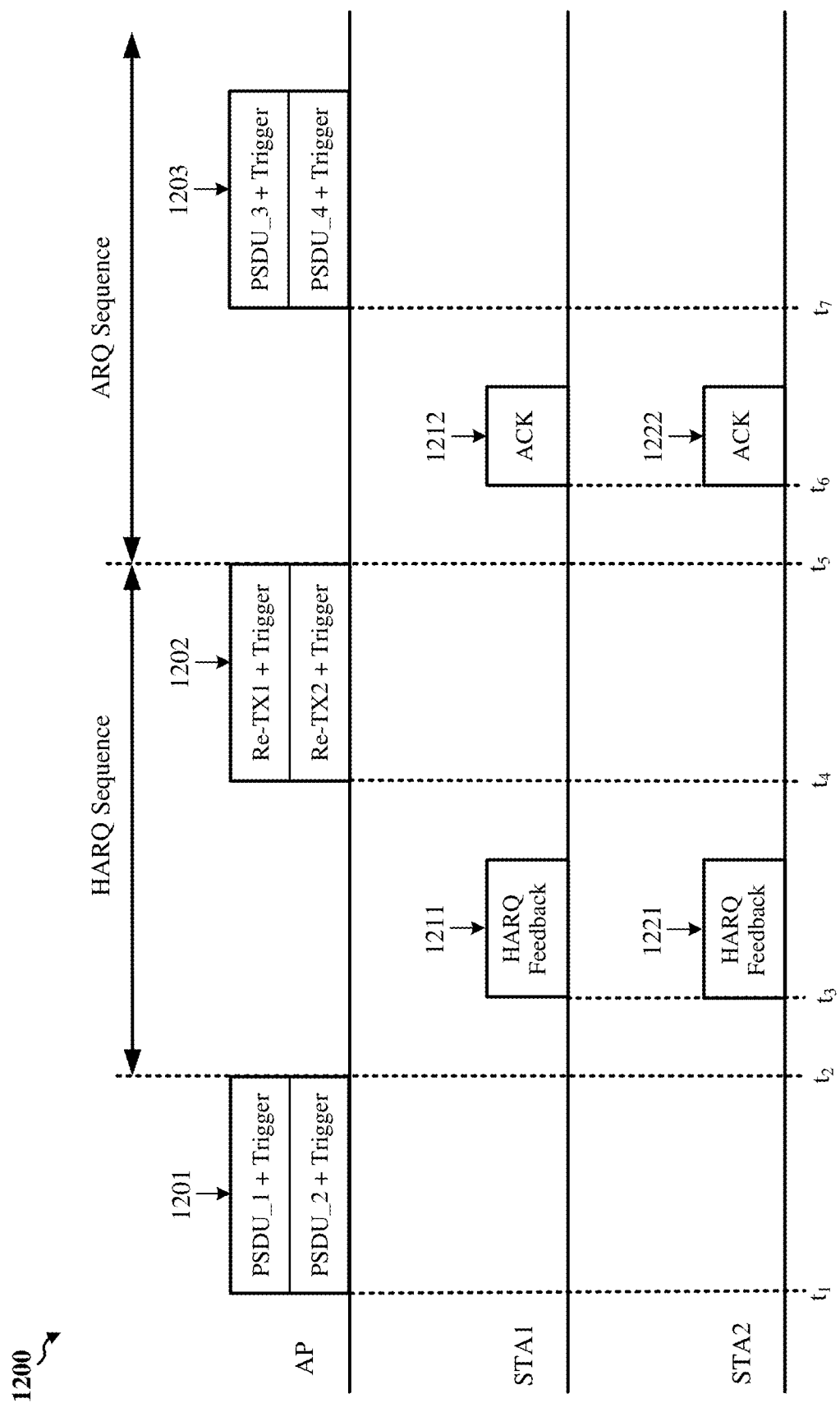
FIG. 12A shows a timing diagram illustrating the transmissions of communications in the example processes of FIGS. 9A and 9B according to some implementations.

FIG. 12A shows a timing diagram 1200 illustrating the transmissions of communications in the example processes 900 and 910 of FIGS. 9A and 9B, respectively, according to some implementations. The AP of FIG. 12A may be any suitable wireless communication device such as the AP 102 and 502 described above with reference to FIGS. 1 and 5A, respectively, and each of the stations STA1-STA2 may be any suitable wireless communication device such as one of the STAs 104 and 504 described above with reference to FIGS. 1 and 5B, respectively. Although the timing diagram 1200 shows two wireless communication devices STA1-STA2 as receiving devices, the example processes 900 and 910 may include other numbers of receiving devices.

At time $t_1$, the AP transmits a DL packet 1201 to the stations STA1 and STA2. In some implementations, the DL packet 1201 may include a first PSDU_1 for STA1 and may include a second PSDU_2 for STA2. Each of the first PSDU_1 and the second PSDU_2 may include a number of MPDUs each containing one or more data frames (such as MSDUs or MAC frames). The MPDUs included in each of the first PSDU_1 and the second PSDU_2 may be encoded using an LDPC encoding technique, and may be transmitted to the stations STA1 and STA2 as LDPC codewords. In some implementations, the first PSDU_1 and the second PSDU_2 may be transmitted to the stations STA1 and STA2 as either DL MU data or DL OFDMA data. In one or more implementations, the DL packet 1201 may also include first trigger frames to solicit HARQ feedback frames from the stations STA1 and STA2.

The stations STA1 and STA2 receive the DL packet 1201, and may determine whether any portions of the corresponding first PSDU_1 and the second PSDU_2 are not successfully decoded. At time $t_3$, STA1 may transmit a HARQ feedback frame 1211 to the AP, and STA2 may transmit a HARQ feedback frame 1221 to the AP, concurrently. In some implementations, the HARQ feedback frames 1211 and 1221 may be transmitted concurrently to the AP either as UL MU data or as UL OFDMA data. The HARQ feedback frame 1211 may indicate portions of the first PSDU_1 that were not successfully decoded by STA1, and the HARQ feedback frame 1221 may indicate portions of the second PSDU_2 that were not successfully decoded by STA2.

At time $t_4$, the AP transmits a DL packet 1202 to the stations STA1 and STA2 in response to receiving the HARQ feedback frames 1211 and 1221. In some implementations, the DL packet 1202 may include the indicated portions of PSDU_1 that were not successfully decoded by STA1, and may include the indicated portions of PSDU_2 that were not successfully decoded by STA2. In some implementations, PSDU_1 and PSDU_2 may be transmitted to the stations STA1 and STA2 as either DL MU data or DL OFDMA data. In one or more implementations, the DL packet 1201 may also include second trigger frames to solicit ACK frames from the stations STA1 and STA2.

The stations STA1 and STA2 receive the DL packet 1202, and may determine whether any portions of the corresponding indicated portions of PSDU_1 and PSDU_2 are not successfully decoded. At time $t_6$, STA1 may transmit an ACK frame 1212 to the AP, and STA2 may transmit an ACK frame 1222 to the AP, concurrently.

At time $t_7$, the AP may transmit a DL packet 1203 to the stations STA1 and STA2. In some implementations, the DL packet 1203 may include a third PSDU_3 for STA1 and may include a fourth PSDU_4 for STA2. Each of the third PSDU_3 and the fourth PSDU_4 may include a number of MPDUs each containing one or more data frames (such as MSDUs or MAC frames). The MPDUs included in each of the third PSDU_3 and the fourth PSDU_4 may be encoded using an LDPC encoding technique, and may be transmitted to the stations STA1 and STA2 as LDPC codewords. In some implementations, the third PSDU_3 and the fourth PSDU_4 may be transmitted to the stations STA1 and STA2 as either DL MU data or DL OFDMA data. In one or more implementations, the DL packet 1203 may also include third trigger frames to solicit acknowledgement frames from the stations STA1 and STA2.

Figure 12B:
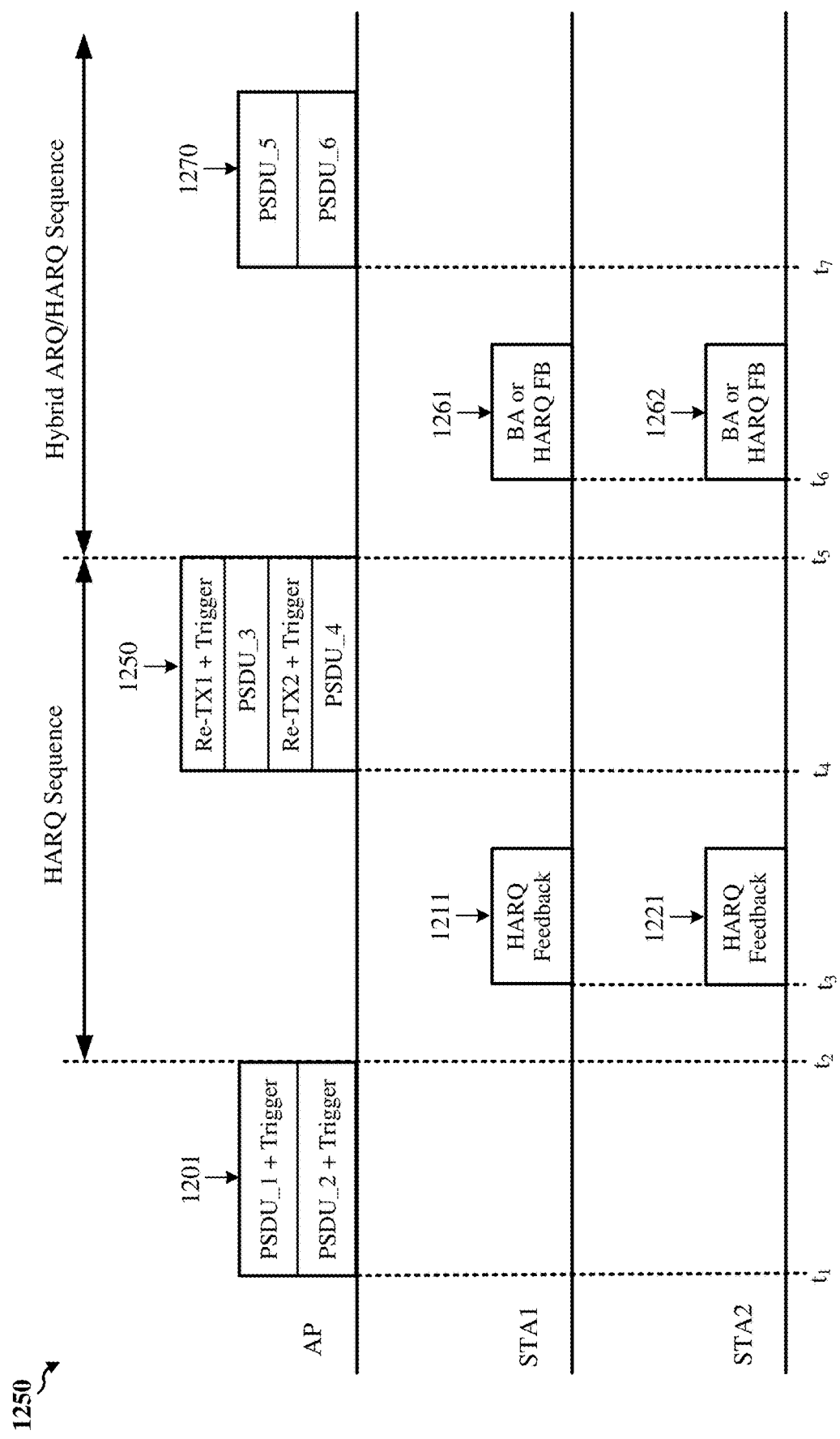
FIG. 12B shows a timing diagram illustrating the transmissions of communications in the example processes of FIGS. 9A and 9B according to some other implementations.

FIG. 12B shows a timing diagram 1250 illustrating the transmissions of communications in the example processes 900 and 910 of FIGS. 9A and 9B, respectively, according to some other implementations. The AP of FIG. 12A may be any suitable wireless communication device such as the AP 102 and 502 described above with reference to FIGS. 1 and 5A, respectively, and each of the stations STA1-STA2 may be any suitable wireless communication device such as one of the STAs 104 and 504 described above with reference to FIGS. 1 and 5B, respectively. Although the timing diagram 1250 shows two wireless communication devices STA1-STA2 as receiving devices, the example processes 900 and 910 may include other numbers of receiving devices.

In some implementations, the timing diagram 1200B is similar to the timing diagram 1200A of FIG. 12A until time $t_6$. At time $t_6$, STA1 may transmit a packet 1261 containing either a BA frame or a HARQ feedback frame indicating one or more portions of PSDU_3 that were not successfully decoded, and STA2 may transmit a packet 1262 containing either a BA frame or a HARQ feedback frame indicating one or more portions of PSDU_4 that were not successfully decoded, concurrently.

At time $t_7$, the AP transmits a DL packet 1270 to the stations STA1 and STA2. In some implementations, the DL packet 1201 may include a fifth PSDU_5 for STA1 and may include a sixth PSDU_6 for STA2. Each of the fifth PSDU_5 and the sixth PSDU_6 may include a number of MPDUs each containing one or more data frames (such as MSDUs or MAC frames). The MPDUs included in each of the fifth PSDU_5 and the sixth PSDU_6 may be encoded using an LDPC encoding technique, and may be transmitted to the stations STA1 and STA2 as LDPC codewords. In some implementations, the fifth PSDU_5 and the sixth PSDU_6 may be transmitted to the stations STA1 and STA2 as either DL MU data or DL OFDMA data.

Figure 13A:
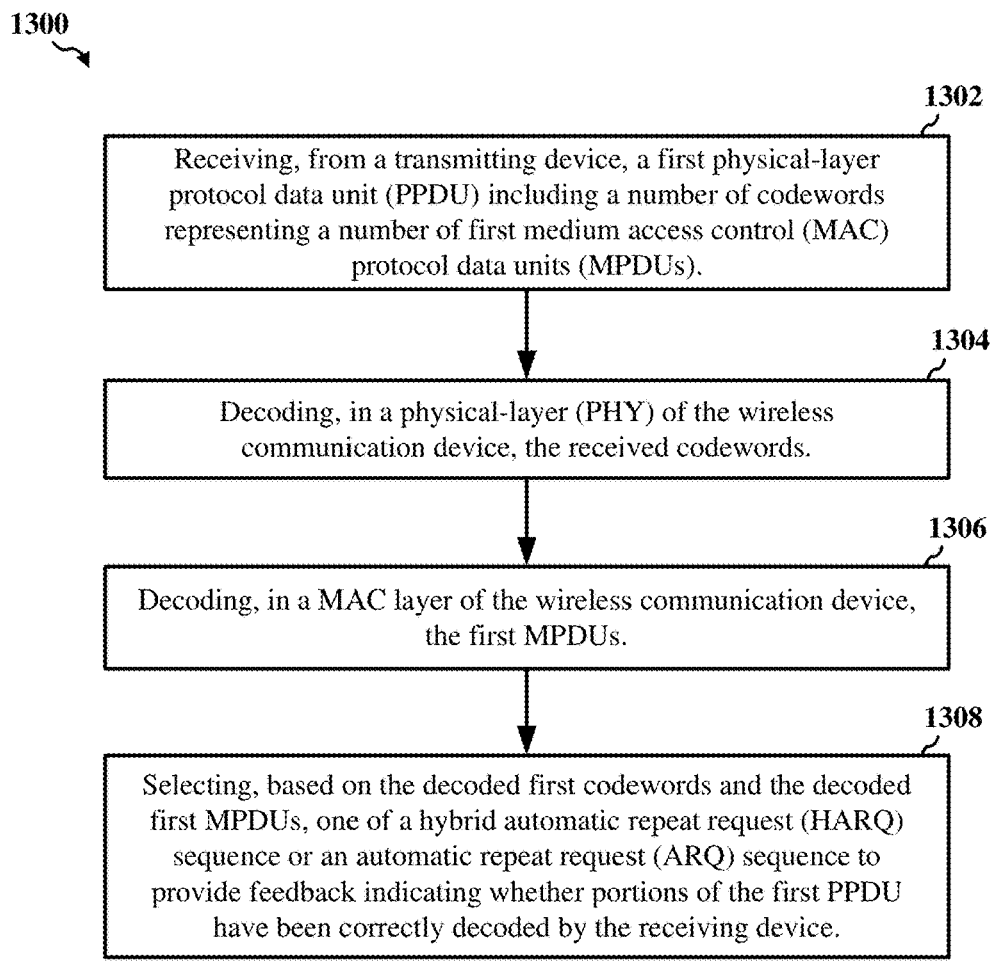
FIG. 13A shows a flowchart illustrating an example process for wireless communication that supports HARQ and ARQ techniques according to some implementations.

FIG. 13A shows a flowchart illustrating an example process 1300 for wireless communication that supports HARQ and ARQ techniques according to some implementations. The process 1300 may be performed by a wireless communication device such as the wireless communication device 500 described above with reference to FIG. 5. In some implementations, the process 1300 may be performed by a wireless communication device operating as or within a STA, such as one of the STAs 104 and 604 described above with reference to FIGS. 1 and 6B, respectively. In other implementations, the process 1300 may be performed by a wireless communication device operating as or within an AP, such as one of the APs 102 and 602 described above with reference to FIGS. 1 and 6A, respectively.

In some implementations, the process 1300 begins in block 1302 with receiving, from a transmitting device, a first physical-layer protocol data unit (PPDU) including a number of codewords representing a number of first medium access control (MAC) protocol data units (MPDUs). In block 1304, the process 1300 proceeds with decoding, in a physical-layer (PHY) of the wireless communication device, the received codewords. In block 1306, the process 1300 proceeds with decoding, in a MAC layer of the wireless communication device, the first MPDUs. In block 1308, the process 1300 proceeds with selecting, based on the decoded first codewords and the decoded first MPDUs, one or both of a hybrid automatic repeat request (HARQ) sequence or an automatic repeat request (ARQ) sequence to provide feedback indicating whether portions of the first PPDU have been successfully decoded by the wireless communication device.

In some implementations, the first PPDU received in block 1302 includes a number of first MPDUs that may be aggregated to form an A-MPDUs, and the received codewords includes a number of first LDPC codewords each containing a number of information bits and a number of parity bits. For example, groups of the information bits may represent corresponding ones of the first MPDUs, and groups of the parity bits may, in some instances, be used to correct errors in the corresponding ones of the first LDPC codewords.

In some implementations, decoding the received codewords in block 1304 includes processing the plurality of first codewords in the PHY of the receiving device to determine if the first codewords are correct or not, and uses this information to construct a first list indicating the receive status of each of the first codewords. The first list, which may be used to construct a corresponding HARQ feedback frame, may include a plurality of status bits each indicating whether a corresponding one of the received first codewords is successfully received or not. In some aspects, a status bit is set to logic 1 to indicate that a corresponding codeword is successfully received, or is set to logic 0 to indicate that the corresponding codeword is not successfully received. For example, the PHY may provide the first list as a HARQ feedback frame to the receiving device's MAC layer. In some aspects, the PHY may provide the status bits to the MAC as they are generated. In other aspects, the PHY may provide the status bits to the MAC after receiving the last bits of the first PPDU.

In some implementations, decoding the first MPDUs in block 1306 includes receiving decoded bits of the first PPDU's data field from the PHY, and using the decoded bits to construct delimiters and end-of-frame (EOF) information associated with the first MPDUs. The MAC layer may use the constructed delimiters and EOF information to form a bitmap indicating the receive status of each of the first MPDUs. For example, the MAC layer may generate a corresponding ARQ feedback frame based on the receive status of the first MPDUs, the EOF information, the MPDU delimiters, and Ack Policy of the first MPDUs. In some aspects, the ARQ feedback frame may be an ACK frame. In other aspects, the ARQ feedback frame may be a BA frame.

In some implementations, selecting one or both of the HARQ sequence or the ARQ sequence in block 1308 includes selecting the ARQ sequence if all of the first codewords are successfully received and successfully decoded, or if at least one of the successfully decoded first MPDUs that is preceded by an EOF=1, has a nonzero length MPDU delimiter, and solicits an immediate response (such as when the ACK policy is set to normal or is set to an implicit BAR). In addition, or in the alternative, selecting one or both of the HARQ sequence or the ARQ sequence in block 1308 includes selecting the HARQ sequence if one or more of the received first codewords are not successfully received or successfully decoded. In one or more implementations, the MAC layer may determine that the information provided by the PHY is unreliable (such as because all of the first MPDUs were successfully received even though the PHY indicated that one or more corresponding codewords were not successfully received).

Figure 13B:
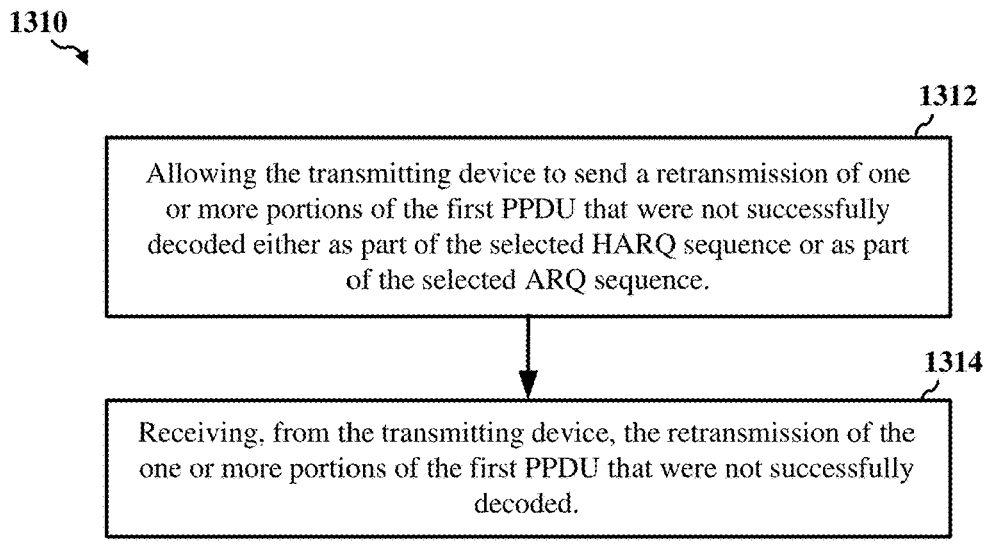
FIG. 13B shows a flowchart illustrating an example process for wireless communication that supports HARQ and ARQ techniques according to some implementations.

FIG. 13B shows a flowchart illustrating an example process 1310 for wireless communication that supports HARQ and ARQ techniques according to other some implementations. The process 1310 may be performed by a wireless communication device such as the wireless communication device 500 described above with reference to FIG. 5. In some implementations, the process 1310 may be performed by a wireless communication device operating as or within a STA, such as one of the STAs 104 and 604 described above with reference to FIGS. 1 and 6B, respectively. In other implementations, the process 1310 may be performed by a wireless communication device operating as or within an AP, such as one of the APs 102 and 602 described above with reference to FIGS. 1 and 6A, respectively. In some implementations, the process 1310 begins after the process 1300 described with reference to FIG. 13A. For example, the process 1310 may begin in block 1312, after the selection of one or both of the HARQ sequence or the ARQ sequence in block 1308, with allowing the transmitting device to send a retransmission of one or more portions of the first PPDU that were not successfully decoded either as part of the selected HARQ sequence or as part of the selected ARQ sequence. In block 1314, the process 1310 proceeds with receiving, from the transmitting device, the retransmission of the one or more portions of the first PPDU that were not successfully decoded.

Figure 13C:
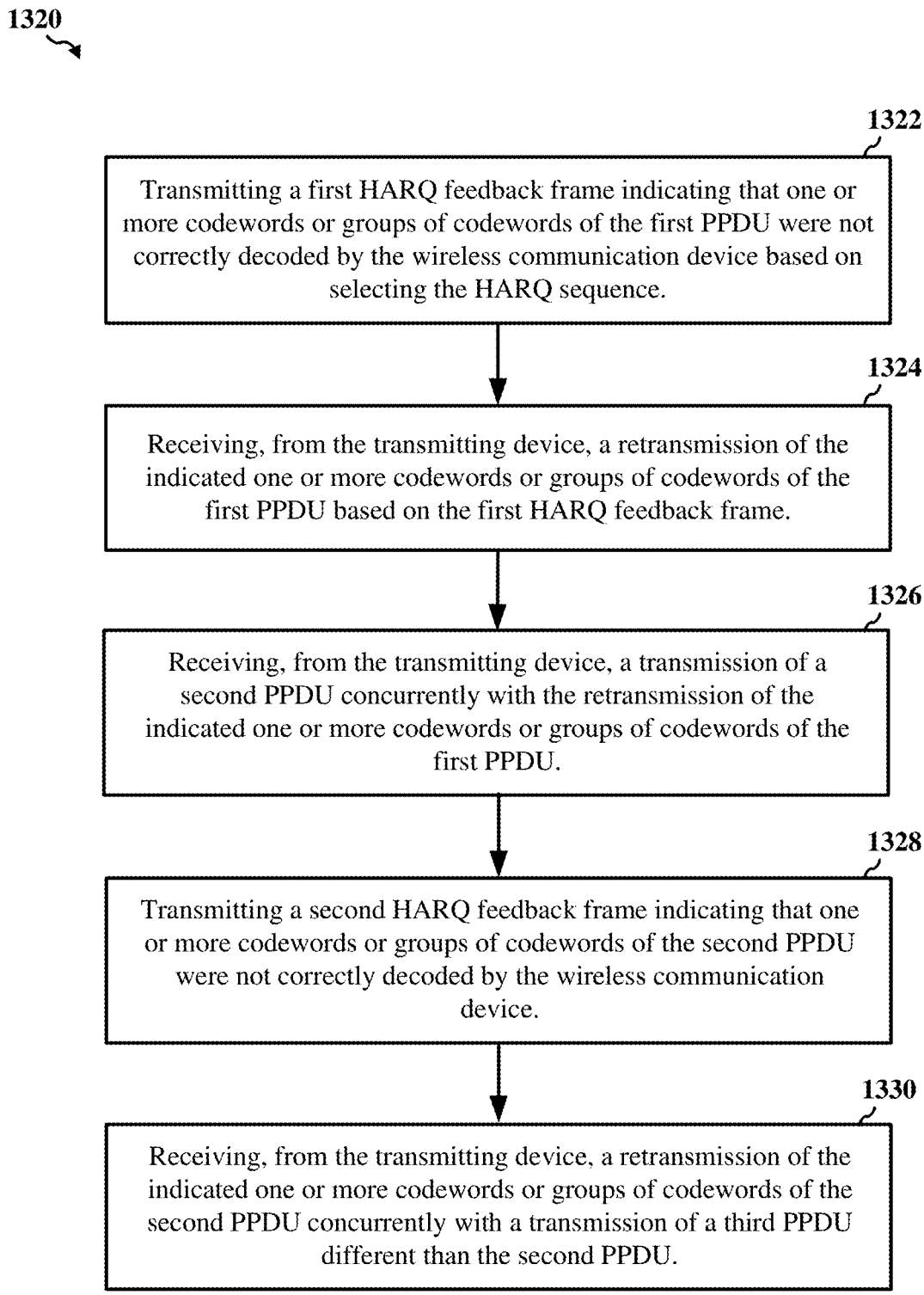
FIG. 13C shows a flowchart illustrating an example process for wireless communication that supports HARQ and ARQ techniques according to some other implementations.

FIG. 13C shows a flowchart illustrating an example process 1320 for wireless communication that supports HARQ and ARQ techniques according to other some implementations. The process 1320 may be performed by a wireless communication device such as the wireless communication device 500 described above with reference to FIG. 5. In some implementations, the process 1320 may be performed by a wireless communication device operating as or within a STA, such as one of the STAs 104 and 604 described above with reference to FIGS. 1 and 6B, respectively. In other implementations, the process 1320 may be performed by a wireless communication device operating as or within an AP, such as one of the APs 102 and 602 described above with reference to FIGS. 1 and 6A, respectively.

In some implementations, the process 1320 begins after the process 1300 described with reference to FIG. 13A. For example, the process 1320 may begin in block 1322, after the selection of one or both of the HARQ sequence or the ARQ sequence in block 1308, with transmitting a first HARQ feedback frame indicating that one or more codewords or groups of codewords of the first PPDU were not successfully decoded by the receiving device based on selecting the HARQ sequence. In block 1324, the process 1320 continues with receiving, from the transmitting device, a retransmission of the indicated one or more codewords or groups of codewords of the first PPDU based on the first HARQ feedback frame. In block 1326, the process 1320 continues with receiving, from the transmitting device, a transmission of a second PPDU concurrently with the retransmission of the indicated one or more codewords or groups of codewords of the first PPDU. In block 1328, the process 1320 continues with transmitting a second HARQ feedback frame indicating that one or more codewords or groups of codewords of the second PPDU were not successfully decoded by the wireless communication device. In block 1330, the process 1320 continues with receiving, from the transmitting device, a retransmission of the indicated one or more codewords or groups of codewords of the second PPDU concurrently with a transmission of a third PPDU different than the second PPDU.

In some implementations, the first HARQ feedback frame transmitted in block 1322 includes a bitmap identifying each of the one or more codewords or groups of codewords of the first PPDU that were not successfully decoded (or not received at all). In addition, or in the alternative, the first HARQ feedback frame transmitted in block 1322 includes a bitmap identifying each of the first MPDUs that were not successfully decoded.

In some implementations, the indicated one or more codewords or groups of codewords retransmitted in block 1324 may be a subset of the number of codewords that encode the first PPDU. For example, the one or more codewords or groups of codewords to be retransmitted may be indicated in the first HARQ feedback frame transmitted in block 1322.

In some implementations, the second PPDU received in block 1326 includes a number of second MPDUs that may be aggregated to form an A-MPDUs, and the received codewords includes a number of second LDPC codewords each containing a number of information bits and a number of parity bits. For example, groups of the information bits may represent corresponding ones of the second MPDUs, and groups of the parity bits may, in some instances, be used to correct errors in corresponding ones of the second LDPC codewords.

In some implementations, the second HARQ feedback frame transmitted in block 1328 includes a bitmap identifying each of the one or more codewords or groups of codewords of the second PPDU that were not successfully decoded (or not received at all). In addition, or in the alternative, the second HARQ feedback frame transmitted in block 1328 includes a bitmap identifying each of the second MPDUs that were not successfully decoded.

FIG. 13D shows a flowchart illustrating an example process 1340 for wireless communication that supports HARQ and ARQ techniques according to other some implementations. The process 1340 may be performed by a wireless communication device such as the wireless communication device 500 described above with reference to FIG. 5. In some implementations, the process 1340 may be performed by a wireless communication device operating as or within a STA, such as one of the STAs 104 and 604 described above with reference to FIGS. 1 and 6B, respectively. In other implementations, the process 1340 may be performed by a wireless communication device operating as or within an AP, such as one of the APs 102 and 602 described above with reference to FIGS. 1 and 6A, respectively.

In some implementations, the process 1340 begins after the process 1300 described with reference to FIG. 13A. For example, the process 1340 may begin in block 1342, after the selection of one or both of the HARQ sequence or the ARQ sequence in block 1308, with transmitting a first block acknowledgement (BA) frame indicating that one or more of the first MPDUs of the first PPDU were not successfully decoded by the wireless communication device based on selecting the ARQ sequence. In block 1344, the process 1340 continues with receiving, from the transmitting device, a retransmission of the indicated one or more of the first MPDUs of the first PPDU based on the first BA frame. In block 1346, the process 1340 continues with receiving, from the transmitting device, a transmission of a second PPDU concurrently with the retransmission of the one or more of the first MPDUs of the first PPDU. In block 1348, the process 1340 continues with transmitting a second BA frame indicating that one or more second MPDUs of the second PPDU were not successfully decoded by the wireless communication device. In block 1350, the process 1340 continues with receiving, from the transmitting device, a retransmission of the indicated one or more second MPDUs of the second PPDU concurrently with a transmission of a third PPDU different than the second PPDU.

In some implementations, the first BA frame transmitted in block 1342 includes a bitmap identifying each of the one or more of the first MPDUs of the first PPDU that were not successfully decoded.

In some implementations, the indicated one or more of the first MPDUs of the first PPDU retransmitted in block 1344 may be indicated in the first BA frame transmitted in block 1342.

In some implementations, the second PPDU received in block 1326 includes a number of second MPDUs that may be aggregated to form an A-MPDUs, and the received codewords includes a number of second LDPC codewords each containing a number of information bits and a number of parity bits. For example, groups of the information bits may represent corresponding ones of the second MPDUs, and groups of the parity bits may, in some instances, be used to correct errors in corresponding ones of the second LDPC codewords.

In some implementations, the second BA frame transmitted in block 1348 includes a bitmap identifying each of the one or more of the second MPDUs of the second PPDU that were not successfully decoded.

Figure 14:
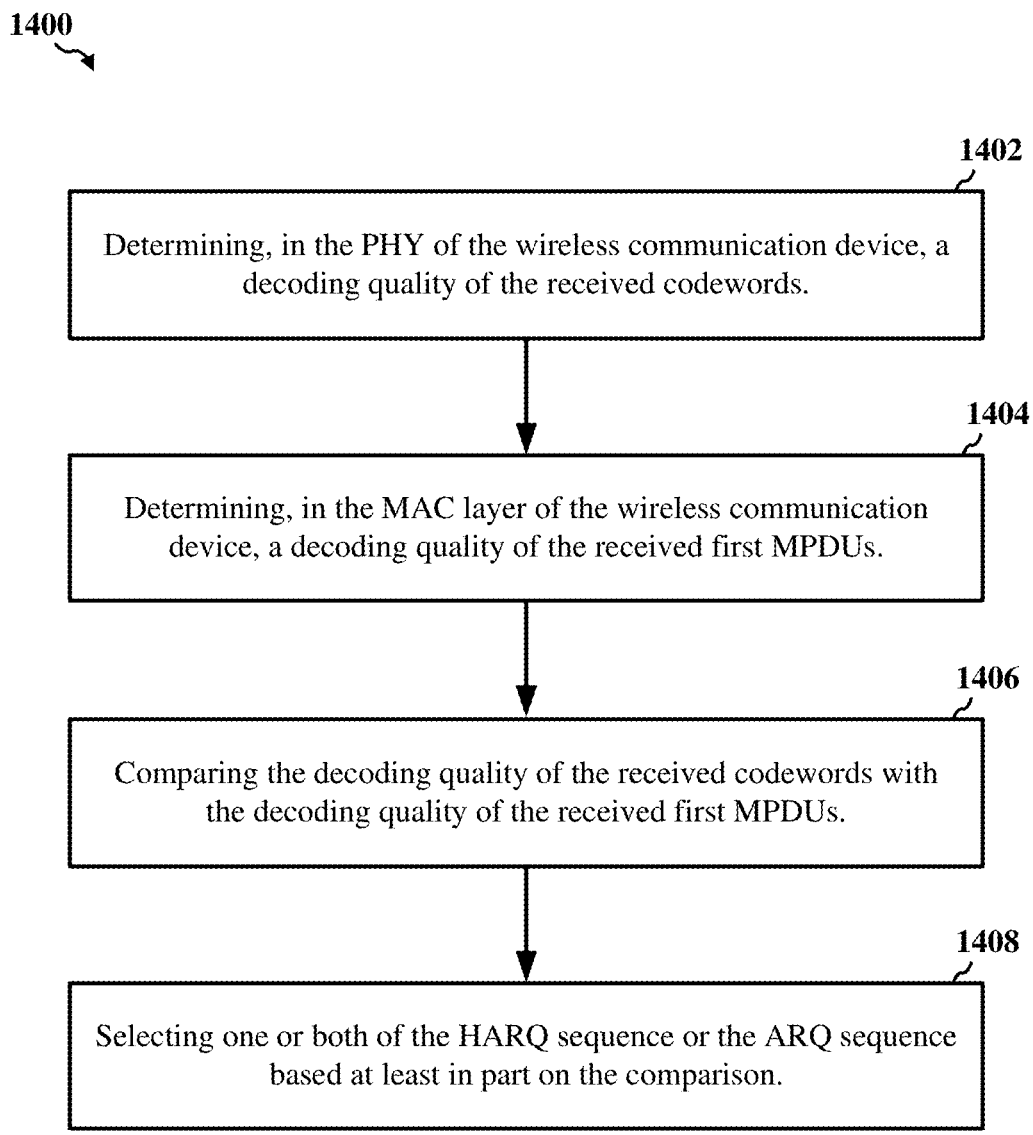
FIG. 14 shows a flowchart illustrating an example process for wireless communication that supports HARQ and ARQ techniques according to some other implementations.

FIG. 14 shows a flowchart illustrating an example process 1400 for wireless communication that supports HARQ and ARQ techniques according to other some implementations. The process 1400 may be performed by a wireless communication device such as the wireless communication device 500 described above with reference to FIG. 5. In some implementations, the process 1400 may be performed by a wireless communication device operating as or within a STA, such as one of the STAs 104 and 604 described above with reference to FIGS. 1 and 6B, respectively. In other implementations, the process 1400 may be performed by a wireless communication device operating as or within an AP, such as one of the APs 102 and 602 described above with reference to FIGS. 1 and 6A, respectively. For example, the process 1400 may be an example implementation of the process 1308 described with reference to FIG. 13A.

In some implementations, the process 1400 begins in block 1402 with determining, in the PHY of the wireless communication device, a decoding quality of the received codewords. In block 1404, the process 1400 proceeds with determining, in the MAC layer of the wireless communication device, a decoding quality of the received first MPDUs. In block 1406, the process 1400 proceeds with comparing the decoding quality of the received codewords with the decoding quality of the received first MPDUs. In block 1408, the process 1400 proceeds with selecting one or both of the HARQ sequence or the ARQ sequence based at least in part on the comparison.

Figure 15A:
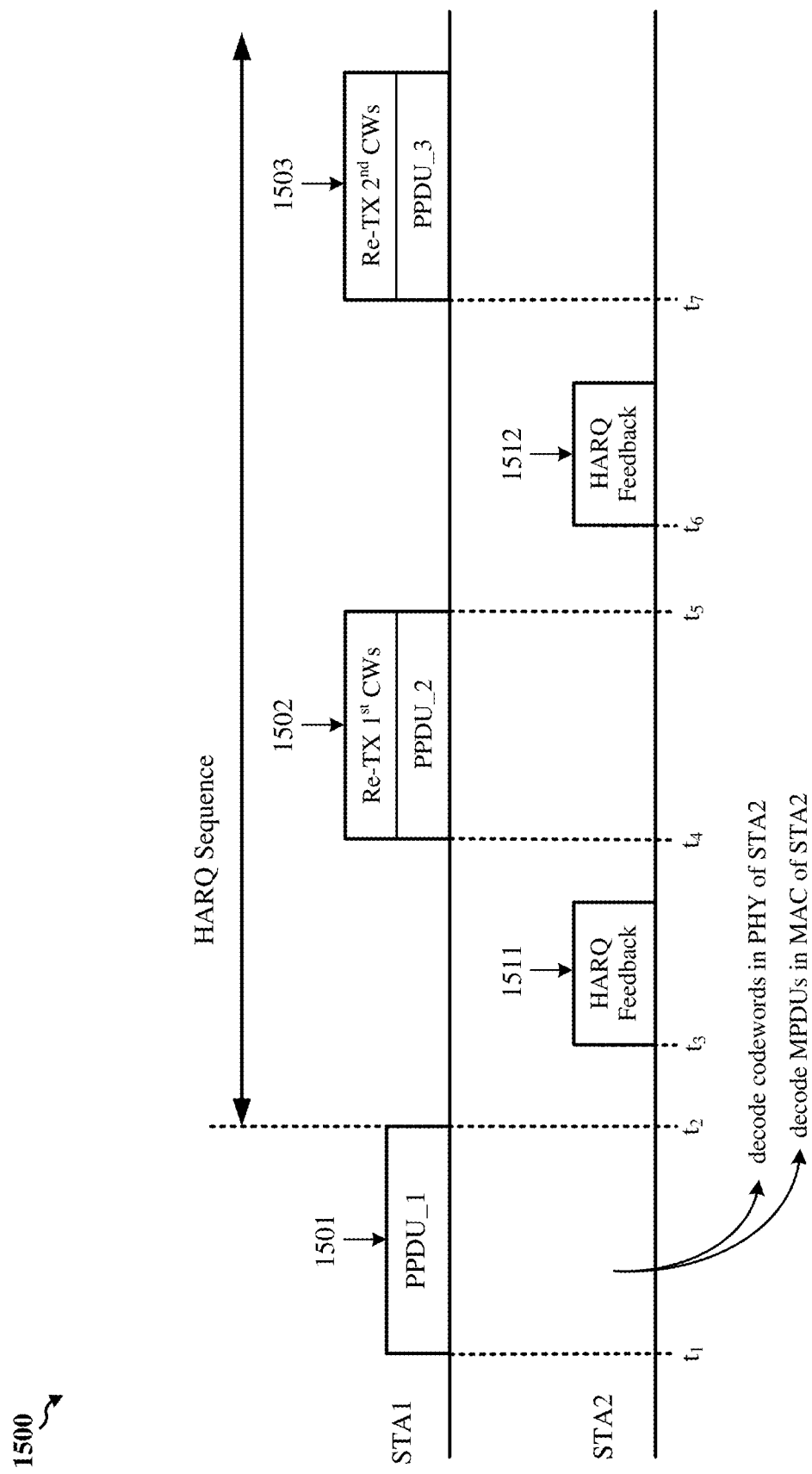
FIG. 15A shows a timing diagram illustrating the transmissions of communications in the processes of FIGS. 13A, 13B, and 13C according to some implementations.

FIG. 15A shows a timing diagram 1500 illustrating the transmissions of communications in one or more of the processes 1300, 1310, and 1320 of FIGS. 13A, 13B, and 13C, respectively, according to some implementations. In some implementations, the communications may be exchanged between a first wireless station (STA1) and a second wireless station (STA2). Each of the stations STA1 and STA2 may be any suitable wireless communication device such as one of the STAs 104 and 504 described above with reference to FIGS. 1 and 5B, respectively. In the timing diagram 1500, STA1 may be the transmitting device, and STA2 may be the receiving device.

At time $t_1$, STA1 transmits a first PPDU (PPDU_1) to STA2. The first PPDU may include a number of first MPDUs each containing one or more data frames (such as MSDUs or MAC frames). The first MPDUs may be encoded using an LDPC encoding technique, and transmitted to STA2 as a number of first LDPC codewords representing the number of first MPDUs. In some implementations, the first PPDU may be embedded within a first packet 1501 that can be transmitted to STA2 using SU-MIMO or OFDMA communications. In some aspects, the first packet 1501 may be an A-MPDU.

Between times $t_1$ and $t_2$, STA2 receives the first PPDU (or at least a portion of the first PPDU). In some implementations, a physical-layer (PHY) of STA2 may decode the number of first LDPC codewords contained in the first PPDU, and a MAC layer of STA2 may decode the first MPDUs encoded in the first PPDU. In the example of FIG. 15A, STA2 may determine to use an HARQ sequence to provide feedback indicating whether portions of the first PPDU have been successfully decoded.

At time $t_3$, STA2 transmits a first hybrid automatic repeat request (HARQ) feedback frame 1511 to STA1. The first HARQ feedback frame 1511 may indicate that one or more codewords or groups of codewords of the first PPDU were not successfully decoded. In some implementations, the first HARQ feedback frame 1511 may include a codeword-based bitmap identifying one or more codewords or groups of codewords of the first PPDU that were not successfully decoded by STA2. In addition, or in the alternative, first HARQ feedback frame 1511 may include an MPDU-based bitmap identifying a number of first MPDUs that were not successfully decoded by STA2.

STA1 receives the first HARQ feedback frame 1511, and determines the one or more codewords or groups of codewords of the first PPDU to be retransmitted. At time $t_4$, STA1 retransmits the indicated one or more codewords or groups of codewords of the first PPDU to STA2. In some implementations, STA1 may transmit a second PPDU (PPDU_2), different than the first PPDU, concurrently with the retransmitted codewords or groups of codewords of the first PPDU to STA2 as a second packet 1502. The second packet 1502 may be transmitted as either SU-MIMO data or OFDMA data. In some implementations, the second PPDU may include a number of second MPDUs each containing one or more data frames (such as MSDUs or MAC frames). The second MPDUs may be encoded and transmitted to STA2 as a number of second LDPC codewords representing the number of second MPDUs.

In some implementations, STA1 may retransmit the indicated one or more codewords or groups of codewords of the first PPDU using a first RU, and may transmit the second PPDU using a second RU different than the first RU. In other implementations, STA1 may retransmit the indicated one or more codewords or groups of codewords of the first PPDU using a first group of RUs, and may transmit the second PPDU using a second group of RUs. In some other implementations, STA1 may retransmit the indicated one or more codewords or groups of codewords of the first PPDU using a first set of spatial streams, and may transmit the second PPDU using second set of spatial streams different than the first set of spatial streams.

Between times $t_4$ and $t_5$, STA2 receives the second packet 1502 including the second PPDU and the retransmitted one or more codewords or groups of codewords of the first PPDU. In some implementations, the PHY of STA2 may decode the number of second LDPC codewords contained in the second PPDU, and the MAC layer of STA2 may decode the second MPDUs encoded in the second PPDU. In the example of FIG. 15A, STA2 may determine to use an HARQ sequence to provide feedback indicating whether portions of the second PPDU have been successfully decoded.

At time $t_6$, STA2 transmits a second HARQ feedback frame 1512 to STA1. The second HARQ feedback frame 1512 may indicate that one or more codewords or groups of codewords of the second PPDU were not successfully decoded. In some implementations, the second HARQ feedback frame 1512 may include a codeword-based bitmap identifying one or more codewords or groups of codewords of the second PPDU that were not successfully decoded by STA2. In addition, or in the alternative, the second HARQ feedback frame 1512 may include an MPDU-based bitmap identifying a number of second MPDUs that were not successfully decoded by STA2.

STA1 receives the second HARQ feedback frame 1512, and determines the one or more codewords or groups of codewords of the second PPDU to be retransmitted. At time $t_7$, STA1 retransmits the indicated one or more codewords or groups of codewords of the second PPDU to STA2. In some implementations, STA1 may transmit a third PPDU (PPDU_3), different than the second PPDU, concurrently with the retransmitted codewords or groups of codewords of the second PPDU to STA2 as a third packet 1503. The third packet 1503 may be transmitted as either SU-MIMO data or OFDMA data. In some implementations, the third PPDU may include a number of third MPDUs each containing one or more data frames (such as MSDUs or MAC frames). The third MPDUs may be encoded and transmitted to STA2 as a number of third LDPC codewords representing the number of third MPDUs.

Figure 15B:
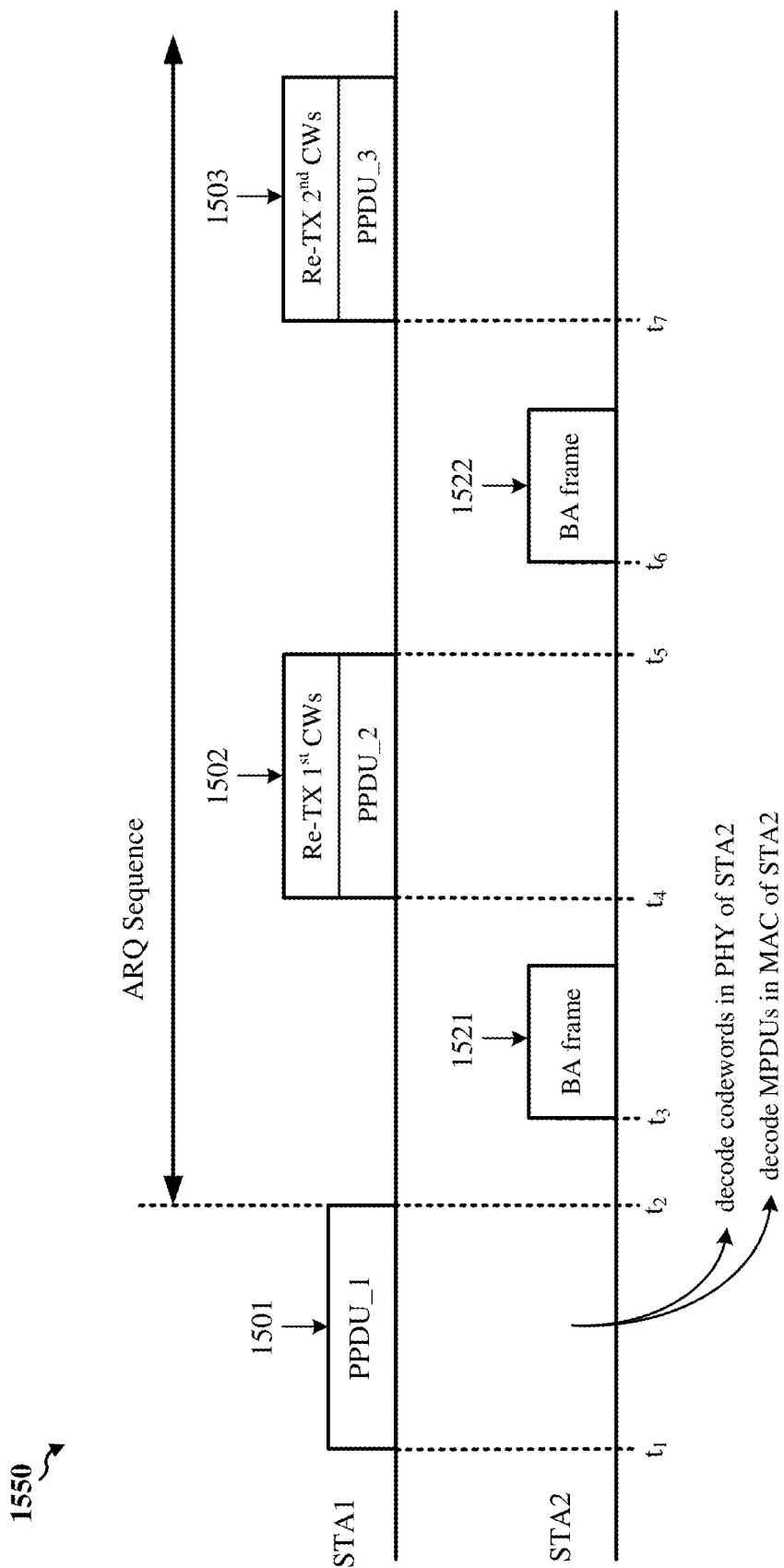
FIG. 15B shows a timing diagram illustrating the transmissions of communications in the processes of FIGS. 13A, 13B, and 13D according to some other implementations.

FIG. 15B shows a timing diagram illustrating the transmissions of communications in one or more of the processes 1300, 1310, and 1340 of FIGS. 13A, 13B, and 13D, respectively, according to some other implementations. In some implementations, the communications may be exchanged between a first wireless station (STA1) and a second wireless station (STA2). Each of the stations STA1 and STA2 may be any suitable wireless communication device such as one of the STAs 104 and 504 described above with reference to FIGS. 1 and 5B, respectively. In the timing diagram 1550, STA1 may be the transmitting device, and STA2 may be the receiving device.

In some implementations, the timing diagram 1550 is similar to the timing diagram 1500 of FIG. 15A, except that in the example of FIG. 15B, STA2 determines to provide feedback using an ARQ sequence rather than a HARQ sequence. Specifically, STA1 transmits a first BA frame 1521 to STA1 at time $t_3$, and transmits a second BA frame 1522 to STA1 at time $t_6$. The first BA frame 1521 may indicate that one or more of the first MPDUs of the first PPDU were not successfully decoded by STA2, and the second BA frame 1522 may indicate that one or more of the second MPDUs of the second PPDU were not successfully decoded by STA2.

In some implementations, the exponential backoff procedure for contending for medium access may be waived in response to one or more of a receiving device receiving a HARQ feedback frame in response to a transmitted HARQ PPDU, a HARQ feedback frame that contains a codeword-based bitmap but not an MPDU-based bitmap, or a HARQ feedback frame that consists of a NACK. This may be possible because the HARQ feedback frame may indicate that none of the MPDUs received from a transmitting device were successfully decoded or successfully received.

Figure 16A:
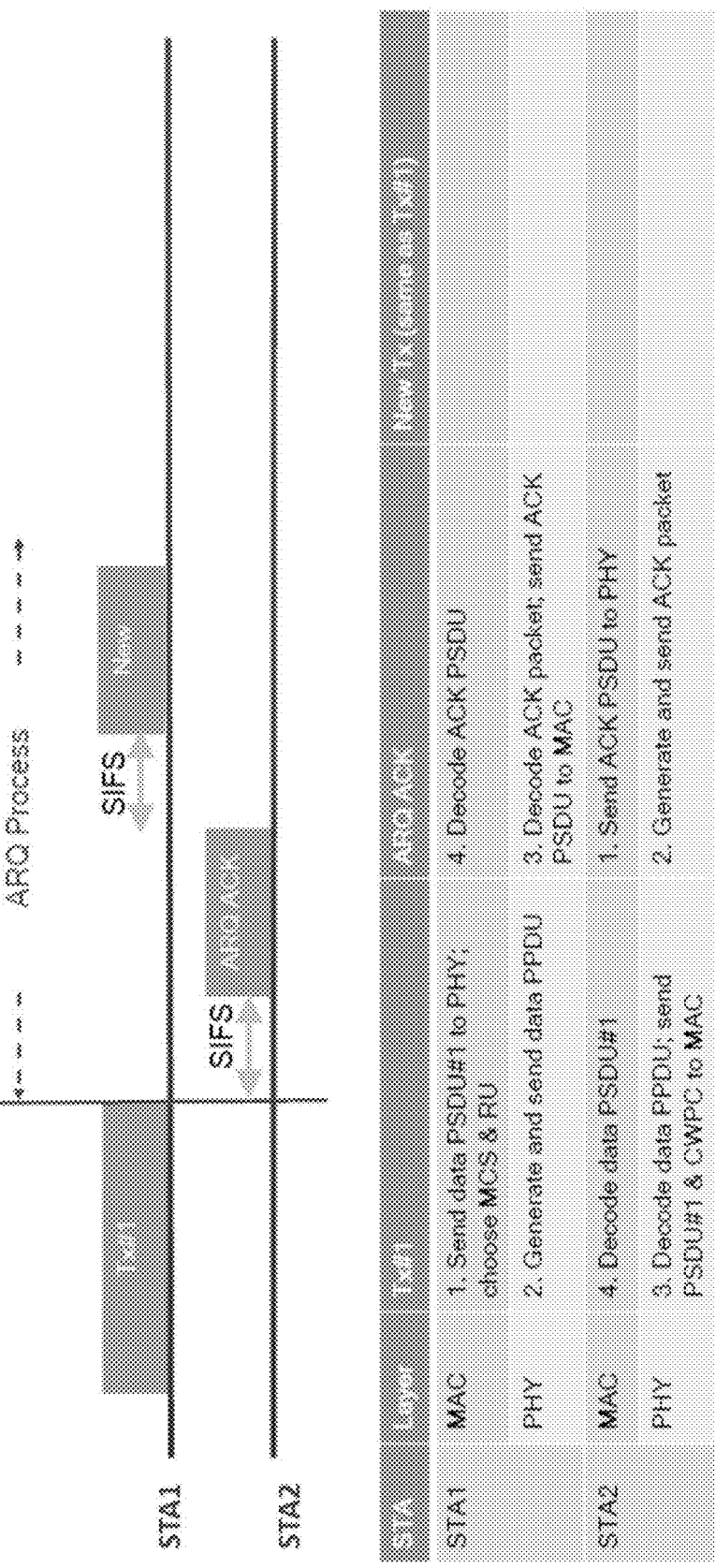
FIG. 16A shows a sequence diagram illustrating an example process for wireless communication that supports HARQ and ARQ techniques according to some implementations.

FIG. 16A shows a sequence diagram 1600A illustrating the transmissions of communications that support HARQ and ARQ techniques according to some implementations. In the timing diagram 1600A, the initial data transmission from STA1 is successfully decoded by STA2, for example, such that data units corresponding to the initial data transmission pass the LDPC codeword parity check. In response thereto, STA2 transmits an ARQ ACK frame confirming reception of the initial data transmission.

Figure 16B:
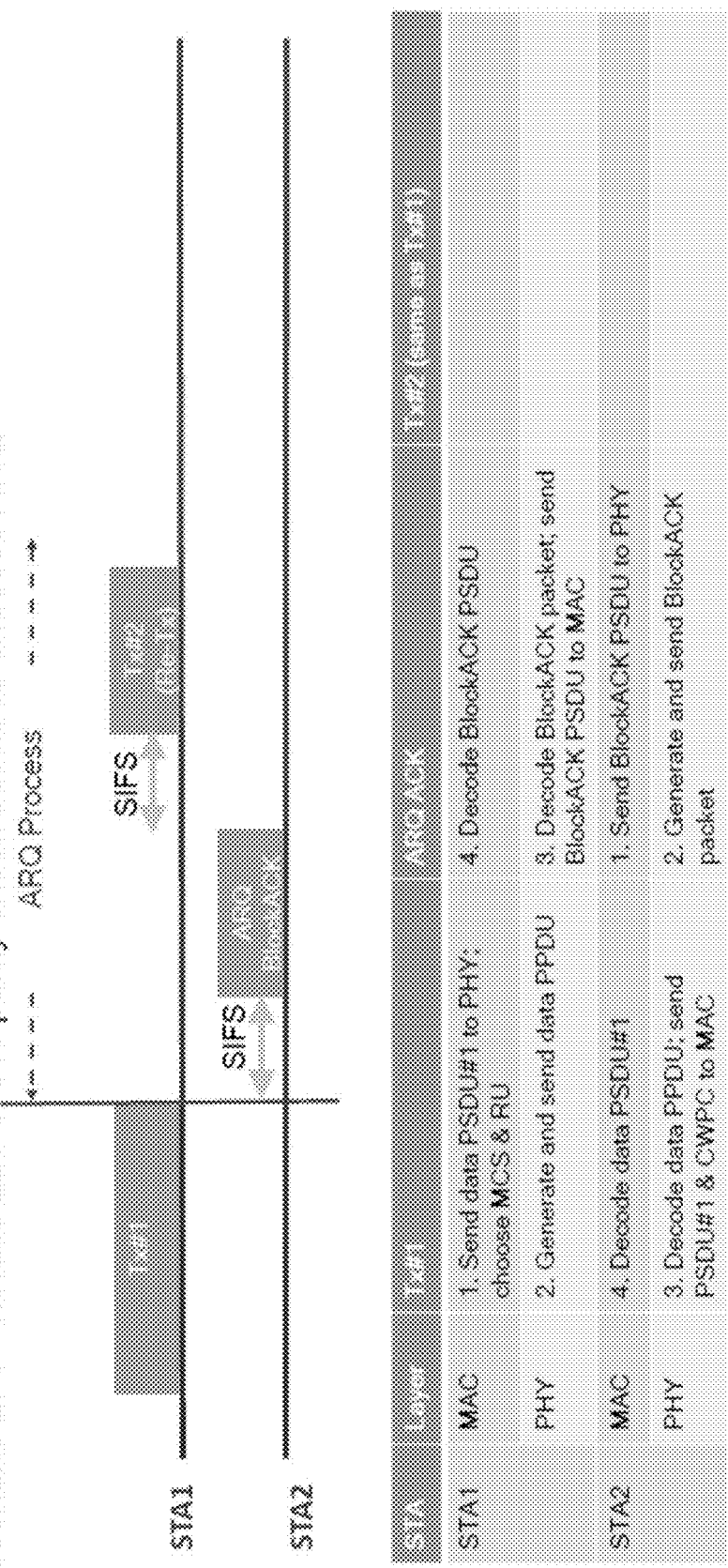
FIG. 16B shows a sequence diagram illustrating an example process for wireless communication that supports HARQ and ARQ techniques according to some other implementations.

FIG. 16B shows a sequence diagram 1600B illustrating the transmissions of communications that support HARQ and ARQ techniques according to some other implementations. In the timing diagram 1600B, the initial data transmission from STA1 is not successfully decoded by STA2, for example, such that data units corresponding to the initial data transmission do not pass the LDPC codeword parity check. STA2 selects an ARQ sequence to provide feedback to STA1, and transmits a BA frame to STA1. The BA frame includes a bitmap indicating one or more MPDUs of the initial data transmission that were not successfully decoded. In response to the BA frame, STA1 retransmits the indicated one or more MPDUs of the initial data transmission to STA2.

Figure 16C:
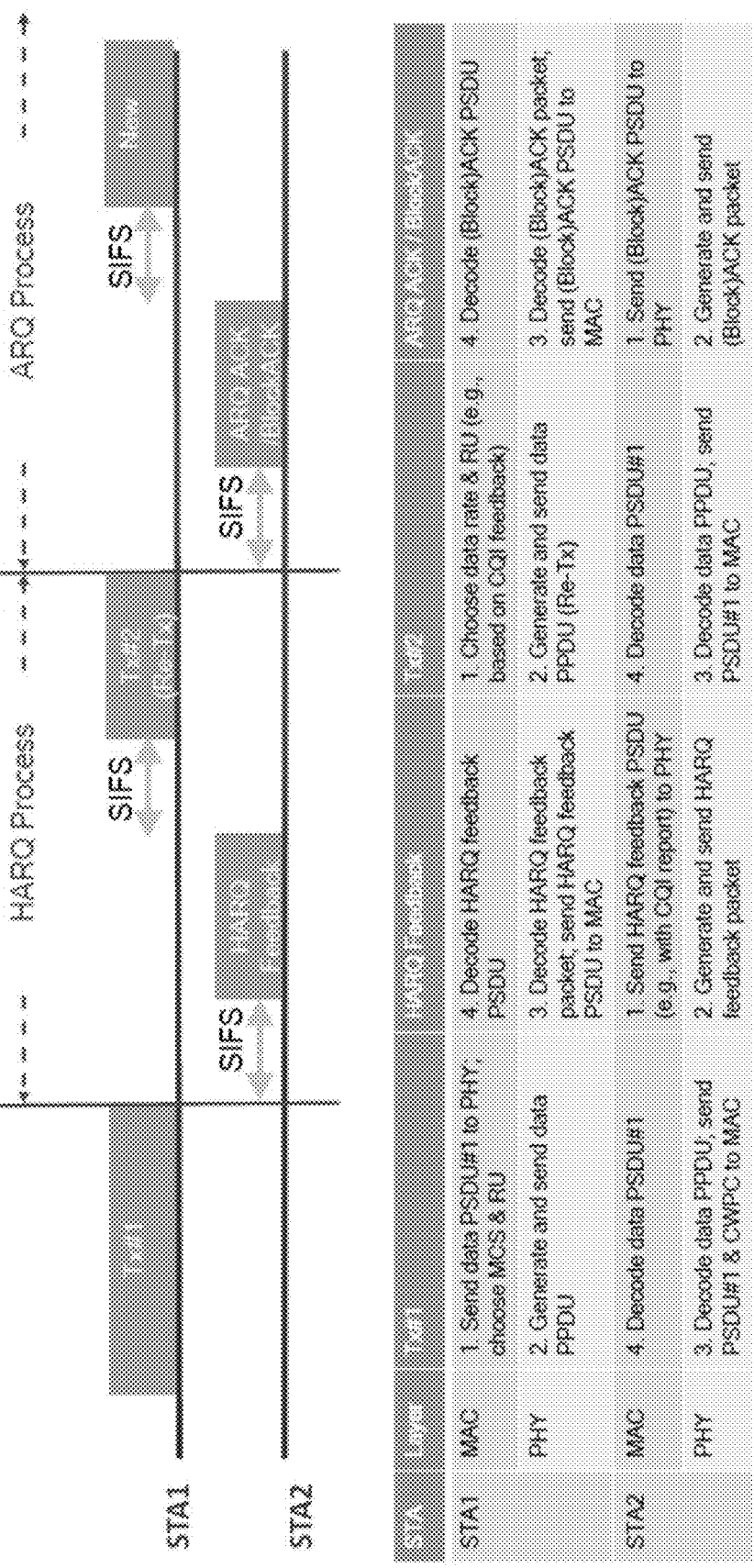
FIG. 16C shows a sequence diagram illustrating an example process for wireless communication that supports HARQ and ARQ techniques according to some other implementations.

FIG. 16C shows a sequence diagram 1600C illustrating the transmissions of communications that support HARQ and ARQ techniques according to some other implementations. In the timing diagram 1600C, the initial data transmission from STA1 is not successfully decoded by STA2, for example, such that data units corresponding to the initial data transmission do not pass the LDPC codeword parity check. STA2 selects a HARQ sequence to provide feedback to STA1, and transmits a HARQ feedback frame to STA1. The HARQ feedback frame includes a bitmap indicating one or more codewords of the initial data transmission that were not successfully decoded. In response to the HARQ feedback frame, STA1 retransmits the indicated one or more codewords of the initial data transmission to STA2. The retransmission from STA1 is successfully decoded by STA2, for example, such that the one or more retransmitted codewords pass the LDPC codeword parity check. In response thereto, STA2 transmits either an ARQ ACK frame or an ARQ BA frame confirming reception of the retransmission.

Figure 16D:
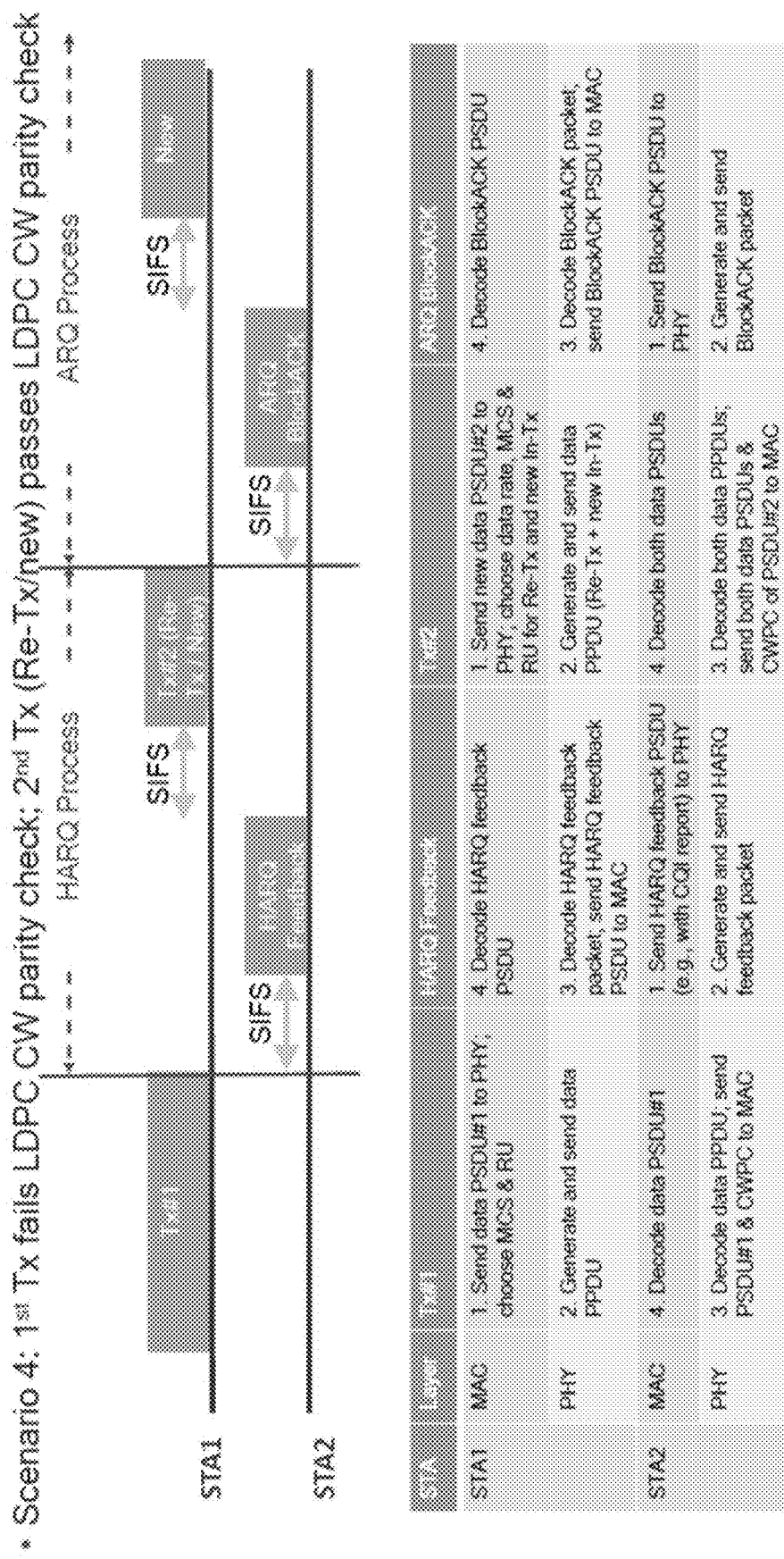
FIG. 16D shows a sequence diagram illustrating an example process for wireless communication that supports HARQ and ARQ techniques according to some other implementations.

FIG. 16D shows a sequence diagram 1600D illustrating the transmissions of communications that support HARQ and ARQ techniques according to some other implementations. In the timing diagram 1600D, the initial data transmission from STA1 is not successfully decoded by STA2, for example, such that first data units corresponding to the initial data transmission do not pass the LDPC codeword parity check. STA2 selects a HARQ sequence to provide feedback to STA1, and transmits a HARQ feedback frame to STA1. The HARQ feedback frame includes a bitmap indicating one or more codewords of the first data units that were not successfully decoded. In response to the HARQ feedback frame, STA1 retransmits the indicated one or more codewords of the first data units to STA2, and concurrently transmits second data units to STA2. The retransmitted one or more codewords of the first data units and the second data units are successfully decoded by STA2, for example, such that the retransmitted one or more codewords of the first data units and the second data units pass the LDPC codeword parity check. In response thereto, STA2 transmits an ARQ BA frame confirming reception of the retransmitted one or more codewords of the first data units and the transmitted second data units.

Figure 16E:
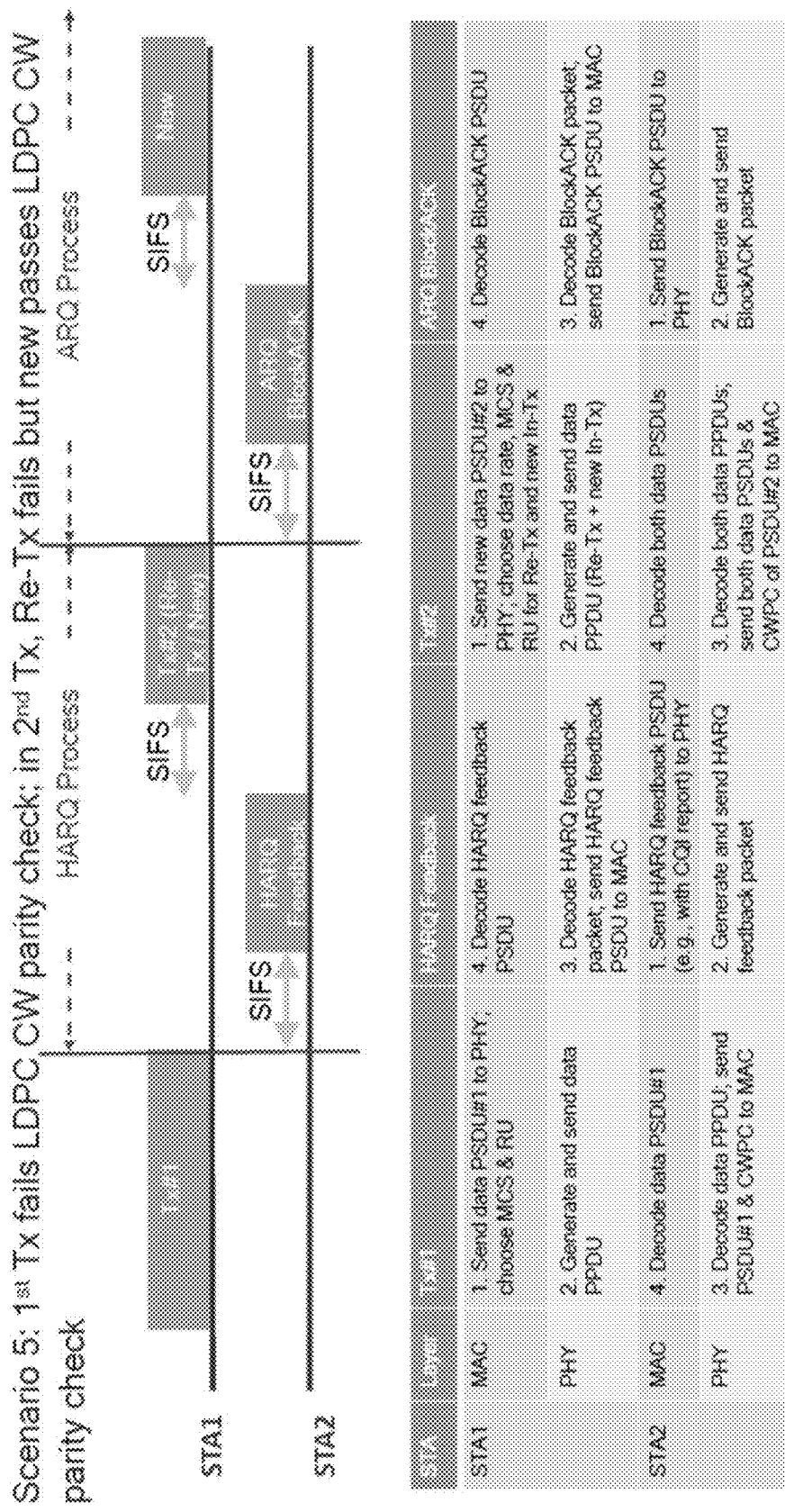
FIG. 16E shows a sequence diagram illustrating an example process for wireless communication that supports HARQ and ARQ techniques according to some other implementations.

FIG. 16E shows a sequence diagram 1600E illustrating the transmissions of communications that support HARQ and ARQ techniques according to some other implementations. In the timing diagram 1600E, the initial data transmission from STA1 is not successfully decoded by STA2, for example, such that first data units corresponding to the initial data transmission do not pass the LDPC codeword parity check. STA2 selects a HARQ sequence to provide feedback to STA1, and transmits a HARQ feedback frame to STA1. The HARQ feedback frame includes a bitmap indicating one or more codewords of the first data units that were not successfully decoded. In response to the HARQ feedback frame, STA1 retransmits the indicated one or more codewords of the first data units to STA2, and concurrently transmits second data units to STA2. The retransmitted one or more codewords of the first data units are not successfully decoded by STA2, and the second data units are successfully decoded by STA2, for example, such that the retransmitted one or more codewords of the first data units do not pass the LDPC codeword parity check and the second data units pass the LDPC codeword parity check. In response thereto, STA2 transmits an ARQ BA frame confirming reception of the second data units and indicating one or more portions of the retransmitted codewords of the first data units that were not successfully decoded.

Figure 16F:
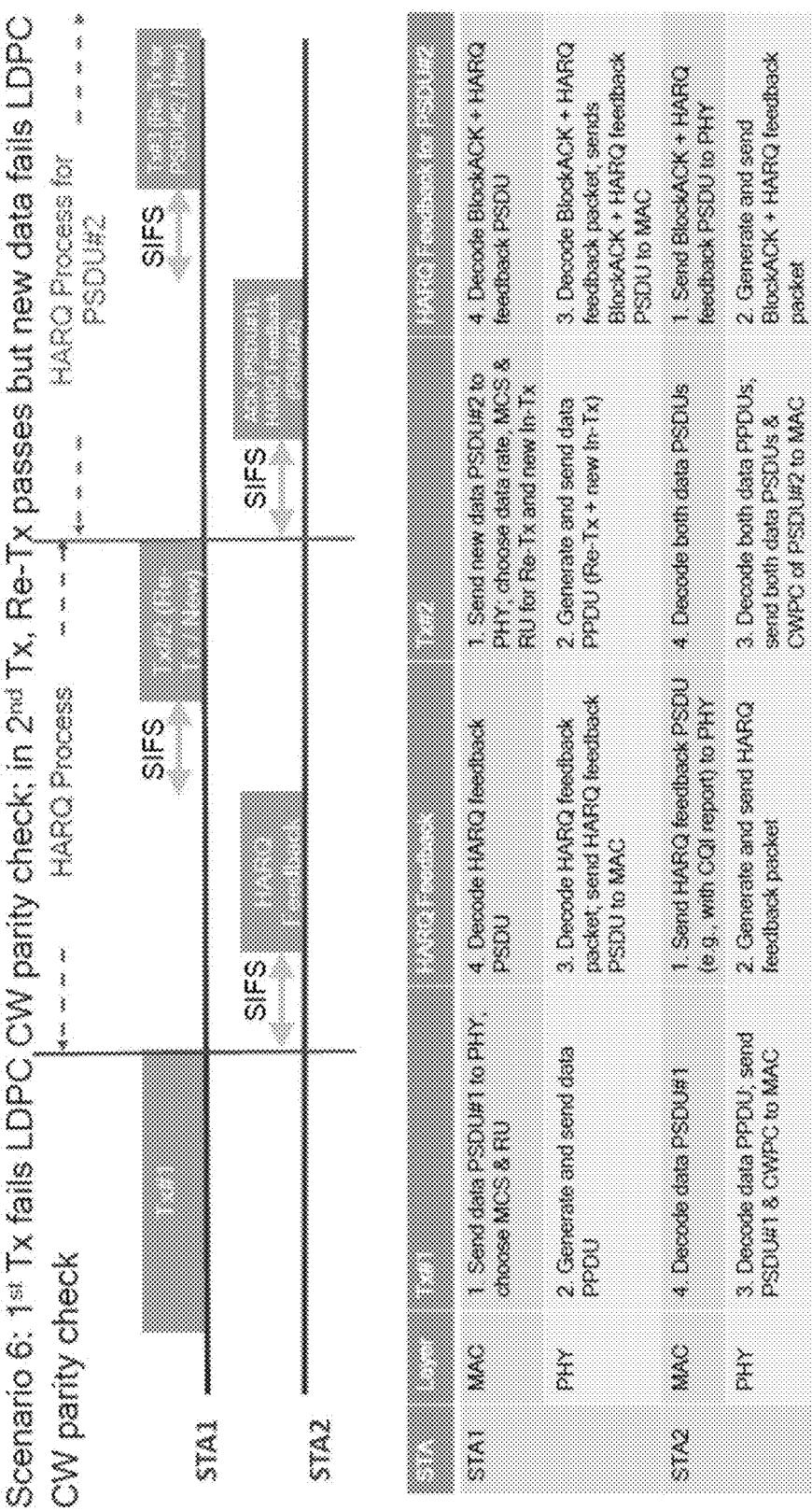
FIG. 16F shows a sequence diagram illustrating an example process for wireless communication that supports HARQ and ARQ techniques according to some other implementations.

FIG. 16F shows a sequence diagram 1600F illustrating the transmissions of communications that support HARQ and ARQ techniques according to some other implementations. In the timing diagram 1600F, the initial data transmission from STA1 is not successfully decoded by STA2, for example, such that first data units corresponding to the initial data transmission do not pass the LDPC codeword parity check. STA2 selects a HARQ sequence to provide feedback to STA1, and transmits a HARQ feedback frame to STA1. The HARQ feedback frame includes a bitmap indicating one or more codewords of the first data units that were not successfully decoded. In response to the HARQ feedback frame, STA1 retransmits the indicated one or more codewords of the first data units to STA2, and concurrently transmits second data units to STA2. The retransmitted one or more codewords of the first data units are successfully decoded by STA2, and the second data units are not successfully decoded by STA2, for example, such that the retransmitted one or more codewords of the first data units pass the LDPC codeword parity check and the second data units do not pass the LDPC codeword parity check. In response thereto, STA2 transmits an ACK frame confirming reception of the one or more portions of the retransmitted codewords of the first data units, and transmits a HARQ feedback frame indicating one or more portions of the second data units that were not successfully decoded. STA1 receives the HARQ feedback frame, and retransmits the indicated one or more portions of the second data units. STA1 also transmits a number of third data units to STA2 concurrently with the retransmission of the indicated one or more portions of the second data units.

Figure 16G:
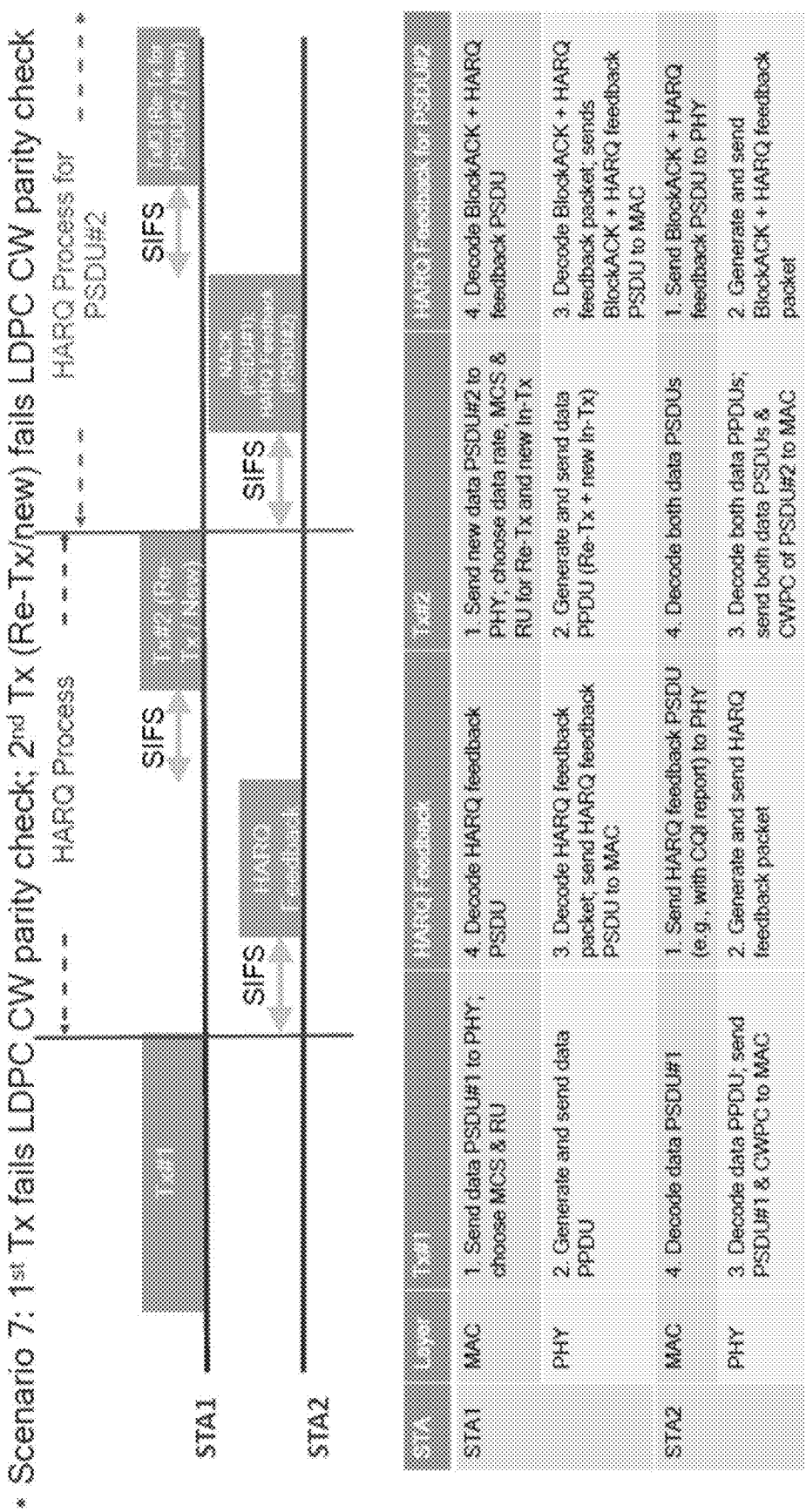
FIG. 16G shows a sequence diagram illustrating an example process for wireless communication that supports HARQ and ARQ techniques according to some other implementations.

FIG. 16G shows a sequence diagram 1600G illustrating the transmissions of communications that support HARQ and ARQ techniques according to some other implementations. In the timing diagram 1600G, the initial data transmission from STA1 is not successfully decoded by STA2, for example, such that first data units corresponding to the initial data transmission do not pass the LDPC codeword parity check. STA2 selects a HARQ sequence to provide feedback to STA1, and transmits a HARQ feedback frame to STA1. The HARQ feedback frame includes a bitmap indicating one or more codewords of the first data units that were not successfully decoded. In response to the HARQ feedback frame, STA1 retransmits the indicated one or more codewords of the first data units to STA2, and concurrently transmits second data units to STA2. Neither the retransmitted one or more codewords of the first data units nor the second data units are successfully decoded by STA2, for example, such that the retransmitted one or more codewords of the first data units do not pass the LDPC codeword parity check and the second data units do not pass the LDPC codeword parity check. In response thereto, STA2 transmits a NACK frame indicating that the first data units were not received, and concurrently transmits a HARQ feedback frame indicating one or more portions of the second data units that were not successfully decoded. STA1 receives the NACK frame and the HARQ feedback frame, and retransmits the indicated one or more portions of the second data units. STA1 also transmits a number of third data units to STA2 concurrently with the retransmission of the indicated one or more portions of the second data units.

Figure 17:
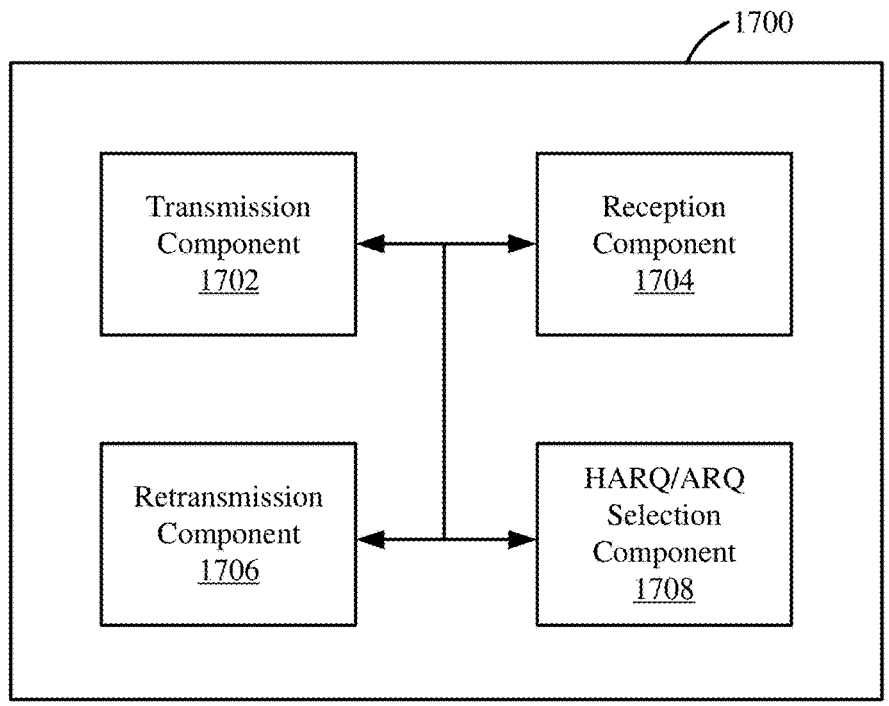
FIG. 17 shows a block diagram of an example wireless communication device that supports HARQ techniques in wireless communications according to some implementations.

FIG. 17 shows a block diagram of an example wireless communication device 1700 that supports HARQ techniques in wireless communications according to some implementations. In some implementations, the wireless communication device 1700 is configured to perform one or more of the processes 700 and 710 described above with reference to FIGS. 7A and 7B, respectively. The wireless communication device 1700 may be an example implementation of the wireless communication device 500 described above with reference to FIG. 5. For example, the wireless communication device 1700 can be a chip, SoC, chipset, package or device that includes at least one processor (such as the processor 502), at least one modem (for example, a Wi-Fi (IEEE 802.11) modem or a cellular modem such as the modem 504), at least one memory (such as the memory 508), and at least one radio (such as the radio 506). In some implementations, the wireless communication device 1700 can be a device for use in a STA, such as one of the STAs 104 and 604 described above with reference to FIGS. 1 and 6B, respectively. In some other implementations, the wireless communication device 1700 can be a STA that includes such a chip, SoC, chipset, package or device as well as at least one antenna (such as the antennas 625).

The wireless communication device 1700 includes a transmission component 1702, a reception component 1704, a retransmission component 1706, and a HARQ/ARQ selection component 1708. Portions of one or more of the components 1702, 1704, 1706, and 1708 may be implemented at least in part in hardware or firmware. For example, the transmission component 1702, the reception component 1704, and the retransmission component 1706 may be implemented at least in part by a modem (such as the modem 502). In some implementations, at least some of the components 1702, 1704, 1706, and 1708 are implemented at least in part as software stored in a memory (such as the memory 508). For example, portions of one or more of the components 1702, 1704, 1706, and 1708 can be implemented as non-transitory instructions (or "code") executable by a processor (such as the processor 506) to perform the functions or operations of the respective module.

The transmission component 1702 is configured to transmit a first data unit to a receiving device, and to transmit a second data unit, different than the first data unit, to the receiving device concurrently with a retransmission of one or more portions of the first data unit.

The reception component 1704 is configured to receive a first hybrid automatic repeat request (HARQ) feedback frame indicating that a portion of the first data unit was not successfully decoded by the receiving device.

The retransmission component 1706 is configured to retransmit the indicated portion of the first data unit to the receiving device in response to the first HARQ feedback frame.

The HARQ/ARQ selection component 1708 is configured to select using one or both of a HARQ sequence or an ARQ sequence to confirm reception of data units, to indicate portions of the data units that were not successfully decoded, or both.

Figure 18:
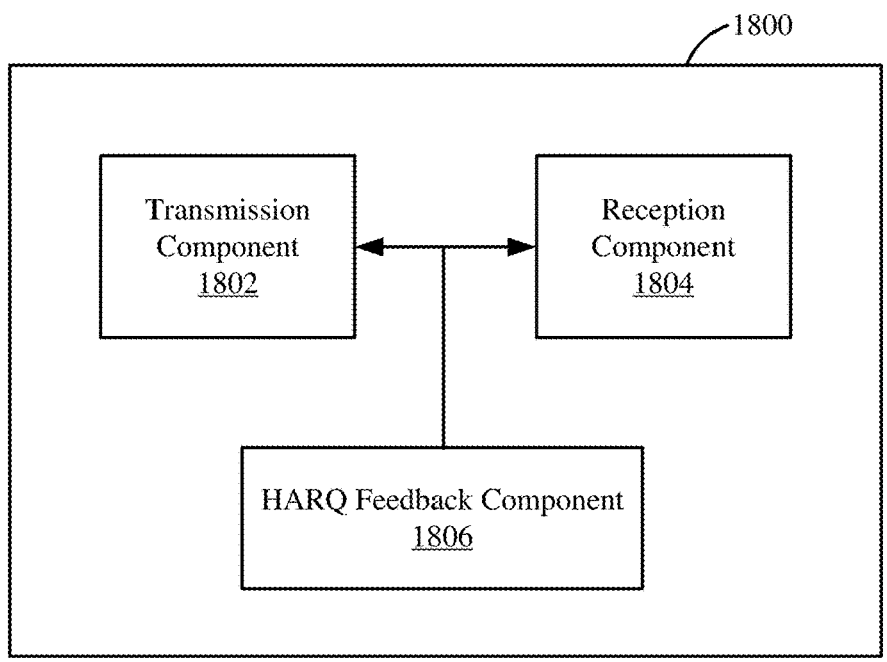
FIG. 18 shows a block diagram of an example AP that supports HARQ techniques in wireless communications according to some implementations.

FIG. 18 shows a block diagram of an example wireless communication device 1800 that supports HARQ techniques in wireless communications according to other implementations. In some implementations, the wireless communication device 1800 is configured to perform one or more of the processes 800 and 900 described above with reference to FIGS. 8A and 9A, respectively. The wireless communication device 1800 may be an example implementation of the wireless communication device 500 described above with reference to FIG. 5. For example, the wireless communication device 1800 can be a chip, SoC, chipset, package or device that includes at least one processor (such as the processor 502), at least one modem (for example, a Wi-Fi (IEEE 802.11) modem or a cellular modem such as the modem 504), at least one memory (such as the memory 508), and at least one radio (such as the radio 506). In some implementations, the wireless communication device 1800 can be a device for use in an AP, such as one of the APs 102 and 602 described above with reference to FIGS. 1 and 6A, respectively. In some other implementations, the wireless communication device 1800 can be an AP that includes such a chip, SoC, chipset, package or device as well as at least one antenna (such as the antennas 620).

The wireless communication device 1800 includes a transmission component 1802, a reception component 1804, and a HARQ feedback component 1806. Portions of one or more of the components 1802, 1804, and 1806 may be implemented at least in part in hardware or firmware. For example, the transmission component 1802 and the reception component 1804 may be implemented at least in part by a modem (such as the modem 502). In some implementations, at least some of the components 1802, 1804, and 1806 are implemented at least in part as software stored in a memory (such as the memory 508). For example, portions of one or more of the components 1802, 1804, and 1806 can be implemented as non-transitory instructions (or "code") executable by a processor (such as the processor 506) to perform the functions or operations of the respective module.

The transmission component 1802 is configured to transmit trigger frames, HARQ feedback frames, ACKs, NACKs, and BAs to one or more STAs.

The reception component 1804 is configured to receive data units and retransmitted portions of data units from one or more STAs.

The HARQ feedback component 1806 is configured to determine whether any portions of data units transmitted from a STA was not successfully decoded, and to generate one or more HARQ feedback frames indicating portions of data units that were not successfully decoded.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
   transmitting a first data unit to a receiving device;
   receiving a first hybrid automatic repeat request (HARQ) feedback frame indicating that a portion of the first data unit was not successfully decoded by the receiving device;
   retransmitting, in response to the first HARQ feedback frame, the indicated portion of the first data unit to the receiving device;
   transmitting a second data unit, different than the first data unit, to the receiving device concurrently with the retransmission of the indicated portion of the first data unit; and
   receiving a block acknowledgement (BA) frame confirming reception of the indicated portion of the first data unit and the second data unit by the receiving device, wherein transmission of the first HARQ feedback frame, retransmission of the indicated portion of the first data unit, and transmission of the second data unit correspond to a same HARQ sequence.

2. The method of claim 1, wherein the indicated portion of the first data unit and the second data unit are aggregated in a single packet.

3. The method of claim 2, wherein the first data unit comprises a first physical-layer service data unit (PSDU), the indicated portion comprises one or more medium access control protocol data units (MPDUs) associated with the first PSDU, the second data unit comprises a second PSDU, and the single packet comprises a physical-layer protocol data unit (PPDU) containing at least the one or more MPDUs associated with the first PSDU and the second PSDU, wherein the PPDU comprises an aggregated medium access control protocol data unit (A-MPDU) containing the one or more MPDUs associated with the first PSDU and one or more MPDUs associated with the second PSDU.

4. The method of claim 1, wherein the first data unit comprises a physical-layer service data unit (PSDU) including a plurality of low-density parity check (LDPC) codewords, and the indicated portion comprises a subset of the plurality of LDPC codewords.

5. The method of claim 1, wherein:
the indicated portion of the first data unit is transmitted using one or more first resource units (RUs), and the second data unit is transmitted using one or more second RUs different than the one or more first RUs; or
the indicated portion of the first data unit is transmitted using a first set spatial streams, and the second data unit is transmitted using a second set of spatial streams different than the first set of first spatial streams; or
the indicated portion of the first data unit is transmitted using one or more first orthogonal frequency division multiplexing (OFDM) symbols, and the second data unit is transmitted using one or more second OFDM symbols different than the one or more first OFDM symbols.

6. The method of claim 1,
transmission of the BA frame corresponds to an automatic repeat request (ARQ) sequence.

7. A wireless communication device, comprising:
at least one modem;
at least one processor communicatively coupled with the at least one modem; and
at least one memory communicatively coupled with the at least one processor and storing processor-readable code that, when executed by the at least one processor, causes the wireless communication device to:
transmit a first data unit to a receiving device;
receive a first hybrid automatic repeat request (HARQ) feedback frame indicating that a portion of the first data unit was not successfully decoded by the receiving device;
retransmit, in response to the first HARQ feedback frame, the indicated portion of the first data unit to the receiving device;
transmit a second data unit, different than the first data unit, to the receiving device concurrently with the retransmission of the indicated portion of the first data unit; and
receive a block acknowledgement (BA) frame confirming reception of the indicated portion of the first data unit and the second data unit by the receiving device, wherein transmission of the first HARQ feedback frame, retransmission of the indicated portion of the first data unit, and transmission of the second data unit correspond to a same HARQ sequence.

8. The wireless communication device of claim 7, wherein the indicated portion of the first data unit and the second data unit are aggregated in a single packet.

9. The wireless communication device of claim 8, wherein the first data unit comprises a first physical-layer service data unit (PSDU), the indicated portion comprises one or more medium access control protocol data units (MPDUs) associated with the first PSDU, the second data unit comprises a second PSDU, and the single packet comprises a physical-layer protocol data unit (PPDU) containing at least the one or more MPDUs associated with the first PSDU and the second PSDU, wherein the PPDU comprises an aggregated medium access control protocol data unit (A-MPDU) containing the one or more MPDUs associated with the first PSDU and a number of MPDUs associated with the second PSDU.

10. The wireless communication device of claim 7, wherein the first data unit comprises a physical-layer service data unit (PSDU) including a plurality of low-density parity check (LDPC) codewords, and the indicated portion comprises a subset of the plurality of LDPC codewords.

11. The wireless communication device of claim 7, wherein:
the indicated portion of the first data unit is transmitted using one or more first resource units (RUs), and the second data unit is transmitted using one or more second RUs different than the one or more first RUs; or
the indicated portion of the first data unit is transmitted using a first set spatial streams, and the second data unit is transmitted using a second set of spatial streams different than the first set of first spatial streams; or
the indicated portion of the first data unit is transmitted using one or more first orthogonal frequency division multiplexing (OFDM) symbols, and the one or more second data units are transmitted using one or more second OFDM symbols different than the one or more first OFDM symbols.

12. The wireless communication device of claim 7,
transmission of the BA frame corresponds to an automatic repeat request (ARQ) sequence.

13. A method for wireless communication by a wireless access point (AP), comprising:
transmitting a first trigger frame that solicits uplink (UL) data from a plurality of wireless stations (STAs);
receiving first data units from one or more STAs of the plurality of STAs;
transmitting a first hybrid automatic repeat request (HARQ) feedback frame to at least one STA of the one or more STAs, the first HARQ feedback frame indicating that a portion of the first data unit transmitted from the at least one STA was not successfully decoded;
receiving, from the at least one STA, a retransmission of the indicated portion of the first data unit based at least in part on the first HARQ feedback frame;
receiving one or more second data units from the at least one STA concurrently with receiving the retransmission of the indicated portion of the first data unit, the one or more second data units different than the first data unit; and
transmitting a block acknowledgement (BA) to the AP confirming reception of the indicated portion of the first data unit and the one or more second data units by the AP, wherein transmission of the first HARQ feedback frame, retransmission of the indicated portion of the first data unit, and transmission of the one or more second data units correspond to a same HARQ sequence.

14. The method of claim 13, wherein the first HARQ feedback frame further comprises a second trigger frame that solicits transmission of the one or more second data units.

15. The method of claim 13, wherein the indicated portion of the first data unit and the one or more second data units are aggregated in a single packet, the first data units comprises a first physical-layer service data unit (PSDU), the indicated portion comprises one or more medium access control protocol data units (MPDUs) associated with the first PSDU, each of the one or more second data units comprises a second PSDU, and the single packet comprises a physical-layer protocol data unit (PPDU) containing at least the one or more MPDUs associated with the first PSDU and the second PSDU.

16. The method of claim 13, wherein the first data unit comprises a physical-layer service data unit (PSDU) including a plurality of low-density parity check (LDPC) codewords, and the indicated portion comprises a subset of the plurality of LDPC codewords.

17. The method of claim 13, wherein:
the indicated portion of the first data unit is transmitted using one or more first resource units (RUs), and the one or more second data units are transmitted using one or more second RUs different than the one or more first RUs; or
the indicated portion of the first data unit is transmitted using a first set of spatial streams, and the one or more second data units are transmitted using a second set of spatial streams different than the first set of spatial streams; or
the indicated portion of the first data unit is transmitted using one or more first orthogonal frequency division multiplexing (OFDM) symbols, and the one or more second data units are transmitted using one or more second OFDM symbols different than the one or more first OFDM symbols.

18. The method of claim 13, wherein a plurality of first data units are concurrently received from the one or more STAs as uplink multi-user (UL MU) data, and wherein a plurality of first HARQ feedback frames are concurrently transmitted as downlink multi-user (DL MU) data.

19. The method of claim 13, transmission of the BA frame corresponds to an automatic repeat request (ARQ) sequence.

20. The method of claim 13, further comprising:
transmitting a first downlink (DL) multi-user (MU) packet to at least a first STA and a second STA, the DL MU packet including a first DL data unit for the first STA and including a second DL data unit for the second STA;
receiving a first uplink (UL) MU packet including at least:
a first UL HARQ feedback frame indicating portions of the first DL data unit that were not successfully decoded by the first STA; and
a second UL HARQ feedback frame indicating portions of the second DL data unit that were not successfully decoded by the second STA; and
retransmitting the indicated portions of the first and second data units in a second DL MU packet based on receiving the first and second HARQ feedback frames.

21. The method of claim 20, wherein:
the first DL MU packet includes a first trigger frame that solicits transmission of the first and second UL HARQ feedback frames; and
the second DL MU packet includes a second trigger frame that solicits transmission of acknowledgment (ACK) frames confirming reception of the retransmitted portions of the first and second data units.

22. A wireless access point (AP), comprising:
at least one modem;
at least one processor communicatively coupled with the at least one modem; and
at least one memory communicatively coupled with the at least one processor and storing processor-readable code that, when executed by the at least one processor, causes the AP to:
transmit a first trigger frame that solicits uplink (UL) data from a plurality of wireless stations (STAs);
receive first data units from one or more STAs of the plurality of STAs;
transmit a first hybrid automatic repeat request (HARQ) feedback frame to at least one STA of the one or more STAs, the first HARQ feedback frame indicating that a portion of the first data unit transmitted from the at least one STA was not successfully decoded;
receive one or more second data units from the at least one STA concurrently with receiving a retransmission of the indicated portion of the first data unit, the one or more second data units different than the first data units; and
transmitting a block acknowledgement (BA) frame to the one or more STAs, the BA frame confirming reception of the retransmitted portion of the first data unit and the one or more second data units by the AP, wherein transmission of the first HARQ feedback frame, retransmission of the indicated portion of the first data unit, and transmission of the one or more second data units correspond to a same HARQ sequence.

23. The AP of claim 22, wherein the first HARQ feedback frame further comprises a second trigger frame that solicits transmission of the one or more second data units.

24. The AP of claim 22, wherein each of the first data units comprises a first physical-layer service data unit (PSDU), each of the indicated portions comprises one or more medium access control protocol data units (MPDUs) associated with the first PSDU, each of the one or more second data units comprises a second PSDU, and the single packet comprises a physical-layer protocol data unit (PPDU) containing at least the one or more MPDUs associated with the first PSDU and the second PSDU.

25. The AP of claim 22, wherein each of the first data units comprises a physical-layer service data unit (PSDU) including a plurality of low-density parity check (LDPC) codewords, and each of the indicated portions comprises a subset of the plurality of LDPC codewords.

26. The AP of claim 22, wherein:
the indicated portion of the first data unit is transmitted using one or more first resource units (RUs), and the one or more second data units are transmitted using one or more second RUs different than the one or more first RUs; or
the indicated portion of the first data unit is transmitted using one or more first spatial streams, and the one or more second data units are transmitted using one or more spatial streams different than the one or more first spatial streams; or
the indicated portion of the first data unit is transmitted using one or more first orthogonal frequency division multiplexing (OFDM) symbols, and the one or more second data units are transmitted using one or more second OFDM symbols different than the one or more first OFDM symbols.

27. The AP of claim 22, wherein the first data units are concurrently received as uplink (UL) multi-user (MU) data, and the first HARQ feedback frames are concurrently transmitted as downlink (DL) MU.

28. The AP of claim 22,
wherein:
transmission of the BA frame corresponds to an automatic repeat request (ARQ) sequence.

29. The AP of claim 22, wherein execution of the processor-readable code further causes the AP to:
transmit a first downlink (DL) multi-user (MU) packet to at least a first STA and a second STA, the DL MU packet carrying a first data unit for the first STA and carrying a second data unit for the second STA;
receive a first uplink (UL) MU packet including at least:
a first UL HARQ feedback frame indicating portions of the first data unit that were not successfully decoded by the first STA; and a second UL HARQ feedback frame indicating portions of the second data unit that were not successfully decoded by the second STA; and retransmitting the indicated portions of the first and second data units in a second DL MU packet based on receiving the first and second HARQ feedback frames.

30. The AP of claim 29, wherein:

the first DL MU packet includes a first trigger frame that solicits transmission of the first and second UL HARQ feedback frames; and the second DL MU packet includes a second trigger frame that solicits transmission of acknowledgment (ACK) frames confirming reception of the retransmitted portions of the first and second data units.

* * * * *